US008958638B2

(12) United States Patent
Webb et al.

(10) Patent No.: US 8,958,638 B2
(45) Date of Patent: Feb. 17, 2015

(54) METHOD AND SYSTEM FOR MULTI-STAGE AUTO-ENHANCEMENT OF PHOTOGRAPHS

(71) Applicant: Apple Inc., Cupertino, CA (US)

(72) Inventors: Russell Y. Webb, San Jose, CA (US); Garrett M. Johnson, San Francisco, CA (US); Jerremy Holland, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 13/629,551

(22) Filed: Sep. 27, 2012

(65) Prior Publication Data
US 2013/0329995 A1 Dec. 12, 2013

Related U.S. Application Data

(60) Provisional application No. 61/657,800, filed on Jun. 10, 2012.

(51) Int. Cl.
*G06K 9/00* (2006.01)
(52) U.S. Cl.
USPC ........................................................ 382/167
(58) Field of Classification Search
CPC ..... H04N 1/4074; H04N 1/60; H04N 1/6027; H04N 1/6055; H04N 1/6077; H04N 1/6094; H04N 5/20; H04N 5/243; H04N 5/253; H04N 9/11; G06T 5/0004; G06T 5/008; G06T 5/009; G06T 5/40
See application file for complete search history.

(56) References Cited

U.S. PATENT DOCUMENTS

| | | | |
|---|---|---|---|
| 5,581,370 A | 12/1996 | Fuss et al. | |
| 6,301,442 B1 | 10/2001 | Uchida et al. | |
| 6,594,388 B1 | 7/2003 | Gindele et al. | |
| 6,608,926 B1 | 8/2003 | Suwa et al. | |
| 6,879,339 B2 | 4/2005 | Ozawa | |
| 7,349,574 B1 | 3/2008 | Sodini et al. | |
| 7,421,120 B2 | 9/2008 | Kang | |
| 7,450,753 B2 | 11/2008 | Hayaishi | |
| 7,532,234 B2 * | 5/2009 | Sadovsky et al. | 348/207.1 |
| 7,586,653 B2 | 9/2009 | Pulsifer | |
| 7,688,294 B2 | 3/2010 | Baik | |
| 7,894,668 B1 | 2/2011 | Boitano | |

(Continued)

FOREIGN PATENT DOCUMENTS

| | | |
|---|---|---|
| EP | 1302898 | 4/2003 |
| EP | 1761040 | 3/2007 |

(Continued)

OTHER PUBLICATIONS

Invitation to Pay Additional Fees and, Where Applicable, Protest Fee for PCT/US2013/042948, Dec. 9, 2013 (mailing date), Apple Inc.

(Continued)

*Primary Examiner* — Jose Couso
(74) *Attorney, Agent, or Firm* — Adeli LLP

(57) ABSTRACT

Some embodiments of the image editing and organizing application described herein provide a multi-stage automatic enhancement process. The process takes an input image and feeds it through multiple different enhancement operations. The multiple enhancement operations of some embodiments are carried out in a particular order. In some embodiments, the particular order starts with exposure adjustment, then a white balance adjustment, then a vibrancy adjustment, then a tonal response curve adjustment, then a shadow lift adjustment.

25 Claims, 31 Drawing Sheets

(56) References Cited

U.S. PATENT DOCUMENTS

| | | |
|---|---|---|
| 8,044,978 B2 | 10/2011 | Na |
| 8,159,617 B2 | 4/2012 | Neal |
| 8,170,337 B2 | 5/2012 | Miyazawa |
| 8,184,904 B2 | 5/2012 | Kodavalla et al. |
| 8,355,059 B2 | 1/2013 | Fukui |
| 8,374,430 B2 | 2/2013 | Hsu |
| 8,606,037 B2 | 12/2013 | Ali |
| 8,644,638 B2 * | 2/2014 | Demandolx ............... 382/274 |
| 2003/0235333 A1 | 12/2003 | Lin |
| 2006/0245017 A1 | 11/2006 | Aoki et al. |
| 2006/0267923 A1 | 11/2006 | Kerofsky |
| 2007/0030506 A1 | 2/2007 | Takabayashi et al. |
| 2008/0123952 A1 | 5/2008 | Parkkinen et al. |
| 2010/0002104 A1 | 1/2010 | On et al. |
| 2010/0034458 A1 | 2/2010 | Tada |
| 2011/0090240 A1 | 4/2011 | Cohen |
| 2011/0129148 A1 | 6/2011 | Kisilev et al. |

FOREIGN PATENT DOCUMENTS

| | | |
|---|---|---|
| EP | 2372638 | 10/2011 |
| WO | WO 2013/188099 | 12/2013 |

OTHER PUBLICATIONS

Lin, Ping-Hsien, et al., "Tri-Histogram Equalization Based on First Order Statistics," The $13^{th}$ IEEE International Symposium on Consumer Electronics (ISCE2009), May 2009, pp. 387-391.

Pratt, William K., "Image Enhancement," Digital Image Processing: PIKS Inside, Third Edition, Jan. 2001, pp. 243-296, John Wiley & Sons, Inc., New York, USA.

International Search Report and Written Opinion for PCT/US2013/042948, Mar. 7, 2014 (mailing date), Apple Inc.

Kao, Wen-Chung, et al., "Design Considerations of Color Image Processing Pipeline for Digital Cameras," IEEE Transactions on Consumer Electronics, vol. 52, No. 4, Nov. 2006, pp. 1144-1152, New York, NY, USA.

Parulski, Ken, et al., "Chapter twelve: Color image processing for digital cameras," Digital Color Imaging Handbook, Jan. 1, 2003, pp. 727-757, CRC Press LLC, USA.

Qian, Richard, J., et al., "Image Retrieval Using Blob Histograms," IEEE, Jul. 2000, pp. 125-128, Piscataway, NJ, USA.

* cited by examiner

For high shadow settings apply variable gamma to all areas

METHOD AND SYSTEM FOR MULTI-STAGE AUTO-ENHANCEMENT OF PHOTOGRAPHS

CLAIM OF BENEFIT TO PRIOR APPLICATIONS

This application claims the benefit of U.S. Provisional Patent Application 61/657,800 entitled "Method and System for Auto-Enhancing Photographs," filed Jun. 10, 2012. The contents of U.S. Provisional Patent Application 61/657,800 are incorporated herein by reference.

BACKGROUND

Digital images are taken with varying degrees of skill, in non-ideal lighting conditions, and with cameras of variable quality. The results of such variations are often images that need touching up in order to look better. Image editing and organizing applications exist to enhance the quality of images, however these applications often contain a bewildering number of options and take time and skill to make the fullest use of them. In some cases, the people who are using image editing and organizing applications lack the skill to properly enhance a digital image. In other instances, even people with the skill to enhance a digital image manually may not have enough time to make the multiple adjustments an image requires, or may have several images to adjust. Accordingly, there is a need for an automatic enhancement process that automatically makes multiple adjustments to an image.

BRIEF SUMMARY

Some embodiments of the image editing and organizing application described herein provide a multi-stage automatic enhancement process. The process takes an input image and feeds it through multiple different enhancement operations. The multiple enhancement operations of some embodiments are carried out in a particular order. In some embodiments, the particular order starts with an exposure adjustment, then a white balance adjustment, then a vibrancy adjustment, then a tonal response curve adjustment, and finally, a shadow lift adjustment.

In some embodiments, the exposure adjustment increases the brightness of each pixel in the image or decreases the brightness of each pixel in an input image. The automated white balance enhancement of some embodiments shifts the colors of an image to make a selected object or objects in the image adjust their color(s) toward a favored color (e.g., moving the color of faces toward a preset face color). The automated vibrancy enhancement of some embodiments increases or decreases how vivid an image is. The automatic tonal response curves of some embodiments make the dark pixels darker, the light pixels lighter, and increase the contrast of the mid-tone pixels. The automatic shadow lift enhancement of some embodiments increases the contrast on the dark parts of the image. In some embodiments, the automatic settings for each stage are calculated from the image as adjusted by all previous stages. The exposure value stage is skipped in some embodiments, for a particular image, unless the image is a RAW image with extended data. The white balance stage is skipped in some embodiments, for a particular image, if there are no faces in the image.

The tonal response curves of some embodiments are used to map a set of input luminance values of an image into a set of output luminance values of an adjusted image. The application of some embodiments generates a black point for adjusting the darkest pixels in an input image into true black (minimum possible luminance) pixels in the output image. Similarly, the application of some embodiments generates a white point for setting the lightest pixels in an input image into true white (maximum possible luminance) pixels in the output image. The application then sets the positions of three points for adjusting the mid-tone contrast of the input image when generating the output image. The image editing application then adjusts the values of these three points to automatically produce a desired tonal response curve. In some embodiments, initial calculations determine original positions and values for the various points and then these values are tempered to reduce or change the effects they would otherwise have on the image.

The vibrancy enhancement operation of some embodiments increases the vividness of some of the pixels in the image while shielding the skin tone pixels in the image from some or all of the adjustment to the pixels. The vibrancy enhancement level is automatically calculated by the application of some embodiments. The application of some embodiments determines the vibrancy enhancement level by generating a modified histogram of the saturation levels of the pixels in the image. In some embodiments, the saturation level of a pixel is the difference between the highest color component value of the pixel and the lowest color component value of the pixel. In some embodiments, the modified histogram is generated as though the value of any pixel whose highest color component value is blue or green was doubled. The application determines from statistics of the histogram what vibrancy adjustment level to use.

The application of some embodiments automatically generates a setting for a shadow lift enhancement. The setting in some embodiments is based on statistics of one or more histograms of the image. In some embodiments, one of the histograms is a conventional luminance histogram that counts the number of pixels at each luminance level in the image. One of the histograms in some embodiments is a cumulative luminance histogram. In some embodiments, one of the histograms is a structure histogram that is affected by both the luminance values of the individual pixels and the structure (arrangement of pixels) in an image.

Multiple statistical values are derived from each histogram of the image in some embodiments. The statistical values are then combined in various ways and fed into a formula that determines a setting from the statistical values. The application of some embodiments gets the formula from a mathematical regression of multiple human determined shadow lift settings in some embodiments. That is, in order to make the application of some embodiments, the programmers of the application generate sets of statistics and combinations of statistical values from multiple images. The sets of statistics are the same type of statistics that are derived from automatically adjusted images by a finished application. The programmers then match a human determined setting for shadow lifting each image to each set of statistics. The programmers then run a mathematical regression of the results. The mathematical regression generates the formula used by the application to automatically set the shadow lift setting level.

The application of some embodiments takes the automatically determined value for the shadow lift setting and reduces it still further by an amount that depends on the ISO of the image. In some embodiments, the shadow lift operation is then performed by using a variable gamma adjustment on each pixel. The variable gamma adjustment is dependent on the automatic setting and a Gaussian blur of the input image in some embodiments. In some embodiments, the shadow lift is either not applied or is only lightly applied to areas of the image with skin color in them.

The preceding Summary is intended to serve as a brief introduction to some embodiments described herein. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Auto-Enhancement

A. Overview

The image editing and organizing applications of some of the embodiments disclosed herein automatically enhance images in multiple stages. Each stage enhances a different aspect of the image. Some stages affect luminance of various pixels, some affect color, and some affect both. The combination of the stages improves the images more than the individual enhancements would alone.

Figure 1:
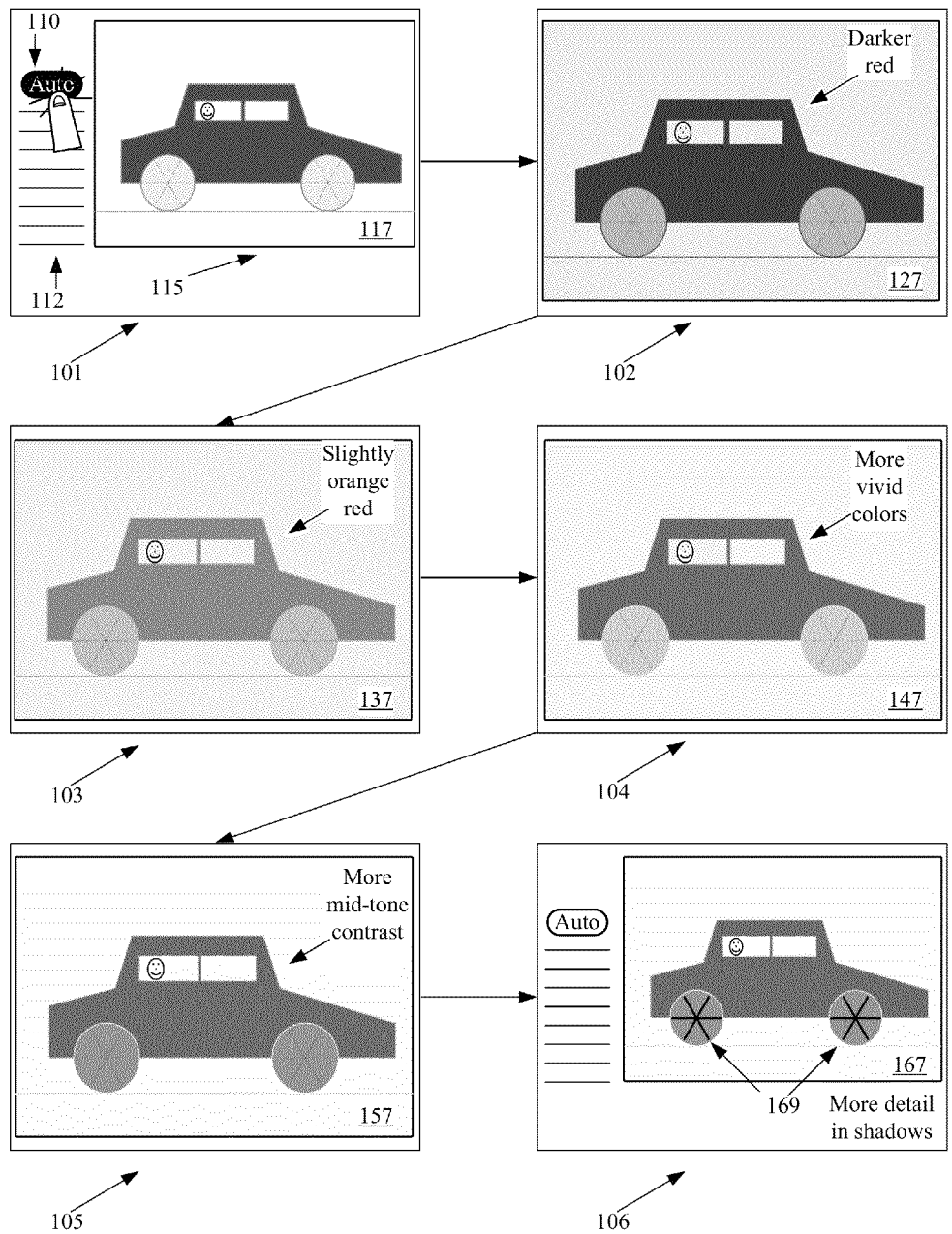
FIG. 1 illustrates an auto-enhancement process of an image editing and organizing application of some embodiments.

FIG. 1 illustrates an auto-enhancement process of an image editing and organizing application of some embodiments. The figure illustrates the auto-enhancement process in 6 stages, 101-106. The first stage 101 shows an abbreviated view of the graphical user interface (GUI) of the application with an auto-enhance button 110 being activated. The next 4 stages 102-105 show adjusted images 127, 137, 147, and 157 generated by sequential automatic enhancements performed on an original image 117. The last stage 106 shows the GUI controls and image 167 after all the auto-enhancement stages are complete. Each of these stages will be further described below.

The first stage 101 in FIG. 1 illustrates a GUI of an image editing and organizing application of some embodiments. The GUI includes an auto-enhance button 110, additional controls 112, and a display area 115 with original image 117 displayed in it. In the illustrated embodiment, the auto-enhance button 110 activates a series of auto-enhancement stages that each alters the image sequentially. However, it will be obvious to one of ordinary skill in the art that in other embodiments, different controls are used to activate the auto-enhance stages. For example, in some embodiments a hot key is used. In other embodiments, the auto-enhancement is performed automatically upon the loading of an image.

The subsequent stages 102-105, do not show the GUI controls 110 and 112, but only the adjusted images. The lack of visible controls in those stages conceptually illustrates that no user input is accepted during the automatic stages in the illustrated embodiment. In some embodiments, the intermediate stages of the image enhancement process are not shown to users, only the original image and the final result. In some embodiments, only when the last auto-enhancement stage is complete does the application again allow the user to make further changes in the image (e.g., after stage 106).

In stage 102, the image editing and organizing application has adjusted the original image 117. The adjustment changes an exposure setting for the image 117 to produce image 127. Changing the exposure of the image 117 multiplies one or more values of each pixel in the image 117 by a set multiplier to produce the corresponding pixels in the image 127. In this case, the multiplier is a value less than one, so all the pixels in the image 127 are darker than the corresponding pixels in image 117. The exposure auto-enhancement stage 102 is further described with respect to FIGS. 7-9.

After the exposure adjustment of stage 102, the applications of some embodiments perform a white-balancing operation in stage 103 to produce image 137. The white-balancing operation of some embodiments (1) identifies one or more parts of the image 127, (2) determines an ideal color for the identified part(s) and (3) adjusts the colors of the image 127 in a way that changes the color of the identified part(s) toward the ideal color in image 137. In stage 103, the application has determined that the face of the person in the back seat should be more yellow. Accordingly the entire image 127 is adjusted toward yellow to produce image 137. The white-balance auto-enhancement stage 103 is further described with respect to FIG. 10.

Stage 104 is a vibrancy enhancement stage. The vibrancy enhancement stage increases the color saturation of most or all of the pixels in the image 137 to produce image 147. In some embodiments, the color saturation of a pixel is defined as the difference between the highest color component value (e.g., highest of red (r), green (g), or blue (b)) and the lowest color component value (e.g., lowest of r, g, and b) of the pixel. The application of some embodiments raises the saturation value of some or all of the pixels when producing image 147 based on a histogram of the saturation of the pixels of image 137. Increasing the saturation values of the pixels makes the image more colorful (e.g., makes the colors more vivid). The vibrancy auto-enhancement stage 104 is further described with respect to FIGS. 18-21.

In stage 105, the application remaps the luminance values of the image 147 in order to make the dark pixels (e.g., the pixels in the tires) in image 147 darker in image 157 and to make the light pixels (e.g., the pixels in the background) in image 147 lighter in image 157 and also to increase the contrast of the mid-tone pixels in image 157 relative to the contrast of the mid-tone pixels in image 147. This remapping is accomplished in some embodiments by applying a remapping curve (not shown) to the values of the pixels of the image 147 to produce image 157. The remapping curve enhancement stage 105 is further described with respect to FIGS. 12-17.

Finally, the application of some embodiments finishes in stage 106 by producing image 167 which is produced by lifting the shadows of image 157. Shadow lifting increases the contrast of the darker parts of the image to increase the visibility of details. For example, the wheels in image 167 have spokes 169 that are highly visible in image 167. The wheels in the other images 117, 127, 137, 147, and 157 in the other stages 101-105 have spokes that are barely visible. The application increases the contrast of the dark tires bringing the spokes 169 into view in the dark tires. The application brings the spokes into view with a shadow lifting operation performed on image 157 of stage 105 to produce image 167. In some embodiments, after the application performs the multi-stage auto-enhancement, the GUI is ready to receive user commands to adjust the image further. Accordingly, as the auto-enhancement is finished in stage 106, the user interface is shown again in stage 106. The shadow lift enhancement stage 106 is further described with respect to FIGS. 22-29.

B. Automatic Adjustments

Figure 2:
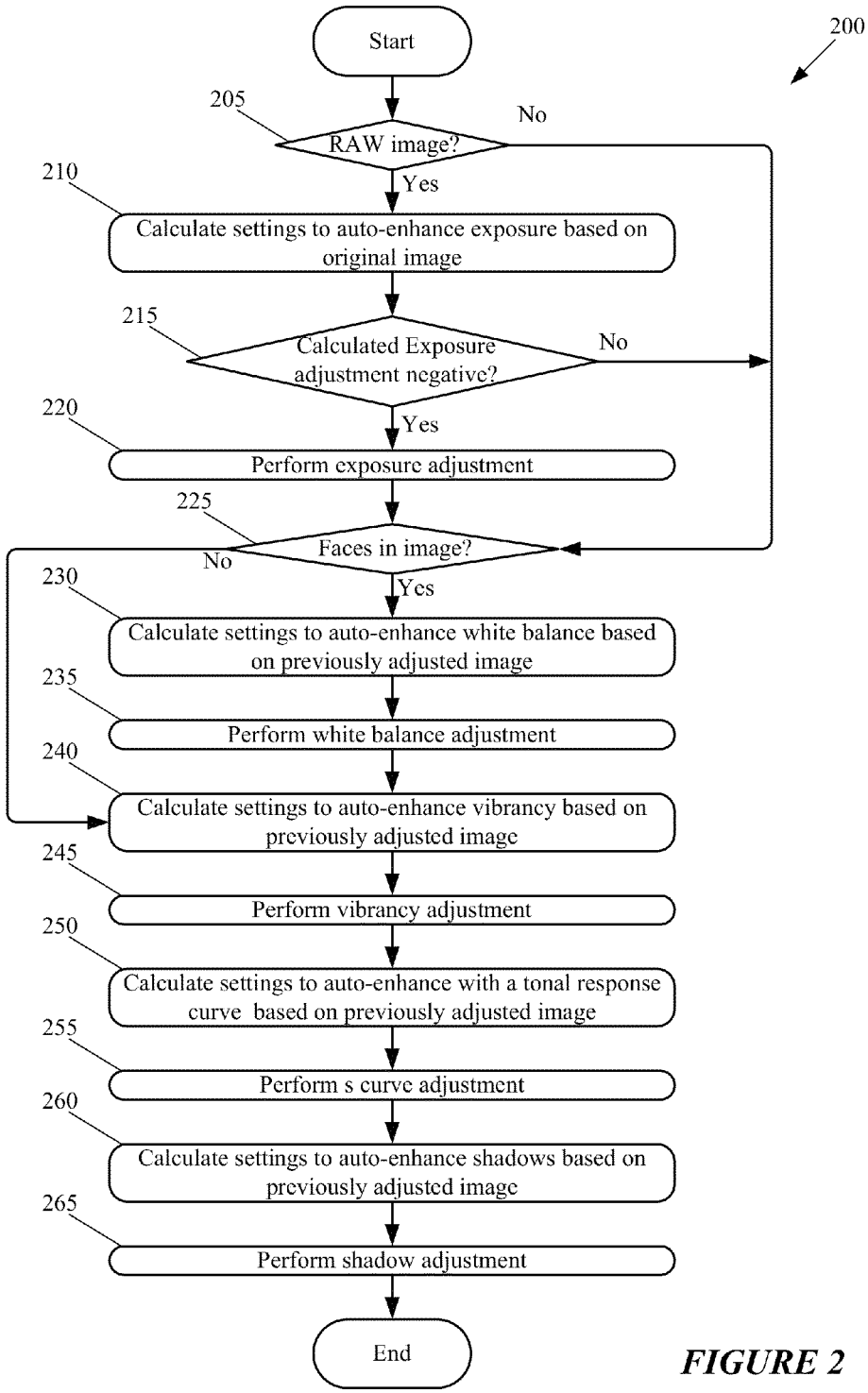
FIG. 2 conceptually illustrates a process for automatically enhancing an image.

The application of some embodiments selectively performs adjustments to an image. That is, the application of some embodiments either performs a particular adjustment or skips that adjustment based on characteristics of an image. FIG. 2 conceptually illustrates a process 200 for automatically enhancing an image. The process 200 performs the calculations for each stage of the auto-enhancement of the image. In the illustrated process 200, the calculations for each stage are calculated based on the image as adjusted by all previous stages. FIG. 2 will be described in relation to FIGS. 3 and 4, which will be introduced now.

Figure 3:
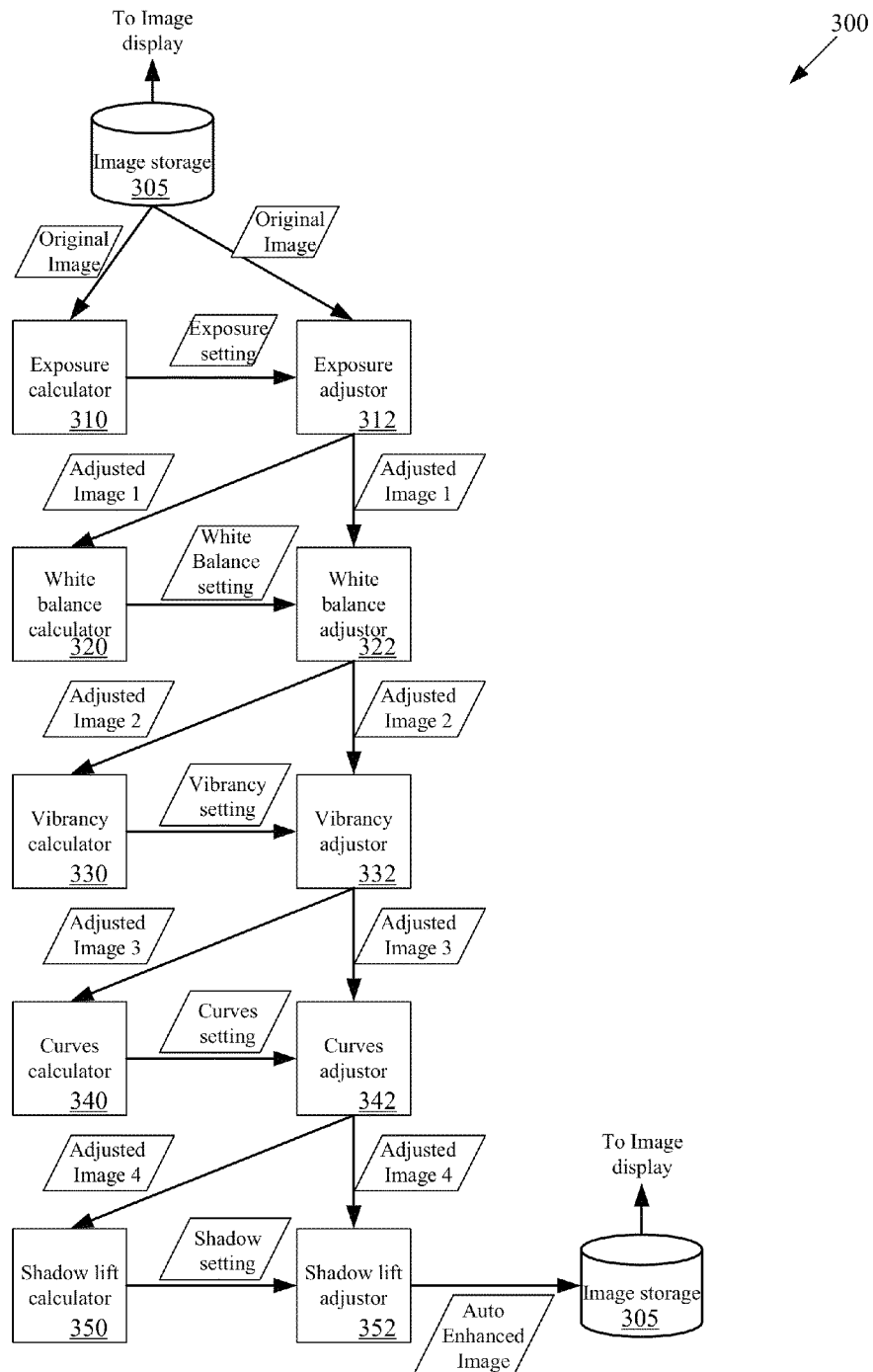
FIG. 3 conceptually illustrates a software architecture diagram for a portion of an application of some embodiments.

FIG. 3 conceptually illustrates a software architecture diagram 300 for a portion of an application of some embodiments. The software architecture diagram 300 shows only those portions of the application that perform the auto-enhancement operation. FIG. 3 includes image storage 305, exposure calculator 310, exposure adjustor 312, white-balance calculator 320, white-balance adjustor 322, vibrancy calculator 330, vibrancy adjustor 332, curves calculator 340, curves adjustor 342, shadow lift calculator 350, and shadow lift adjustor 352. The image storage 305 stores an image to be adjusted. In some embodiments, the same storage 305 stores the images before and after the auto-enhancement process. In some embodiments, the image storage 305 also stores the intermediate adjusted versions of the image.

In other embodiments, different storages store the images at different times. For example, in some embodiment, the original and/or final images are stored on a hard drive or in persistent memory (e.g., flash memory) while intermediate images are stored in Random Access Memory (RAM). An adjusted image is passed from each adjustment module to the next adjustment module in the sequence. As mentioned above, in this embodiment the application calculates a setting of the automatic enhancement operation to apply to the image at each stage based on the results of the previous stage. Accordingly, the adjusted image from each adjustor module (of adjustor modules 312, 322, 332, and 342) is not only passed to the next adjustor module, but is also passed to the calculating module that corresponds to the next adjustor module. Receiving the adjusted image allows the calculating module to derive automatic settings for the adjustor module based on the previously adjusted image rather than deriving the automatic settings from the original image. The individual operations of the modules will be described below in relation to the process 200 of FIG. 2.

The software architecture diagram of FIG. 3 is provided to conceptually illustrate some embodiments. One of ordinary skill in the art will realize that some embodiments use different modular setups that may combine multiple functions into one module though the figure shows multiple modules, and/or may split up functions that the figure ascribes to a single module into multiple modules, and/or may recombine the split up functions in various modules.

Figure 4:
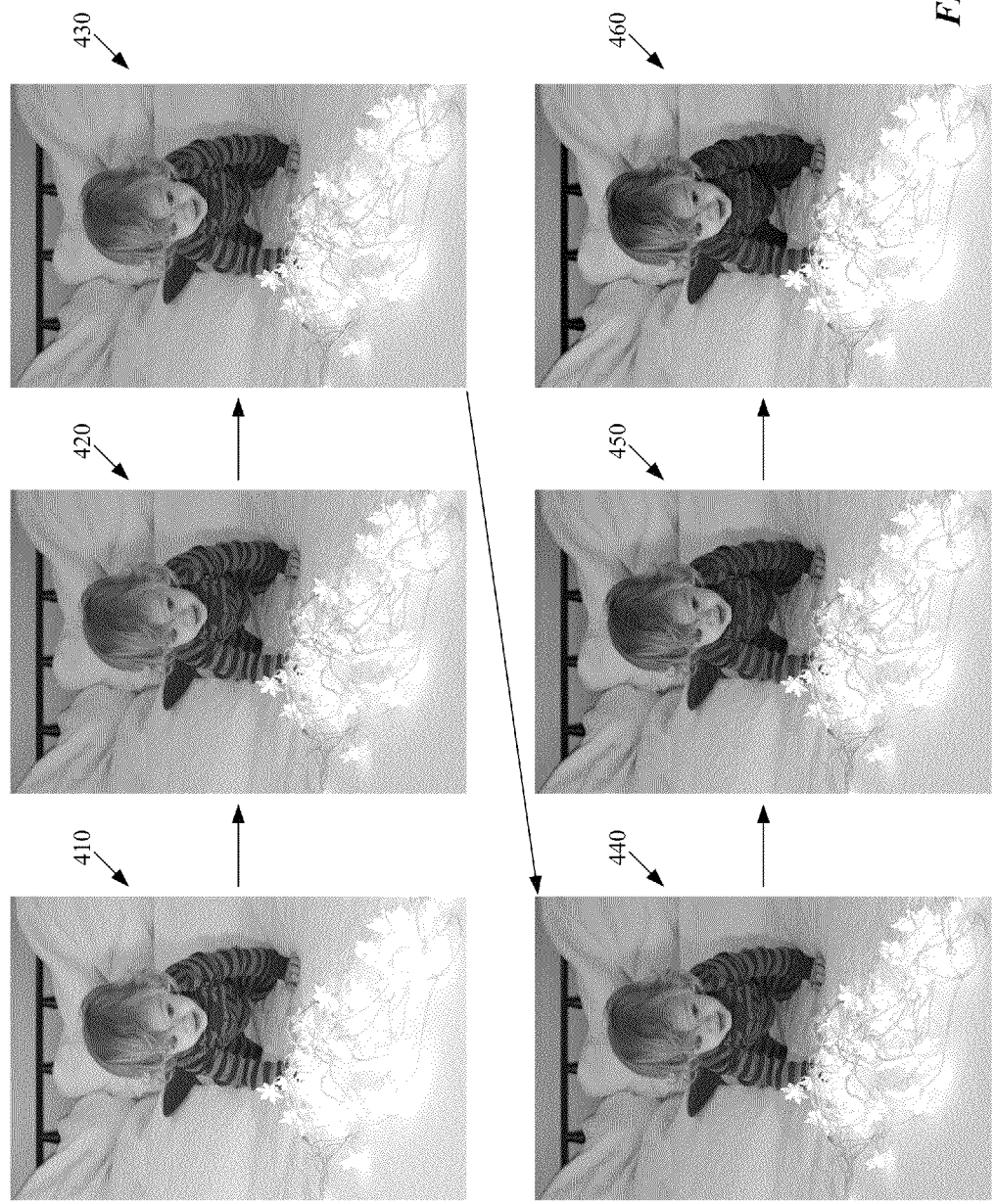
FIG. 4 illustrates sequential images automatically generated by an application of some embodiments.

FIG. 4 illustrates sequential images automatically generated by an application of some embodiments. The sequential images show the actual progression of an image as it is adjusted in multiple stages. The images include the original image 410, the final image 460, and each of the intermediate images 420-450 generated at each stage of the auto-enhancement process. Image 410 is the original image before any enhancements have been performed. Image 420 is the image after the exposure enhancement has been performed. Image 430 is the image after both the exposure enhancement and the white-balance enhancements have been performed. Image 440 represents the image after the previously mentioned enhancements and the vibrancy enhancement have been performed. Image 450 shows the state of the image after a tonal response curve has been applied to the image 440. Finally, image 460 includes all the previous enhancements plus a shadow lift enhancement. The following subsections describe each of the enhancements in more detail. Subsection 1. describes the Exposure enhancement. Subsection 2. describes the white balance enhancement. Subsection 3. then describes the vibrancy enhancement. That is followed by a description of tonal response curves in Subsection 4. Subsection 5. describes shadow lift enhancement. Finally, subsection 6. describes alternate sequences of enhancements.

1. Exposure Enhancement

As FIG. 2 shows, the process 200 begins by determining (at 205) whether the image is a RAW image or not. A RAW image file has data that is lightly processed (almost unprocessed) from an image sensor of a digital camera or other digital image capturing machine. If the image is not in RAW format, then the process 200 skips the exposure enhancement steps and proceeds to operation 225. In some embodiments the nature of the image (RAW or not) is determined by the exposure calculator 310 of FIG. 3. In other embodiments, a separate module (not shown) makes the determination.

If the process 200 determines (at 205) that the image is in a RAW format, then the process 200 calculates (at 210) settings to auto-enhance the exposure. In some embodiments, this calculation is performed by the exposure calculator 310 of FIG. 3. To begin performing the calculation, the exposure calculator 310 of some embodiments determines an average luminance value of the image. The exposure calculator 310 then compares the average luminance to a target average luminance. If the average luminance is higher than the target luminance, then the exposure calculator 310 determines a negative value (which would make the image darker) for the exposure adjustment. If the average luminance is lower than the target luminance, then the exposure calculator 310 determines a positive value (which would make the image brighter) for the exposure adjustment. If the average luminance is equal to the target luminance, then the exposure calculator 310 determines a zero value (i.e., no change in exposure level) for the exposure adjustment.

In some embodiments, if the process 200 determines (at 215) that the calculated exposure adjustment is not negative then the process skips the exposure adjustment operations and goes to operation 225. If the process 200 determines (at 215) that the calculated exposure adjustment is negative then it performs (at 220) the exposure enhancement. In some embodiments, the exposure enhancement is performed by the exposure adjustor 312 of FIG. 3. The exposure adjuster 312 receives the original image (e.g., image 410 of FIG. 4) from image storage 305 and the automatically calculated exposure value from the exposure calculator 310. The exposure adjustor 312 then reduces the brightness of every pixel in the image by a factor (M) based on the automatically calculated exposure adjustment sent to it from the exposure calculator 310. In some embodiments, the image is edited in a red, green, and blue color component format with the exposure adjustment adjusting the level of each color component. That is, in the applications of some embodiments, each pixel is stored as a set of red (r), green (g), and blue (b) values (a format called RGB) and the exposure adjustment multiplies the value of r, g, and b in each pixel by a fixed multiplier (M) to generate new values of r, g, and, b for that pixel as shown in equation (1).

$$(r_{new}, g_{new}, b_{new}) = (M*r_{old}, M*g_{old}, M*b_{old}) \quad (1)$$

In equation (1), $r_{new}$, $g_{new}$, and $b_{new}$ are the values of r, g, and b for a pixel in the adjusted image, $r_{old}$, $g_{old}$, and $b_{old}$ are the values of r, g, and b of the corresponding pixel in the original image, and M is the multiplier. This has the effect of adjusting the brightness of the image 117 upward if M is greater than 1 (corresponding to a positive exposure adjustment) and downward if M is less than 1 (corresponding to a negative exposure adjustment).

The adjustment is toward a darker image in the embodiment of FIG. 2 because non-negative exposure adjustments are skipped in the process 200. That is, for process 200, the adjustment (if it is performed at all) is toward a darker image, so M is less than 1. In other embodiments, the exposure adjustment might be skipped for negative exposure adjustments, rather than for non-negative exposure adjustments, or not skipped for either positive or negative exposure adjustments. In such embodiments, the value of M can be greater than 1 and still be performed by a process similar to process 200. The described embodiment adjusts the exposure in an RGB color format. However, other embodiments adjust the exposure in other color formats. An example of reduction in brightness can be seen in image 420 of FIG. 4, which is darker than original image 410.

2. White Balance Enhancement

After adjusting the exposure (or after skipping the exposure adjustment), the process 200 then determines (at 225) whether there are any faces in the image 420. In some embodiments, the white balance calculator 320 of FIG. 3 performs this search after receiving an adjusted image from exposure adjustor 312. In other embodiments, a separate module (not shown) is provided for searching images for faces. If the process 200 determines (at 225) that there are no faces in the image, then the process 200 skips the white balancing operation and proceeds to operation 240.

If the process 200 determines (at 225) that there are faces in the image, then the process 200 calculates (at 230) a white balance adjustment based on one or more faces found in the image. In some embodiments, the white balance calculator 320 begins to calculate the white balance adjustment by determining an average color of the faces in the image. The white balance calculator 320 then determines a distance and direction in a color-space between that average color and a preset color. The white balance calculation and adjustment is further described in relation to FIG. 10 in section I.E., below.

The process 200 then performs (at 235) the white balancing operation. In some embodiments, the white balance adjustor 322 (FIG. 3) moves the colors of most or all the pixels in the image in the direction of the calculated color difference passed to it from the white balance calculator 320. The results of a white balancing operation can be seen in image 430 of FIG. 4. Although the determination of the color shift is based on faces in this embodiment, the actual color shift is applied to all colored items in the image. That is, as image 430 (as compared to image 420) shows, all the colorful parts of the image have slightly changed colors, not just the faces.

3. Vibrancy Enhancement

Once the white balance operation has been performed (or skipped), the process 200 calculates (at 240) settings for increasing a vibrancy of the image 430. The vibrancy calculator 330 (FIG. 3) performs the calculations in some embodiments. The calculations in some embodiments are based on the adjusted image produced by the white balance adjustor 322. In some embodiments, the vibrancy calculator 330 begins by generating a histogram of the saturation of pixels in the adjusted image. The saturation of a pixel in some embodiments is defined as the difference between the highest color component value of the pixel and the lowest color component value of the pixel. The vibrancy calculator 330 then uses statistics from the histogram to determine an amount to increase the saturation level of the pixels. In some embodiments, the vibrancy calculator 330 also determines areas of the image that will not have their saturation increased. Vibrancy calculations and enhancements, including variations on the histogram, are described further in section III, below.

The process 200 then performs (at 245) the saturation adjustment. The vibrancy adjustor 332 performs the adjustment of the image received from the white balance adjustor 322, in some embodiments, based on vibrancy settings provided by the vibrancy calculator 330. Image 440 (of FIG. 4) shows the effects of vibrancy adjustment on the image 430. Specifically, the vibrancy adjustment increases the vibrancy of the colors of some or all areas of the image.

4. Luminance Curve Enhancement

After adjusting the vibrancy, the process 200 calculates (at 250) settings to adjust the luminance values of each of the pixels in the image with a tonal response curve (sometimes referred to as an "s curve"). The tonal response curve of some embodiments takes the luminance of each pixel of an input image and remaps it onto different values in an output image by darkening the dark pixels, lightening the light pixels and increasing the contrast of the mid-tone pixels. The luminance values of the image are changed according to a remapping curve that relates input luminance to output luminance. The curves calculator 340 (of FIG. 3) calculates the remapping curve in some embodiments based on the adjusted image received from the vibrancy adjustor 332. The curve calculations are described in more detail with respect to FIGS. 12-17 in section II, below.

After the remapping curve is calculated, the process 200 then performs (at 255) the remapping curve adjustment. The curves adjustor 342 performs the adjustment of the image received from the vibrancy adjustor 332. The adjustments in some embodiments are based on remapping curve settings provided by the curves calculator 340. Image 450 (of FIG. 4) shows the effects of the remapping curve adjustment on the image 440. The dark areas of image 440 are even darker in image 450. Similarly, the light areas of image 440 are lighter in 450 and the mid-tone areas have increased contrast.

5. Shadow Lift Enhancement

After the tonal response curve, the process 200 of some embodiments calculates (at 260) settings for a shadow lifting operation. In some embodiments, the shadow lifting calculations are performed by a shadow lift calculator 350 (of FIG. 3). The shadow lift calculator 350 bases the shadow lift calculations on an adjusted image received from the curves adjustor 342. The shadow lift calculator 350 of some embodiments generates a histogram that represents the structure of the adjusted image. In some embodiments, the shadow lift calculator 350 generates multiple histograms of different types. The shadow lift calculator 350 then uses statistics from the histogram(s) to automatically determine a setting for the shadow lift adjustor 352.

The process 200 then performs (at 265) the shadow lift adjustment. In some embodiments, the shadow lift adjustment is performed by the shadow lift adjustor 352. The shadow lift adjustor 352 generates a blurred version of the image it receives and performs a variable gamma adjustment of the received image based on the blurred image and on the setting it receives from the shadow lift calculator 350. In some embodiments, the shadow lift calculator performs some of these operations. The shadow lift calculations and the shadow lift adjustment are further described with respect to FIGS. 22-29 in section IV, below.

Image 460 (in FIG. 4) shows the combined effect of all the auto-enhancements. The dark areas of the image are more defined and more details are visible in them than in image 450.

6. Alternate Sequences

Figure 5:
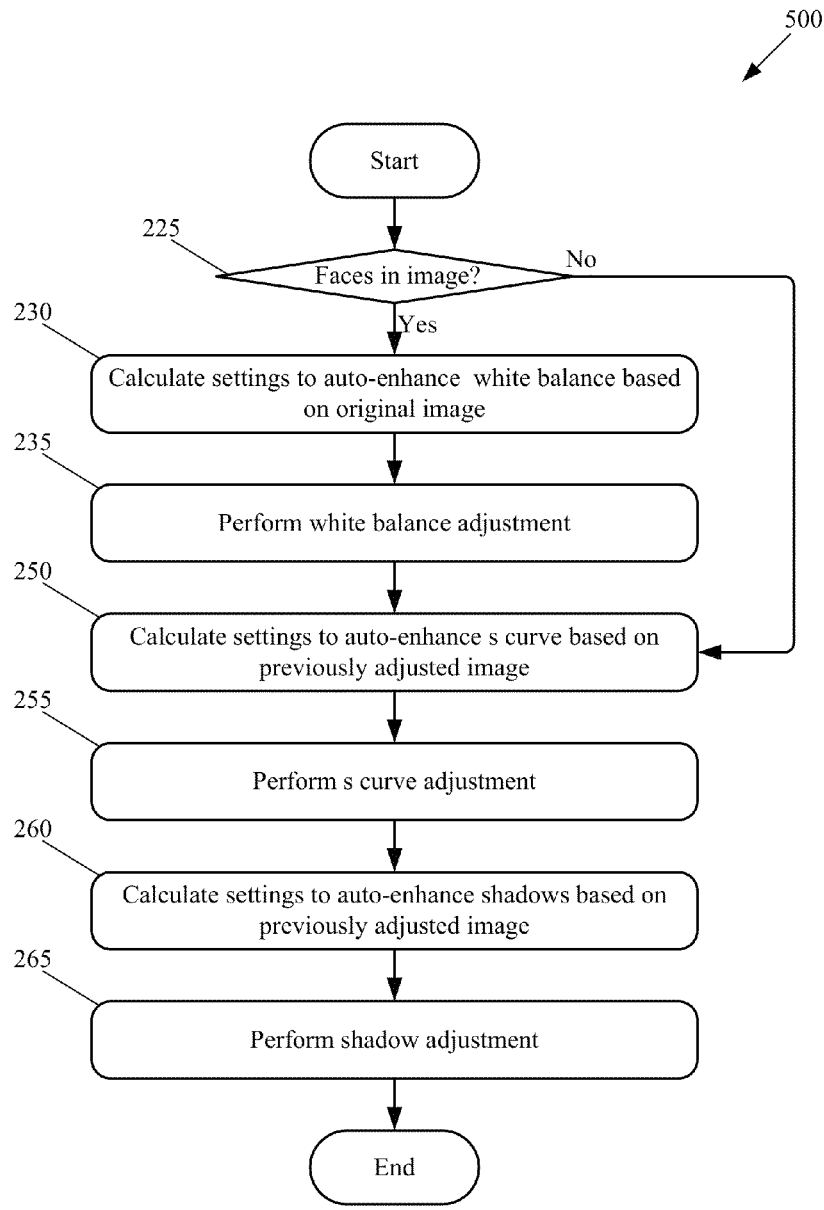
FIG. 5 conceptually illustrates a process of an alternate embodiment that performs a different set of image enhancements.

The above described sequence of auto-enhancement, in that specific order, is used by the applications of some embodiments. However, one of ordinary skill in the art will understand that in other embodiments, the described enhancements may be performed in other orders. Furthermore, some embodiments may perform a subset of the described automatic enhancement steps. FIG. 5 conceptually illustrates a process 500 of an alternate embodiment that performs a different set of image enhancements. The process 500 does not perform operations 205-220 or 240-245. Accordingly, the process 500 does not perform the exposure adjustment or vibrancy adjustment. The process 500 does perform operations 225-235 and 250-265. As in FIG. 2, in FIG. 5 operations 225-235 automatically calculate and perform a white balance adjustment if there are faces in the image. Operations 250 and 255 automatically calculate and perform tonal response curve adjustment. Operations 260 and 265 automatically calculate and perform a shadow lift adjustment.

C. Pre-Calculated Auto-Adjustments

As described above, the image editing application of some embodiments automatically enhances images in multiple sequential stages, each of which enhances the image in a different way. In the above described embodiments, each sequential stage is performed on an image that has already been adjusted by all of the previous stages. Furthermore, not only were the adjustments made sequentially, but the calculations that determined the automatic settings were also made sequentially. Each automatic setting was calculated based on the image as it was after it had been adjusted by all of the previous stages. In contrast, in some embodiments, the application automatically determines what settings to use for each of the stages based on the original image.

Figure 6:
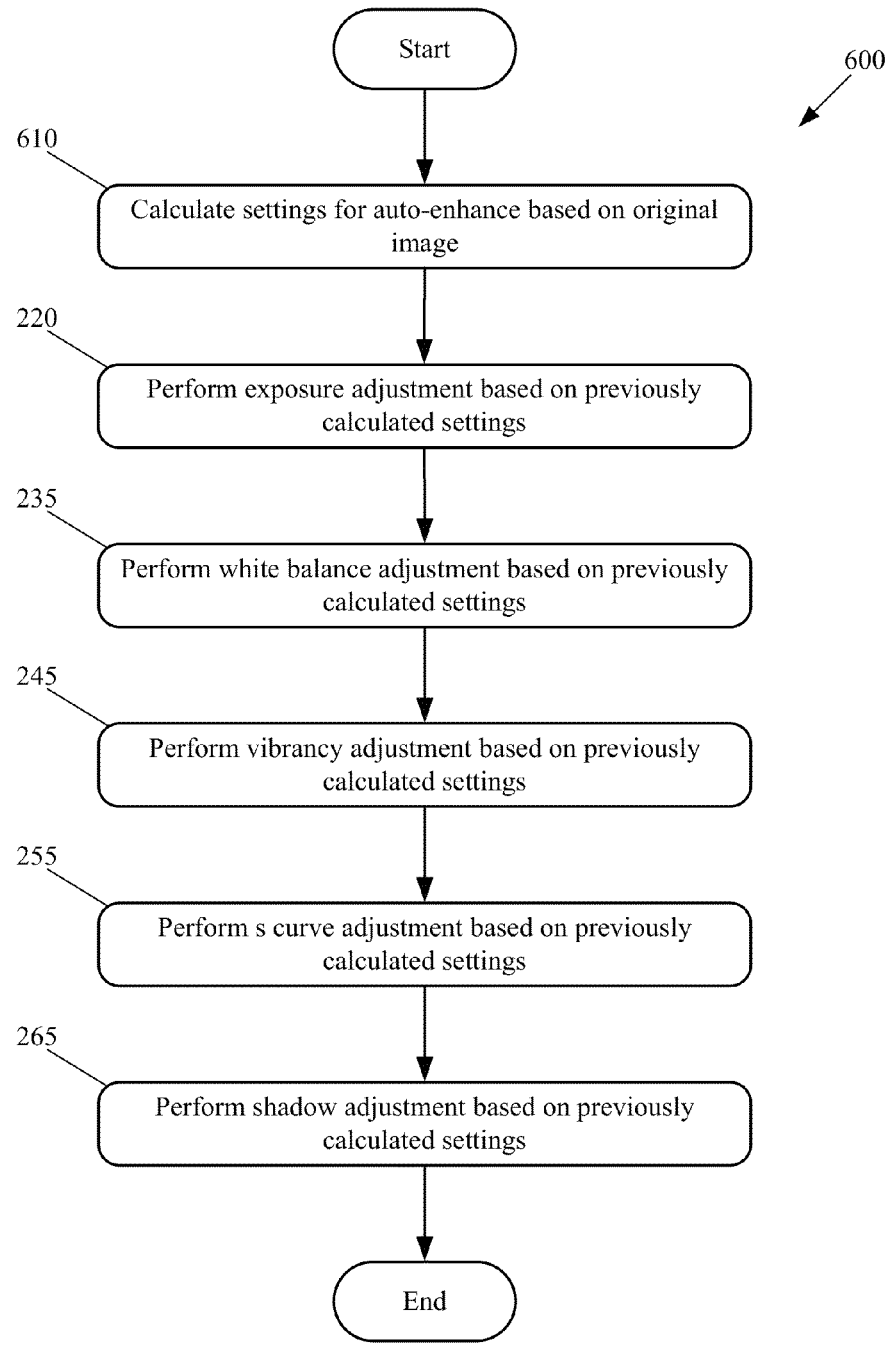
FIG. 6 conceptually illustrates a process that automatically enhances an image with automatic settings based on the original image.

FIG. 6 conceptually illustrates a process 600 that automatically enhances an image with automatic settings based on the original image. The process 600 performs many of the same operations as the process 200, where the operations are sufficiently similar, the operations will be referred to by reference to the operations of process 200 from FIG. 2. The process 600 calculates (at 610) all the settings to automatically apply at every stage of auto-enhancement. The calculations automatically determine, based on the original image, settings for an exposure adjustment, a color balance adjustment, a vibrancy adjustment, a luminance curve adjustment, and a shadow lift adjustment. After calculating the settings, the process then performs (at 220) an exposure adjustment. The process then performs (at 235) a white balance adjustment on the image. After the white balance adjustment, the process 600 performs (at 245) a vibrancy adjustment and then performs (at 255) a remapping curve adjustment. Finally, the process 600 performs (265) a shadow lift adjustment.

The process 600 performs the same type of enhancements as the process 200. However, one of ordinary skill in the art will understand that other embodiments are possible within the scope of the invention. For example, some embodiments provide an image editing and organizing application with a pre-calculating process that does not include the automatic adjustment of exposure. Additionally, the applications of some embodiments perform the adjustments in a different order.

D. Automatic Exposure Enhancement

As described above, the image editing and organizing applications of some embodiments perform auto-enhancements that include automatic exposure adjustments. The above described applications only automatically adjust the exposure under certain circumstances, such as when the calculated exposure value is negative and the image is a RAW image. The applications of some other embodiments place even more restrictions on use of the automatic exposure adjustment. For example, the applications of some embodiments determine whether or not to use automatic exposure adjustment based on whether the RAW image has extended data. Extended data is possible because RAW images are stored in a wider gamut than most processed images. Therefore, areas of an image that would be displayed as uniformly 100% pure white in a narrower gamut color space can have details in the RAW image format.

Figure 7:
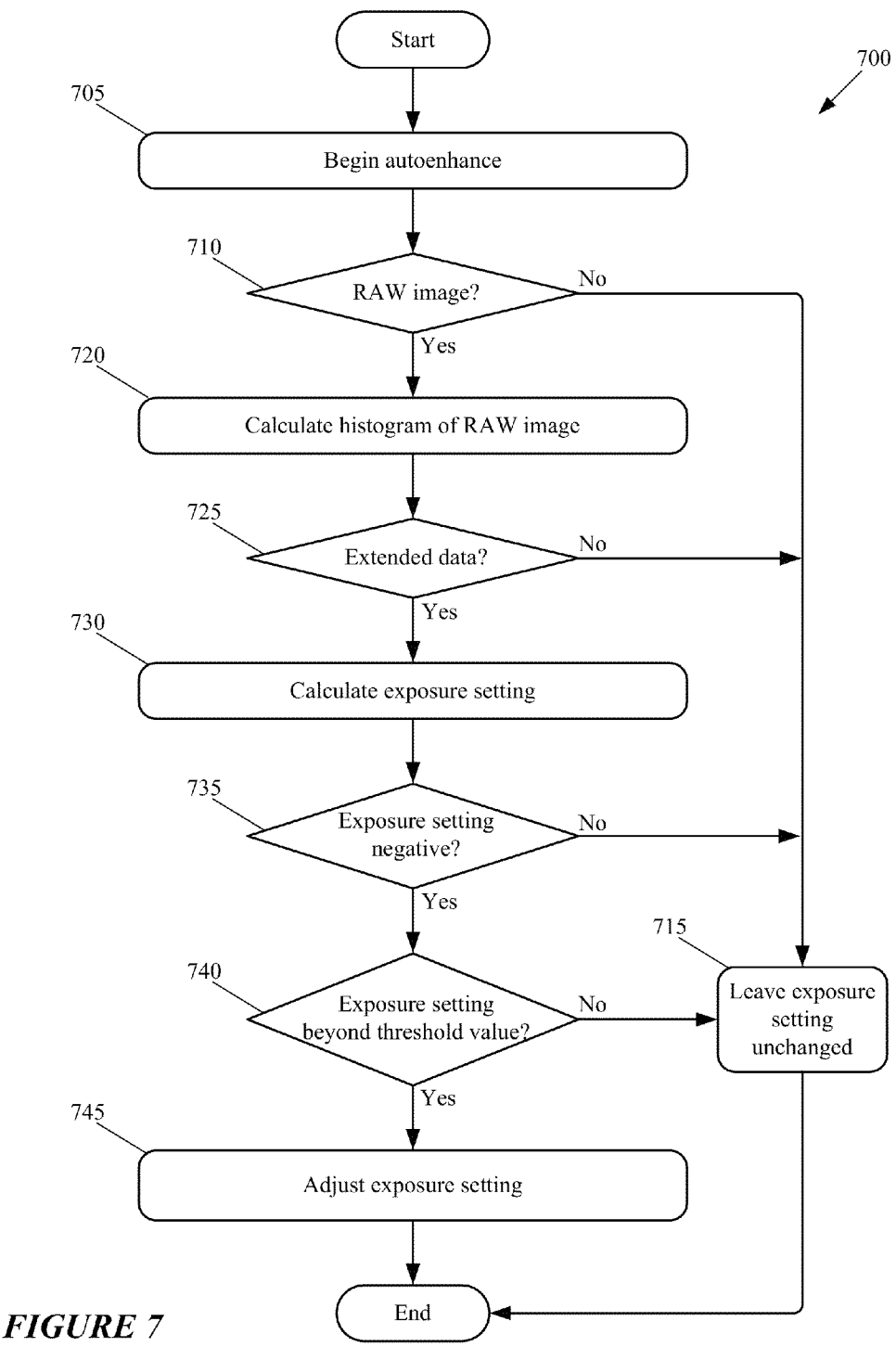
FIG. 7 conceptually illustrates a process for automatically adjusting the exposure of an image.
Figure 8:
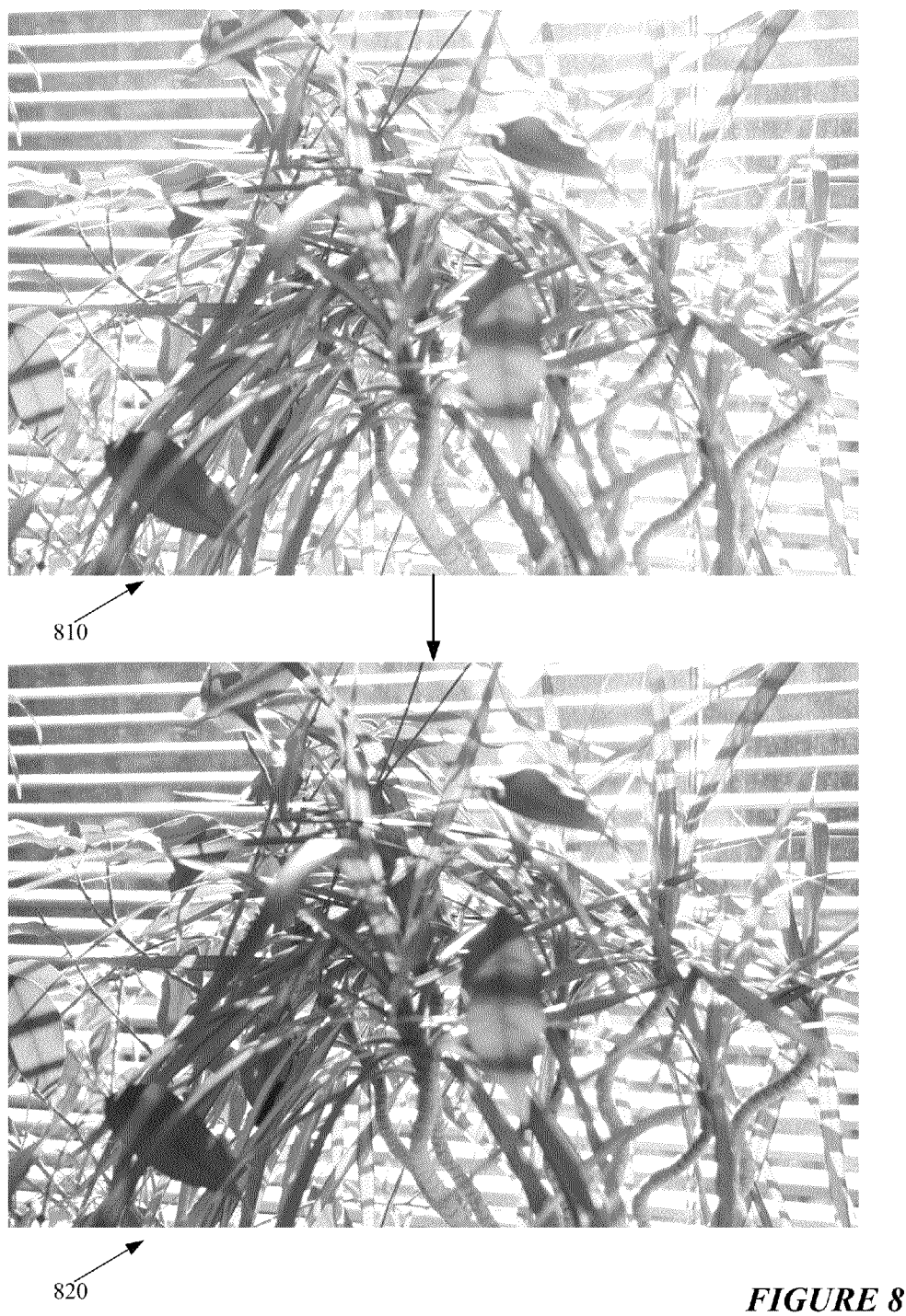
FIG. 8 shows two versions of a RAW image with extended data before and after an automatic exposure adjustment.

FIG. 7 conceptually illustrates a process 700 for automatically adjusting the exposure of an image. FIG. 7 will be described with respect to FIGS. 8 and 9 which will be described briefly now and in more detail in context. FIG. 8 shows two versions of a RAW image with extended data before and after an automatic exposure adjustment. The figure includes original image 810 and adjusted image 820. Original image 810 is a narrow gamut representation of a RAW image. Adjusted image 820 is another narrow gamut image, but represents the RAW image after its exposure has been reduced.

Figure 9:
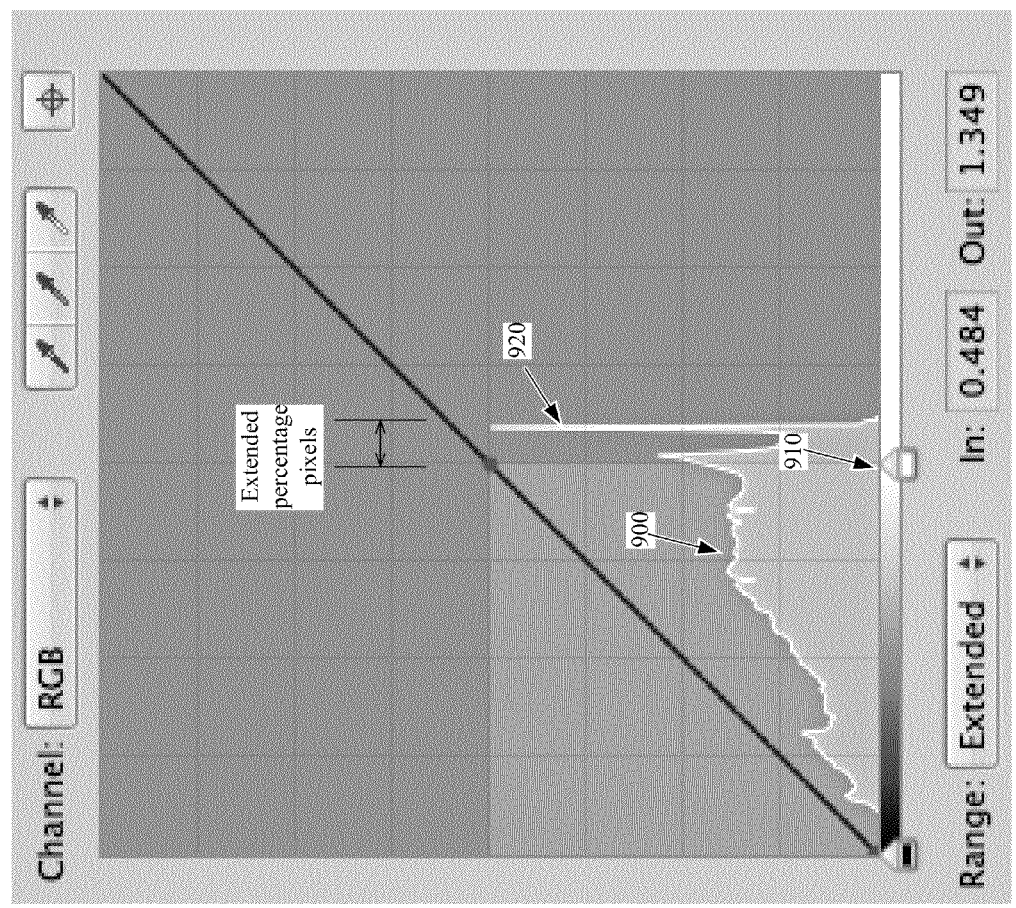
FIG. 9 illustrates a graph of a pixel brightness histogram of the RAW image represented by the original image of FIG. 8.

FIG. 9 illustrates a graph of a pixel brightness histogram 900 of the RAW image represented by original image 810 of FIG. 8. FIG. 9 includes the histogram 900, a white point 910, and an extended percentage of pixels 920. The histogram 900 is a graph with the brightness (e.g., luminance) of pixels on the x-axis and the number of pixels with that particular brightness on the y-axis. The white point 910 is the point along the x axis at which the standard range ends. The extended percentage of pixels 920 includes pixels that are brighter (i.e., have higher numerical value) than the white point. In the display of the original image 810, all the pixels at or beyond the white point are shown as 100% luminance (i.e., pure white pixels).

The process 700 begins (at 705) to automatically enhance the image. The process 700 determines (at 710) whether the image is a RAW image. If the image is not a RAW image then the process 700 leaves (at 715) the exposure setting unchanged and ends. If the image is a RAW image, then the process 700 calculates (at 720) a histogram of the RAW image. As mentioned above, original image 810 of FIG. 8 is a narrow gamut representation of a RAW image. Histogram 900 of FIG. 9 is a histogram of that RAW image. Pixels in the extended percentage of pixels 920 area of the histogram are represented as pure white pixels in the original image 810. Any detail in the data representing the pixels in the extended range is not shown in original image 810 because all pixels in that range are shown in original image 810 as uniformly white.

The applications of some embodiments, when performing a multistage auto-enhancement, automatically change the exposure level only when there are pixels in the extended range. Process 700 determines (at 725) whether there are pixels in the extended data range. If there are no pixels in the extended data range, then the process 700 goes to operation 715, leaving the exposure setting unchanged, and then ends.

If there are pixels in the extended data range, then the process 700 calculates (at 730) an exposure setting. To calculate the exposure setting, the application of some embodiments determines an average luminance of the pixels in the image. The application then compares the luminance to a target luminance (e.g., 50% of the maximum possible luminance). If the average luminance is lower than the target luminance, then the application determines a change in the exposure value that will raise the average luminance of the image toward the target value. In contrast, if the average luminance is higher than the target luminance, then the application determines a change in the exposure value that will lower the average luminance toward the target luminance. Some embodiments use methods for calculating exposure values as described in U.S. Patent Application entitled "Tempered Auto-Adjusting, Image-Editing Operation" filed Jun. 10, 2012 with Ser. No. 61/657,794, and in concurrently filed U.S. Patent Application 13/629,504, now published as US 2013/0332866, entitled "Tempered Auto-Adjusting, Image-Editing Operation". Both of these Applications are incorporated herein by reference.

Once an exposure value is calculated, the process determines (at 735) whether the exposure value is negative and determines (at 740) whether the exposure value is beyond a particular threshold value (e.g., whether the calculated exposure value is less than −0.005). If the exposure value is positive then the exposure value setting is left (at 715) unchanged and the process ends. Similarly, if the exposure value is negative, but not negative enough to be beyond the threshold value then the exposure value is left (at 715) unchanged. If the exposure value is negative and less than the threshold value then the process 700 adjusts (at 745) the exposure setting (downward). The result of such a reduction in exposure value setting can be seen in adjusted image 820 of FIG. 8. In adjusted image 820, areas that contained blown out white pixels now show more details and the pure white areas have been reduced to smaller highlights. That is, the detail that was there in the extended range data, but not visible in original image 810 has been made visible in adjusted image 820.

One of ordinary skill in the art will understand that the conditional determinations as shown in FIG. 7 can be performed in other ways and in other orders in other embodiments. For example, in some embodiments, multiple conditional statements are made together. For instance, in some embodiments the application combines operations 735 and 740 and simply determines whether the calculated exposure value is less than a particular negative value rather than separately checking whether the calculated exposure value is negative and then whether it is less than that value.

Additionally, some embodiments may make some determinations implicitly, rather than using an explicit conditional statement. For example, the determination shown as operation 725 may be made implicitly. That is, some embodiments automatically generate an exposure value of zero (which does not change the input image) as a consequence of the lack of data in the extended data range. For example, some embodiments generate an exposure value (e.g., as in operation 730) and use an equation such as equation (2) to modify the exposure value calculated in operation 730.

$$\text{final\_exposure} = \min(1.0, 3.0 * \text{extended\_Percent}) * \text{original\_exposure} \qquad (2)$$

In equation (2), "original_exposure" is an initial exposure value setting as calculated by the application (e.g., using the methods of U.S. Provisional Patent Application 61/657,794). "Extended_Percent" is the percentage of pixels that are in the extended data range (e.g., the pixels represented by the extended percentage of pixels 920 in FIG. 9). "Final exposure" is the exposure setting used in operation 745 to adjust the image. The use of equation (2) ensures that if there is no extended range data, that the exposure adjustment will be zero because if "extended_Percent" is zero then "final_exposure" is zero. In some embodiments, rather than the percentage of pixels in the extended data range, the "extended-Percent" represents the percentage by which the highest luminance pixel exceeds the non-extended range scale. Equation (2) sets the final exposure value setting to be either smaller or equal in magnitude to the initially determined exposure value setting.

E. Automatic White Balance Enhancement

The image editing and organizing application of some embodiments performs automatic white balancing operations. The application of some embodiments performs a white balancing operation only if there are faces in the image. In some embodiments, the application converts the image into a different color space from the original color space of the image, performs the color adjustments in the different color space, then converts back to the original color space.

Figure 10:
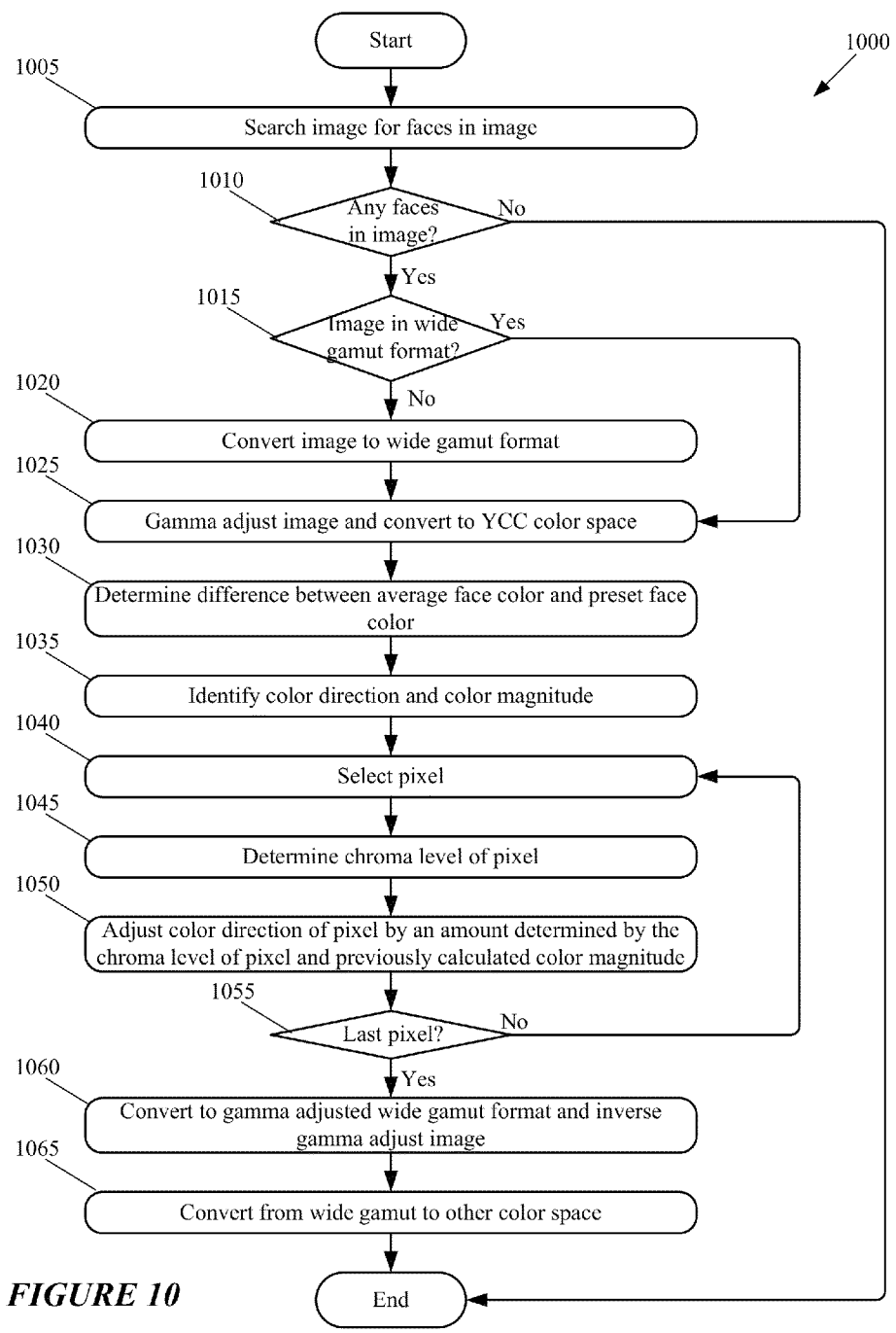
FIG. 10 conceptually illustrates a process of some embodiments for performing white balancing operations on images.

FIG. 10 conceptually illustrates a process 1000 of some embodiments for performing white balancing operations on images. The process 1000 automatically performs a white balancing operation based on faces in an image (if any). The process 1000 begins by searching (at 1005) the image for faces. In some embodiments, this searching is performed by standard face searching techniques. The process then determines (at 1010) whether any faces have been found in the search. If no faces have been found in the image the process 1000 ends (and in some embodiments, the next auto enhancement operations will be performed). On the other hand, if a face is found in the image, then the process 1000 determines (at 1015) whether the image is in a wide gamut format or not. If the image is not in a wide gamut format the process 1000 converts (at 1020) the image into a wide gamut format. In some embodiments, the wide gamut format is a wide gamut RGB format, while in other embodiments, it is in some other formats. If the image is determined (at 1015) to be in a wide gamut format the process skips operation 1020 to go directly to operation 1025.

The process 1000 then performs (at 1025) a gamma adjustment on the image by taking each color component value of each pixel in the image and raising it to the power of 1/n, where n is a number. In some embodiments, "n" is equal to 4. In other embodiments, other numbers are used. Some embodiments use equation (3) to perform the gamma adjustment.

$$(r_{new}, g_{new}, b_{new}) = (r_{old}^{\wedge} 1/4, g_{old}^{\wedge} 1/4, b_{old}^{\wedge} 1/4) \qquad (3)$$

In equation (3), $r_{new}$, $g_{new}$, and $b_{new}$ are the values of r, g, and b for a pixel in the gamma adjusted image. In equation (3), $r_{old}$, $g_{old}$, and $b_{old}$ are the values of r, g, and b of the corresponding pixel in the input image.

The process then converts (also at 1025) the gamma adjusted image to an opponent color space (sometimes called a YCC space) that includes a luminance component and two color components (e.g., a YIQ color space). After converting to the YCC color space, the process then determines (at 1030) in the YCC color space the difference between the average face color of the image (e.g., the average color of the faces found in operation 1005) and a preset face color. The process then identifies (at 1035) a vector in color space from the average face color to the preset face color. The vector in color space has a direction in the color space and a magnitude in the color space that spans the difference between the average face color and the preset face color.

Once the color direction and magnitude are set, the process selects (at 1040) a pixel in the input image. The process determines (at 1045) the chroma level of the pixel. The process adjusts (at 1050) the color of the pixel in the previously determined direction and by an amount that is determined by the chroma level of the pixel (e.g., larger chroma values of the input pixel result in larger color shifts when generating the output pixel) and the magnitude determined in operation 1035. In some embodiments, pixels with zero chroma levels in the input image (e.g., gray, white, and black pixels) do not have their colors changed. In some embodiments, the magnitude of the adjustment for some pixels is capped at the magnitude determined in operation 1035, regardless of the chroma level of the pixel before adjustment.

Once the selected input pixel has been color shifted (or has been through the color shifting process with a zero color shift, such as a gray input pixel), the process determines (at 1055) whether the selected pixel was the last pixel in the image (i.e., whether all pixels have been through the color shifting process). If the selected pixel was not the last pixel in the input image, then the process 1000 loops back to operation 1040 to select the next pixel. If the process 1000 determines (At 1055) that the selected pixel was the last pixel, then the process converts (at 1060) the image back into the wide gamut format and performs an inverse gamma operation on the image, such as equation (4).

$$(r_{new}, g_{new}, b_{new}) = (r_{old}^{\wedge} 4, g_{old}^{\wedge} 4, b_{old}^{\wedge} 4) \qquad (4)$$

In equation (4), $r_{new}$, $g_{new}$, and $b_{new}$ are the values of r, g, and b for a pixel in the inverse gamma adjusted image, $r_{old}$, $g_{old}$, and $b_{old}$ are the values of r, g, and b of the corresponding pixel in the image that has just been adjusted (in the YCC format). One of ordinary skill in the art will understand that the value of 4 for the inverse gamma power is only an example, and is used here as the inverse of the original gamma value in the example equation (3). Other gamma and inverse gamma values are possible in some embodiments. Furthermore in alternate embodiments, the inverse gamma value may not be the exact inverse of the original gamma value (e.g., to have the same effect as a gamma adjustment to the final image). In some embodiments, the process 1000 then converts (at 1065) the image to some other color space (e.g., back to the original color space of the image). For example, if the image was originally a non-wide gamut RGB image, the process 1000 of some embodiments converts it back to that RGB format before ending. More details on the white balancing operations using faces can be found in U.S. patent application Ser. No. 13/152,206 entitled "Image Content-Based Color Balancing", U.S. Provisional Patent Application 61/657,795 entitled "Color Balance Tools for Editing Images" filed Jun. 10, 2012, concurrently filed U.S. patent application Ser. No. 13/629,529, now published as US 2013/0329994 entitled "Color Balance Tools for Editing Images" filed Sep. 27, 2012, concurrently filed U.S. patent application Ser. No. 13/629,480, now issued as U.S Pat. No. 8,885,936, entitled "Automated Color Balance Tools for Editing Images", and in concurrently filed U.S. patent application Ser. No. 13/629,496, now publish as US 2013/0328906, entitled "Gray Color Balance Tools for Editing Images". All of the above-mentioned Applications are incorporated herein by reference.

While the application of the above described embodiments adjusts the white balance only if there are faces in the image, in other embodiments, the white balance is automatically adjusted whether or not there are faces in the image. In some such embodiments, the application uses a gray edge assumption to perform a color balancing operation, either as an alternative to or in addition to performing white balancing operations.

In the gray edge assumption, the application uses the assumption that the edges of objects are more likely to reflect the color of the light than the general surface of the objects. The application of some embodiments therefore determines an average color of the edges of the objects in the image and shifts the colors of all the pixels in the image in such a way as to move the average color of the edges toward gray. In some embodiments, the application tempers the color shift in accordance with the luminance of the pixel. For example, in some embodiments, the color shifts for darker pixels are less than the color shifts for lighter pixels. In other embodiments, the color shifts for medium luminance pixels are greater than the color shifts for either very dark or very bright pixels.

The tempering of the color shift based on luminance of the pixels is different from the tempering used in the skin tone based white balancing operation which uses the chroma values of the pixels to temper the color adjustment. Unlike the skin tone based white balance operation, the gray edge assumption of some embodiments does not preserve existing grays. That is, a skin tone based white balance leaves existing grays as grays, while a gray edge assumption based white balance operation shifts the colors of gray pixels as well, in some embodiments. However, in other embodiments, the gray edge based white balance operation may use chroma values of the pixels to temper the color adjustments and thus preserve existing grays.

The application of some embodiments performs the gray edge based white balance operation during an auto-enhancement operation only when there are no faces in the image. Applications of other embodiments perform gray edge based white balance operations even when there are faces in the image. Applications of still other embodiments may perform multiple white balance operations in one auto-enhancement operation, such as performing a gray edge based white balance operation followed by a skin tone based white balanced operation. Furthermore, some embodiments may use a gray world assumption rather than or in addition to using a gray edge assumption. A gray world assumption based white balance operation determines an average color of the entire image instead of an average color of the edges. The operation then adjusts the colors of the pixels to move the average color of the entire image toward gray. In some embodiments, the color shift in a gray world based white balance operation is also tempered based on the luminance values of the pixels.

F. Automatic Control Settings

Figure 11:
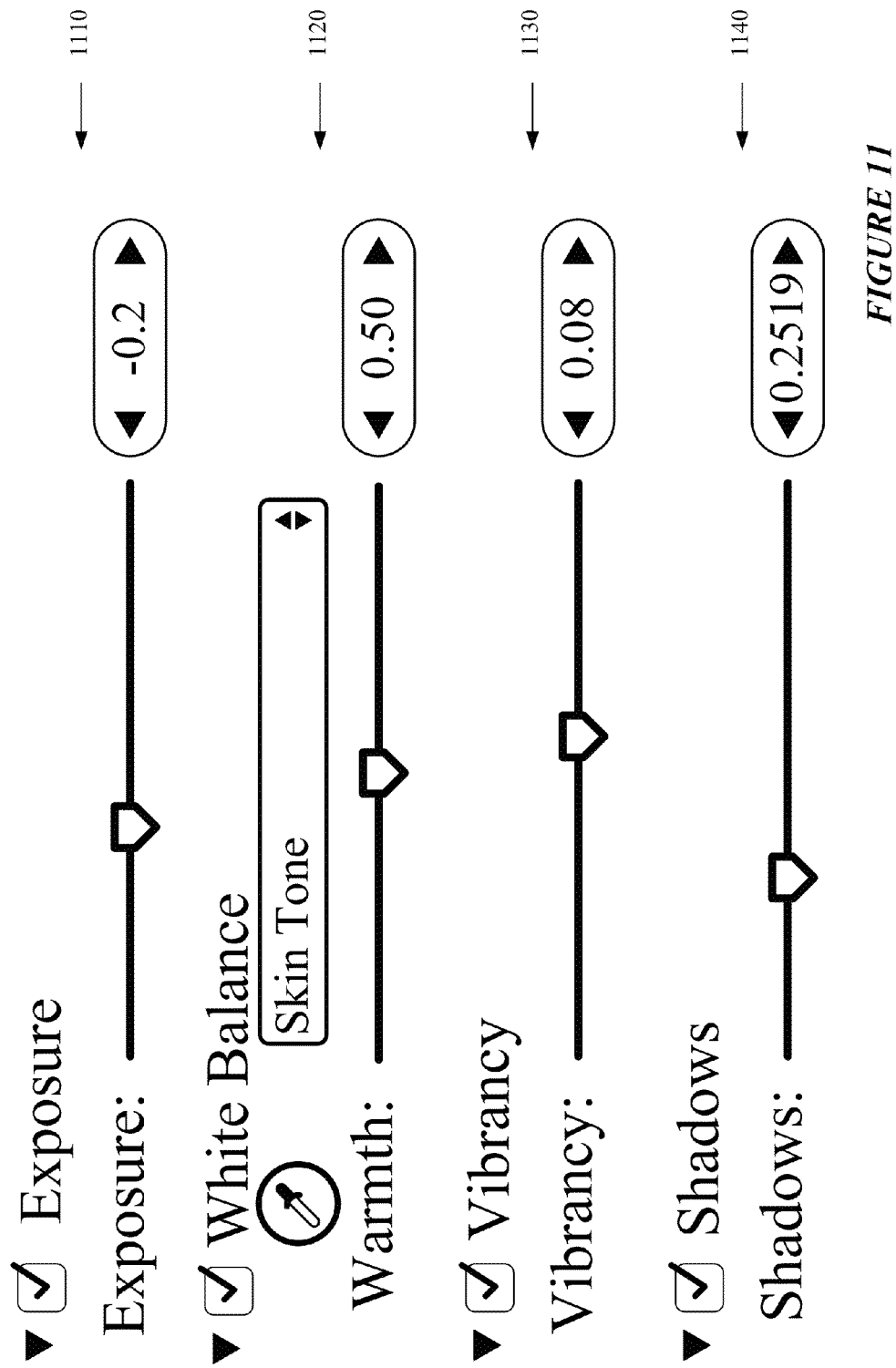
FIG. 11 illustrates controls of some embodiments set after an automatic enhancement operation.

In some embodiments, when setting the automatic enhancement levels of the various automatic enhancement stages, the application also sets enhancement controls to levels matching the levels of the automatic enhancements. FIG. 11 illustrates controls of some embodiments set after an automatic enhancement operation. For space considerations, the figure contains controls for only four of the listed stages. In the application of some embodiments, the controls for the tonal response curves are images of the tonal response curves, such as will be shown in FIG. 17, in section II.B., below.

In some embodiments, the various points of the tonal response curve can be adjusted manually. FIG. 11 includes exposure controls 1110, white balance controls 1120, vibrancy controls 1130, and shadow lift controls 1140. The exposure controls 1110 allow a user to set the exposure value manually, including changing the automatically set exposure value. The white balance controls 1120 allow a user to set the white balance manually, including changing the automatically selected face areas and changing the warmth of the white balance adjustment. The vibrancy controls 1130 allow a user to set the vibrancy setting manually, including changing the automatically set vibrancy setting. The shadow lift controls 1140 allow a user to set the shadow lift manually, including changing the automatically set shadow lift setting. In some embodiments, each of the controls 1110-1140 is set automatically to a setting or settings that reflect the automatic adjustments that have been made in the automatic enhancement stages corresponding to that control. However, the application of some embodiments leaves one or more controls in a neutral, default position (e.g., a central position), despite any automatic changes to the image based on the enhancement(s) set by those controls. Such controls are left in the default position to give the user a full range of options for further modifications of the image. For example, in the application of some embodiments, the white balance warmth control (in control set 1120) is left at the center of its range in order to allow the user to increase or decrease the warmth without being limited by the preceding automatic adjustment.

II. Tonal Response Curves

Figure 12:
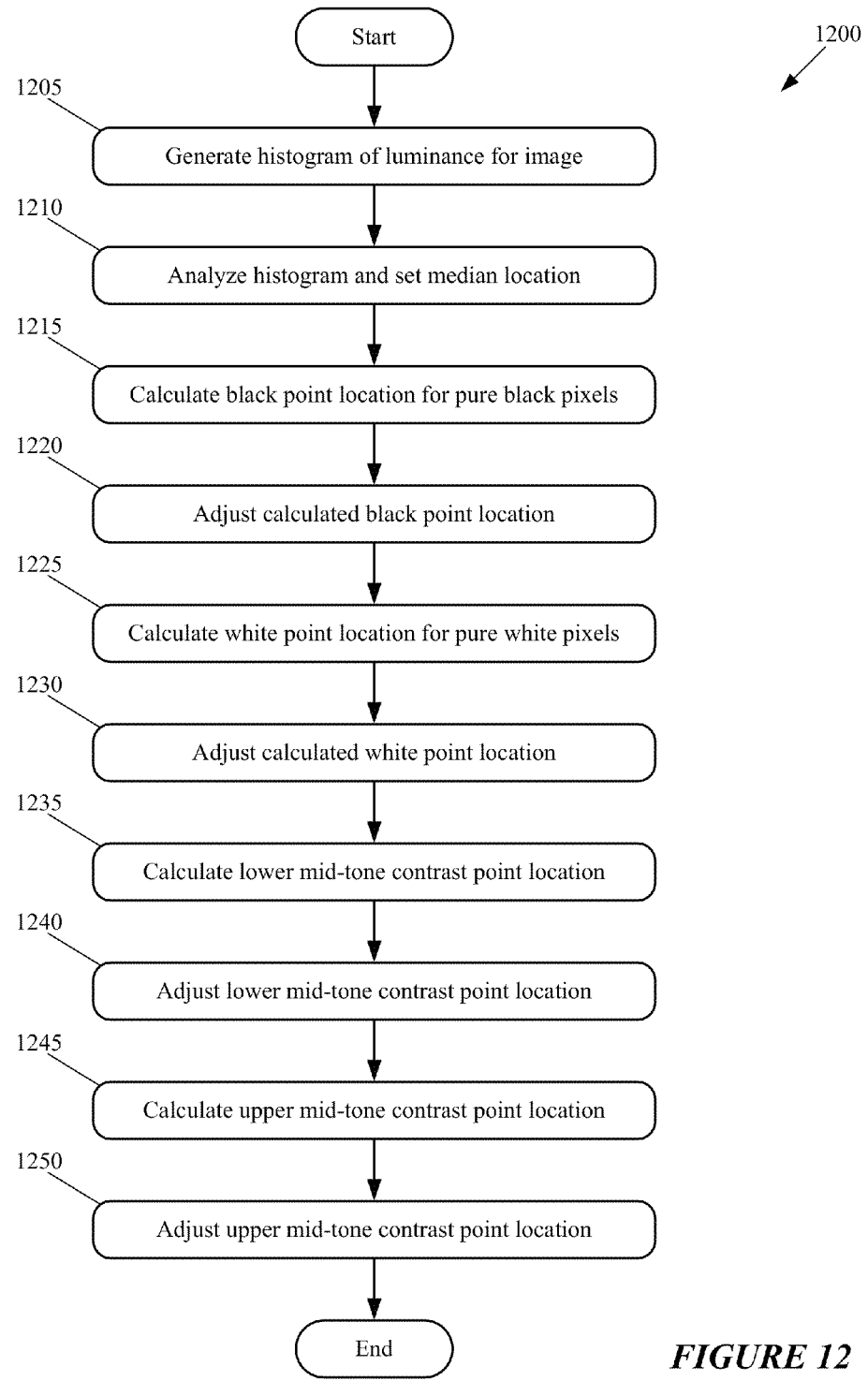
FIG. 12 conceptually illustrates a process of some embodiments for automatically setting locations along the x-axis for points that define tonal response curves which will be used in automatic enhancement of an image.

Tonal response curves themselves are known in the art, but the known art does not produce such curves automatically in the manner of the application of some embodiments. The application of some embodiments uses tonal response curves to selectively adjust the luminance of the various pixels in an input image. The tonal response curves remap the luminance of pixels in an input image to new luminance values in the pixels of an output image. FIGS. 12-17 will be used to describe the automatic production of the tonal response curves of some embodiments. For convenience, the x-axis coordinates of points may be referred to herein as "locations" while the y-axis coordinates of points may be referred to as "values". FIG. 12 conceptually illustrates a process 1200 of some embodiments for automatically setting locations along the x-axis for points that define tonal response curves which will be used in automatic enhancement of an image. FIG. 14 conceptually illustrates a process 1400 of some embodiments for automatically setting the values along the y-axis for points that define the tonal response curves which will be used in automatic enhancement of an image. FIG. 12 will be described in relation to FIG. 13, which will be briefly described first.

A. Setting the x-Axis Locations of Tonal Response Curve Points

Figure 13:
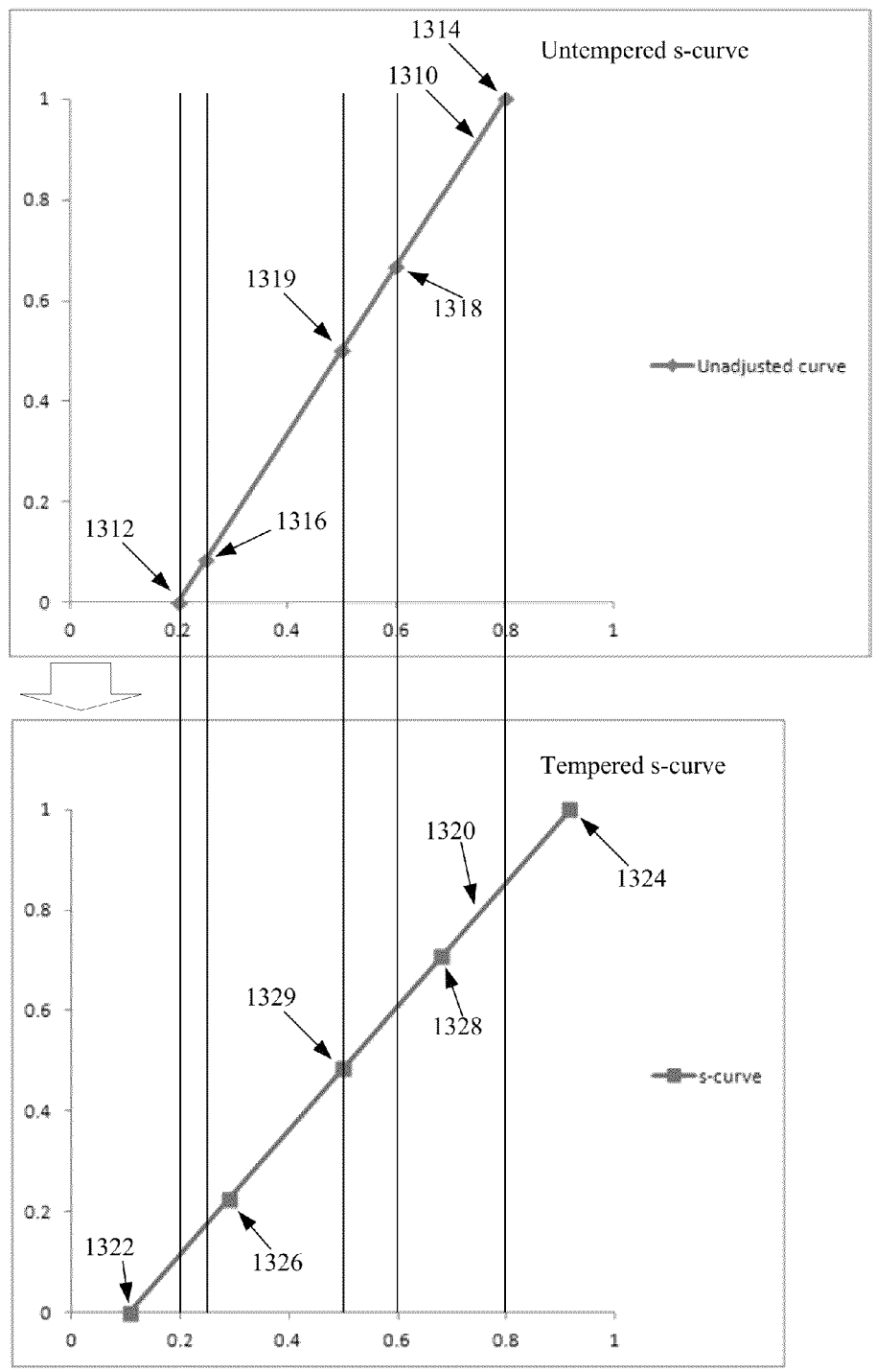
FIG. 13 illustrates two curves for remapping luminance values of an image.
Figure 14:
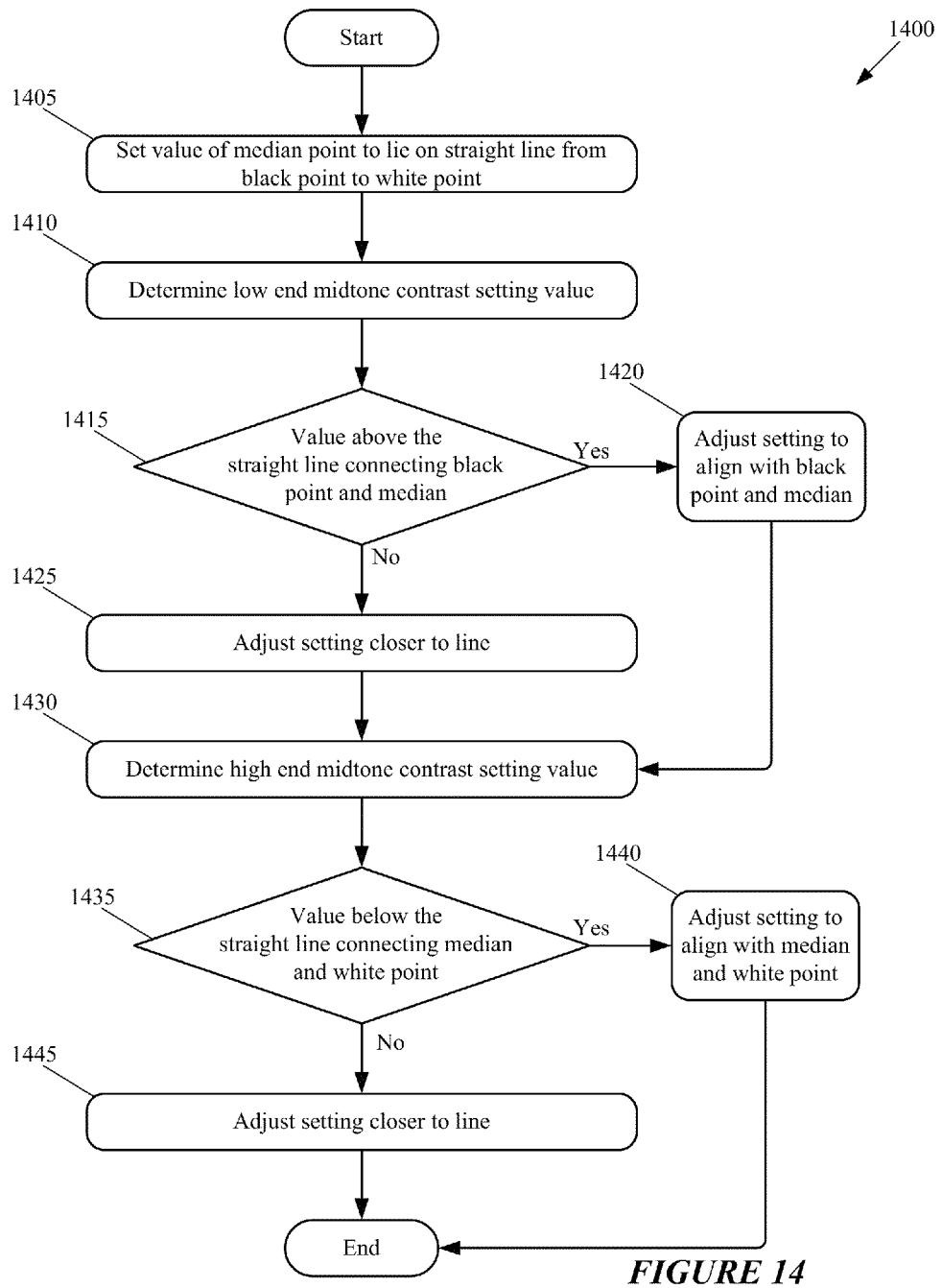
FIG. 14 conceptually illustrates a process of some embodiments for automatically setting the values along the y-axis for points that define the tonal response curves which will be used in automatic enhancement of an image.

FIG. 13 illustrates two curves for remapping luminance values of an image. The figure shows a contrast between a curve with untempered settings and a curve with tempered settings. FIG. 13 includes curves 1310 and 1320. Curve 1310 includes black point 1312, white point 1314, lower mid-tone contrast point 1316, upper mid-tone contrast point 1318, and median point 1319. Curve 1320 includes black point 1322, white point 1324, lower mid-tone contrast point 1326, upper mid-tone contrast point 1328, and median point 1329.

Curves 1310 and 1320 conceptually illustrate remapping functions to be applied to an image (e.g., to luminance values of the image) by the image editing and organizing application of some embodiments. The curves map the luminance values of pixels of an input image (represented by locations along the x-axes of the graphs containing the curves) to luminance values of corresponding pixels of an output image (represented by values along the y-axes of the graphs containing the curves). For example, if a pixel in an image has a luminance of 0.2 (or below) then remapping that image using curve 1310 would remap that pixel to a luminance of 0 (i.e., the corresponding value along the y-axis on the curve 1310). Similarly, remapping a pixel with a luminance of 0.2 using remapping curve 1320 would remap that pixel to a pixel with a luminance value of approximately 0.1.

When tonal response curve 1310 is applied to an input image, any pixels in that input image with a luminance level at or less than (to the left of) the location of black point 1312 are remapped (in the output image) to luminance zero (black). The black point 1312 is automatically given a value of zero along the y-axis and a location along the x-axis determined by the histogram of the image. Similarly, any pixels in the input image with a luminance at or more than (to the right of) the location of white point 1314 are remapped (in the output image) to luminance one (white). The white point 1314 is automatically given a value of one along the y-axis and a location along the x-axis determined by the histogram of the image.

The lower mid-tone contrast point 1316, the median point 1319, and the upper mid-tone contrast point 1318 together affect the shape of the curve 1310 between the black point 1312 and the white point 1314. The shape of the curve in turn determines how the intermediate luminance values (values between the locations of the black point 1312 and the white point 1314) of an input image will map to luminance values in an output image. For curve 1310, the mid-tone contrast points 1316 and 1318 and the median point 1319 are aligned with the black point 1312 and white point 1314, making curve 1310 a straight line. The straight line of tonal response curve 1310 means that the output image luminance of a pixel of an intermediate luminance value is a linear function of the luminance of the corresponding input pixel. The difference between the luminance values of any two intermediate luminance pixels in the output image will be a fixed multiple of the difference between the luminance values of the corresponding two pixels in the input image. In some embodiments, the fixed multiple is the slope of the curve (e.g., curve 1310 or 1320).

Like the black point 1312, the black point 1322 of tonal response curve 1320 defines a cutoff point. Pixels in an input image with luminance values to the left of the black point 1322 are remapped in the output image to luminance zero (i.e., black pixels) when tonal response curve 1320 is applied to them. The black point 1322 has a location along the x-axis that is adjusted from the location of black point 1312, while maintaining the value "zero" along the y-axis. The white point 1324 defines a second cutoff point. Pixels in an input image with luminance values to the right of the white point are remapped in the output image to luminance one (i.e., white pixels) when tonal response curve 1320 is applied to them. The white point 1324 has a location along the x-axis that is adjusted from the location of the white point 1314, while maintaining the value "one" along the y-axis. Similar to what is described above with respect to the points of curve 1310, the lower mid-tone contrast point 1326, the median point 1329, and the upper mid-tone contrast point 1328 together affect the shape of the curve 1320 between the black point 1322 and the white point 1324.

1. Setting the Black Point and White Point Locations

The locations along the x-axis of the black point 1322 and white point 1324 of curve 1320 are determined using process 1200 of FIG. 12. The process 1200 begins by generating (at 1205) a histogram of luminance values for an input image. The histogram can be represented as bins of possible luminance locations along the x-axis and counts of the number of pixels in each bin along the y-axis.

The histogram is analyzed (at 1210) for statistics. In some embodiments, the statistics include the location (along the x-axis) of five particular percentiles of pixels. In some embodiments, the process 1200 determines the 0.1, 25, 50, 75, and 99.9 percentile luminance values of the pixels in the input image. For example, the 0.1 percentile (e.g., the darkest 0.1% of pixels) in an image having 1 million pixels would encompass the 1,000 darkest pixels of the image, the $25^{th}$ percentile encompasses the 250,000 darkest pixels, the $50^{th}$ percentile encompasses the 500,000 darkest pixels, the $75^{th}$ percentile includes the 750,000 darkest pixels, and the 99.9 percentile includes the 999,000 darkest pixels (or alternatively, the 99.9 percentile level has 1000 pixels brighter than that level).

The percentiles are not the same as the percentage of the possible luminance values. It is possible for the 1000 darkest pixels in an image to all be at the lowest possible value for luminance (e.g., zero), to be spread out from the lowest possible level to some other level (e.g., spread over 20% of the available luminance range), or even to be entirely found at levels above the minimum possible level. In some embodiments, when analyzing (at 1210) the histogram, the process 1200 sets the location of the median point (e.g., median point 1319, shown in FIG. 13) to the $50^{th}$ percentile point of the histogram. In some embodiments, the location of the median point is then left unchanged (e.g., as is median point 1329 in FIG. 13). Although the above described embodiments use the 0.1, 25, 50, 75, and 99.9 percentile locations in the histogram as their particular percentiles for setting points on the tonal response curve, in other embodiments, other percentiles are used.

After the histogram of an input image is analyzed to determine the five particular percentile levels and the median point, a black point is calculated (at 1215) at the location of the lowest of the particular percentiles (e.g., the 0.1 percentile). For example, if the 0.1 percentile of the histogram is at location 0.2 along the x-axis, then the black point is set to a location of 0.2. This example is shown in FIG. 13 as black point 1312 of remapping curve 1310. If the input image were remapped with curve 1310, then the 0.1 percentile of the pixels (all those at or below 0.2 luminance in the input image) would be remapped in the output image to luminance zero (darkest possible black).

However, for some images, there may be a reason why there are so few very dark pixels in the image (before remapping). For example, a foggy scene may result in an image with few very dark pixels. Accordingly, the applications of some embodiments temper the black point. Tempering the black point reduces the number of truly black pixels in the output image. This is accomplished by conceptually moving the black point to a location on the x-axis to the left of where the original histogram percentile puts it. Therefore, process 1200 adjusts (at 1220) the black point leftward. The application of some embodiments multiplies the location of the black point by a factor (of less than one) that is determined by a statistic from the histogram (e.g., from the 0.1 percentile location itself). Some embodiments use equation (5) to adjust the black point leftward.

$$black\_point = 0.75*(1.0 - 0.65*histogram\_black\char`^0.5)*histogram\_black \quad (5)$$

In equation (5) "histogram_black" is the location of the lowest of the particular determined percentile levels, while "black_point" is the location on the x-axis of the adjusted black point. Black point 1322 of FIG. 13 is the adjusted black point corresponding to a "histogram_black" value of 0.2. If the image were remapped with curve 1320, then not all of the 0.1 percentile of the pixels would be mapped to the luminance zero (darkest possible black). As a result of moving the black point, only those pixels with an input luminance less than about 0.106 (as calculated by equation (5)) will be mapped to luminance zero (darkest possible black).

Like the calculation of an initial black point (at 1215), the process 1200 of some embodiments calculates (at 1225) an initial white point based on the histogram (e.g., the 99.9 percentile location). For example, if 99.9% of the pixels in an image have a luminance less than 0.8, then the initially calculated white point will be 0.8. This example is shown in FIG. 13 as white point 1314 of remapping curve 1310. If the image were remapped with curve 1310, then the top 0.1% of the pixels (all those at or above 0.8 luminance in the input image) would be mapped to luminance one (brightest possible white).

However, there may be a reason why there are so few very bright pixels in the image (before remapping). For example, an indoor scene at night may result in an image with few very bright pixels. Accordingly, the applications of some embodiments temper the white point. Tempering the white point reduces the number of pure white pixels in the output image. This is accomplished by conceptually moving the white point to the right. Therefore, process 1200 adjusts (at 1230) the white point rightward. The application of some embodiments multiplies the distance of the white point from the maximum end of the luminance scale by a factor (of less than one) that is determined by a statistic from the histogram (e.g., from the 99.9 percentile location itself). Some embodiments use equations (6A)-(6B) to adjust the white point upwards.

$$\text{white\_distance}=0.5*\min(1,\max(0.6,1.0-0.8*(1-\text{his-to\_white})))*(1-\text{histo\_white}) \quad (6A)$$

$$\text{white\_point}=1-\text{white\_distance} \quad (6B)$$

In equations (6A) and (6B) "histo_white" is the location of the highest of the particular percentile levels as calculated from the analysis of the histogram, "white_distance" is the distance of the adjusted white point from the high end of the histogram (e.g., distance from luminance value of 1), "white_point" is the location of the adjusted white point. White point 1324 of FIG. 13 is the adjusted white point corresponding to a "histo_white" value of 0.8. If the image were remapped with curve 1320, then not all of the top 0.1% brightest pixels (e.g., those with luminance above 0.8) would be mapped to the luminance one (brightest possible white). As a result of moving the white point to the right, only those pixels with an input luminance greater than 0.916 (as calculated by equations (6A) and (6B)) will be mapped to luminance one (brightest possible white).

2. Alternate Black Point Setting

As described above, the initial black point is determined using a particular percentile of the luminance values in a luminance histogram of the input image. However, the application of some embodiments is capable of using multiple different percentiles, depending on the characteristics of the image. In some embodiments, the application determines the location of the 0.01 percentile and the 0.05 percentile as well as the 0.1 percentile. If the 0.01 percentile is above the 1% luminance value (i.e., some of the lowest 0.01% of pixels in terms of luminance values are above 1% of the full scale on the histogram) then the 0.01 percentile location is averaged in (as a weighted average) with the 0.1 percentile location. The weighted average is determined using equations (7A) and (7B)

$$\text{wtLow}=\min(1.0,(\text{loc\_hundredth}-0.01)/0.03); \quad (7A)$$

$$\text{histogram\_black\_new}=\text{wtLow}*\text{loc\_hundredth}+(1.0-\text{wtLow})*\text{histogram\_black}; \quad (7B)$$

In equations (7A) and (7B) "wtLow" is the weighting factor that determines how much of the 0.1 percentile location to use and how much of the 0.01 percentile location to use in the weighted average. "Histogram_black" is the previously identified original location of the black point (e.g., the 0.1 percentile location). "histogram_black_new" is the replacement for the histogram derived black point. "loc_hundredth is the location (along the x-axis) in the histogram of the 0.01 percentile point. From the equations (7A) and (7B) one of ordinary skill in the art will understand that if the 0.01 percentile location is greater than 0.04 (i.e., 4%) of the full scale of the histogram, then weighting of the 0.01 percentile location will be 1. Therefore, if the 0.01 percentile location is greater than 4% of the full scale of the histogram only the 0.01 percentile location will be used to determine the histogram black location. In some embodiments, the new histogram black is then put through the same tempering equation (5) as described above for the histogram black derived from the 0.1 percentile location.

If the 0.01 percentile location is below 1% of the full histogram scale, but the 0.05 percentile location is above 1% of the full histogram scale, then a new histogram black location will be generated that is the weighted average of the 0.05 percentile location and the 0.1 percentile location. In some embodiments, the application generates the weighted average using equations (8A) and (8B)

$$\text{wtLow}=\min(1.0,(\text{loc\_twentieth}-0.01)/0.03); \quad (8A)$$

$$\text{histogram\_black\_new}=\text{wtLow}*\text{loc\_twentieth}+(1.0-\text{wtLow})*\text{histogram\_black}; \quad (8B)$$

In equations (8A) and (8B) "wtLow" is the weighting factor that determines how much of the 0.1 percentile location to use and how much of the 0.05 percentile location to use in the weighted average. "Histogram_black" is the previously identified original location of the black point (e.g., the 0.1 percentile location). "histogram_black_new" is the replacement for the histogram derived black point. "loc_twentieth is the location (along the x-axis) in the histogram of the 0.05 percentile point. From the equations (8A) and (8B) one of ordinary skill in the art will understand that if the 0.05 percentile location is greater than 0.04 (i.e., 4%) of the full scale of the histogram, then weighting of the 0.05 percentile location will be 1. Therefore, if the 0.05 percentile location is greater than 4% of the full scale of the histogram only the 0.05 percentile location will be used to determine the histogram black location. In some embodiments, the new histogram black is then put through the same tempering equation (5) as described above for the histogram black derived from the 0.1 percentile location.

3. Setting the Mid-Tone Contrast Point Locations

The applications of some embodiments set the initial locations along the x-axis of the lower and upper mid-tone contrast points 1326 and 1328 (of FIG. 13). The process 1200 calculates (at 1235) an initial location along the x-axis for the lower mid-tone contrast point. The initial location is somewhere between the location along the x-axis of the median point of the histogram (e.g., median point 1319 of FIG. 13) and the black point (e.g., black point 1312 of FIG. 13). In some embodiments, the initial location of the lower mid-tone contrast point is the 25$^{th}$ percentile of the histogram. In FIG. 13 the initial location of the lower mid-tone contrast point is at 0.25. For the histogram values used to generate the curves 1310 and 1320, the value of the lower mid-tone contrast point happens to be the 0.25 luminance location. However, one of ordinary skill in the art will realize that the 25$^{th}$ percentile is not necessarily going to be at the 0.25 luminance location for all images.

After calculating (at 1235) the initial location along the x-axis of the lower mid-tone contrast point (e.g., lower mid-tone contrast point 1316 of FIG. 13), the process adjusts (at 1240) the location along the x-axis of the lower mid-tone contrast point. In some embodiments, the process 1200 adjusts the lower mid-tone contrast point to a location that is a weighted average of the locations of: (1) the adjusted black point (e.g., black point 1322 of FIG. 13), (2) the location (along the x-axis) of the median point (e.g., median point 1329 of FIG. 13), and (3) the initial location of the lower mid-tone contrast point (e.g., mid-tone contrast point 1316 of FIG. 13). In some embodiments, the greater the gap between the black point and the median point, the more heavily those points are weighted in determining the adjusted location for the lower mid-tone contrast point. Some embodiments determine the adjusted location for the lower mid-tone contrast point (e.g., the lower mid-tone contrast point 1326 of FIG. 13) according to equations (9A) and (9B).

$$gap = median\_location - black\_point; \qquad (9A)$$

$$LMCP = (ILMCP + (1+gap)*black\_point + (1+gap)*median\_location)/(3+2*gap) \qquad (9B)$$

In equations (9A) and (9B) "median_location" is the location along the x-axis of the median (e.g., median point 1329 of FIG. 13), "black_point" is the location along the x-axis of the adjusted black point (e.g., black point 1322 of FIG. 13), "gap" is the distance along the x-axis from the adjusted black point to the median point, "LMCP" is the location along the x-axis of the adjusted lower mid-tone contrast point (e.g., lower mid-tone contrast point 1326 of FIG. 13), and "ILMCP" is the initial location of the lower mid-tone contrast point (e.g., lower mid-tone contrast point 1316 of FIG. 13). In FIG. 13, as a result of the calculations, the new adjusted mid-tone contrast point has moved to the right.

In some embodiments, the calculation of the upper mid-tone contrast point is similar to the calculation of the lower mid-tone contrast point. The process 1200 calculates (at 1245) an initial location along the x-axis for the upper mid-tone contrast point. The initial location is somewhere between the location along the x-axis of the median point of the histogram (e.g., median point 1319) and the white point (e.g., white point 1314). In some embodiments, the initial location of the upper mid-tone contrast point is the 75$^{th}$ percentile of the histogram. In FIG. 13 the initial location of the upper mid-tone contrast point is at a location 0.6 along the x-axis.

After calculating (at 1245) the initial location along the x-axis of the upper mid-tone contrast point (e.g., upper mid-tone contrast point 1318), the process adjusts (at 1250) the location along the x-axis of the upper mid-tone contrast point. In some embodiments, the process 1200 adjusts the upper mid-tone contrast point to a location that is a weighted average of the locations of: (1) the adjusted white point (e.g., white point 1324 of FIG. 13), (2) the location (along the x-axis) of the median point (e.g., median point 1329 of FIG. 13), and (3) the initial location of the upper mid-tone contrast point (e.g., upper mid-tone contrast point 1318 of FIG. 13). In some embodiments, the greater the gap between the white point and the median point, the more heavily those points are weighted in determining the adjusted location for the upper mid-tone contrast point. Some embodiments determine the adjusted location for the upper mid-tone contrast point (e.g., the upper mid-tone contrast point 1328) according to equations (10A) and (10B).

$$gap = white\_point - median\_location; \qquad (10A)$$

$$UMCP = (IUMCP + (1+gap)*white\_point + (1+gap)*median\_location)/(3+2*gap) \qquad (10B)$$

In equations (10A) and (10B) "median_location" is the location along the x-axis of the median (e.g., median point 1329), "white_point" is the location along the x-axis of the adjusted white point (e.g., white point 1324), "gap" is the distance along the x-axis from the adjusted white point to the median point, "UMCP" is the location along the x-axis of the adjusted upper mid-tone contrast point (e.g., upper mid-tone contrast point 1328), and "IUMCP" is the initial location of the upper mid-tone contrast point (e.g., upper mid-tone contrast point 1318). Here, the adjustment has moved the upper mid-tone contrast point 1328 to the right of where upper mid-tone contrast point 1318 is. For reasons of clarity and simplicity, the values of the median points 1319 and 1329 and the upper and lower mid-tone contrast points 1316, 1318, 1326, and 1328 in FIG. 13 are shown as being on the line connecting their respective black points 1312 and 1322 to their respective white points 1314 and 1324. However, in some embodiments, some or all of the values are set to different levels on the y-axis depending on characteristics of the image.

B. Setting the y-Axis Values of Tonal Response Curve Points

Figure 15:
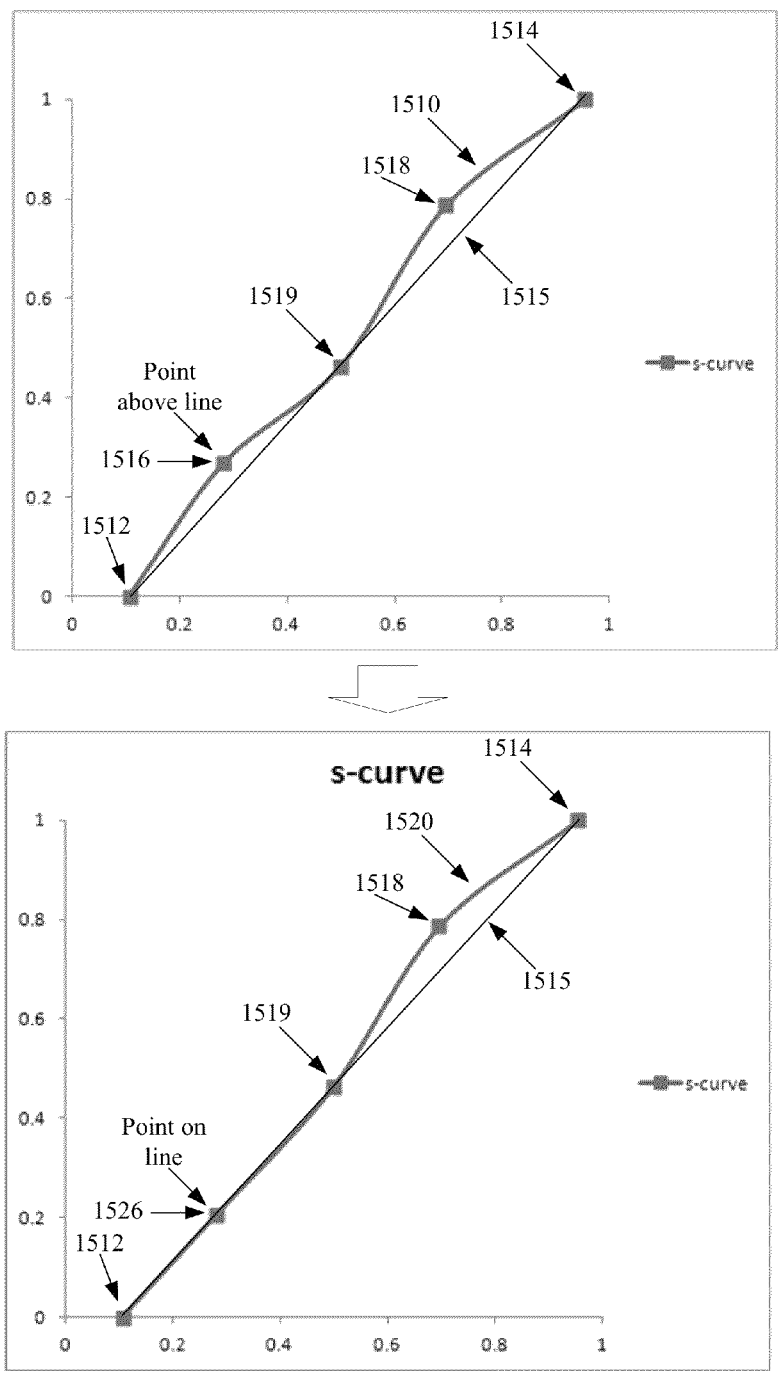
FIG. 15 illustrates an adjustment of a lower mid-tone contrast point of a tonal response curve of some embodiments.
Figure 16:
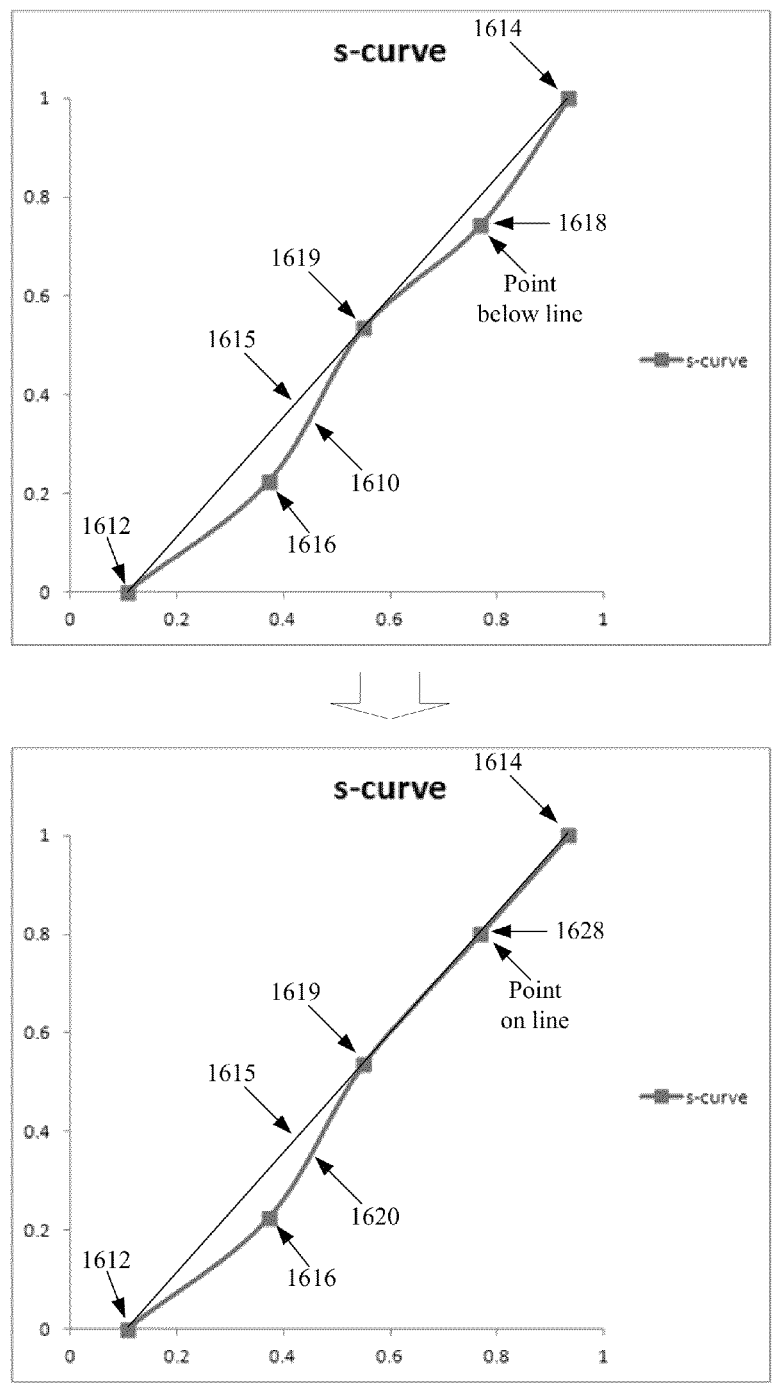
FIG. 16 illustrates an adjustment of an upper mid-tone contrast point of a tonal response curve of some embodiments.
Figure 17:
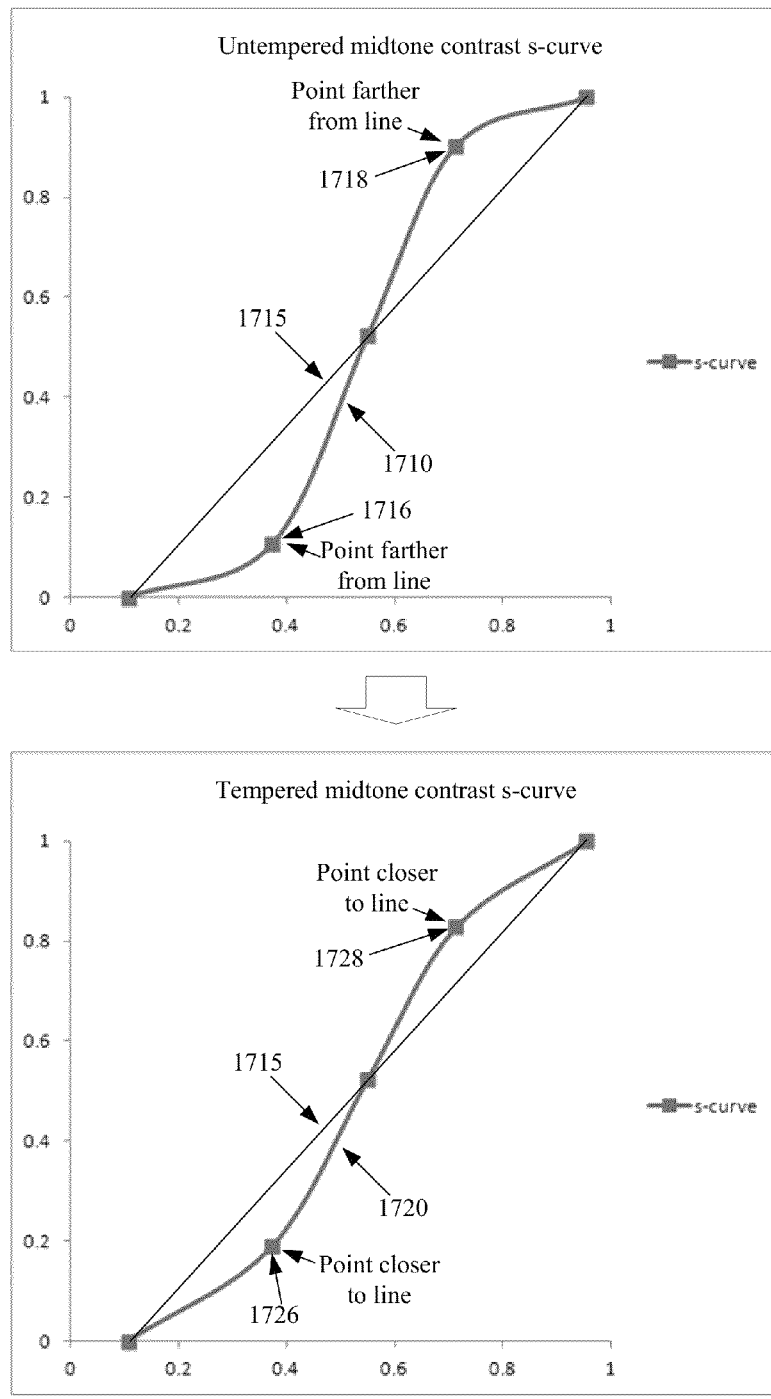
FIG. 17 illustrates an adjustment of mid-tone contrast points closer to a baseline.

FIG. 14 illustrates a process 1400 of some embodiments for setting the values along the y-axis of a tonal response curve. The setting of the values along the y-axis completes the definition of the tonal response curve in some embodiments. FIG. 14 is described with respect to FIGS. 15-16 which will be briefly described first and FIG. 17 which will be described in context. FIGS. 15-17 together illustrate different possible adjustments to the value of the mid-tone contrast points made by process 1400. The values of some of the mid-tone contrast points in the images are slightly adjusted from the positions dictated by the mathematical formulae herein. The adjustment is done for purposes of emphasizing some features of the tonal response curves that might otherwise be difficult to see (e.g., the curvature of some parts of the curves).

FIG. 15 illustrates an adjustment of a lower mid-tone contrast point of a tonal response curve of some embodiments. The figure shows the tonal response curve at an intermediate stage of setting the lower mid-tone contrast point and at a later stage of setting the lower mid-tone contrast point. FIG. 15 includes tonal response curve 1510 (the intermediate stage) and tonal response curve 1520 (the later stage). Tonal response curve 1510 includes black point 1512, white point 1514, lower mid-tone contrast point 1516, upper mid-tone contrast point 1518, and median point 1519. Tonal response curve 1520 includes black point 1512, white point 1514, lower mid-tone contrast point 1526, upper mid-tone contrast point 1518, and median point 1519. Baselines 1515 are overlain on the curves 1510 and 1520 to clarify the difference between mid-tone contrast points that are aligned with the black points and white points and those that are not aligned with the black points and white points. In the illustrated embodiment, the black point 1512, white point 1514, upper mid-tone contrast point 1518, and the median point 1519 are the same in both tonal response curves 1510 and 1520.

Tonal response curve 1510 and tonal response curve 1520 are visual representations of mathematical functions used to remap luminance values of pixels of an input image into luminance values of an output image. Black point 1512 defines, for curve 1510, the maximum luminance level a pixel in the input image can have in order to be remapped to a zero luminance value (e.g., darkest possible black) in the output image. White point 1514 defines, for curve 1510, the minimum luminance level a pixel in the input image can have in order to be remapped to a one luminance value (e.g., brightest possible white) in the output image. Lower mid-tone contrast point 1516 defines the shape of the curve 1510 between the black point 1512 and the median point 1519. Upper mid-tone contrast point 1518 defines the shape of the curve 1510 between the median point 1519, and the white point 1514.

For curve 1520, black point 1512 defines the maximum luminance level a pixel in the input image can have in order to be remapped to a zero luminance value (e.g., darkest possible black) in the output image. White point 1514 defines the minimum luminance level a pixel in the input image can have in order to be remapped to a one luminance value (e.g., brightest possible white) in the output image. Lower mid-tone contrast point 1526 defines the shape of the curve 1520 between the black point 1512 and the median point 1519. Upper mid-tone contrast point 1518 defines the shape of the curve 1520 between the median point 1519, and the white point 1514. The shape of the curves 1510 and 1520 between the median points 1519 and the white points 1514 are identical.

The shape of the tonal response curve 1510 affects the luminance of pixels of an output image that is remapped according to the curve. Luminance contrast (sometimes just called "contrast") between two pixels is the difference between their respective luminance values. If a remapping curve increases the difference in luminance between two pixels, that curve can be said to have increased the contrast between the pixels. If a remapping curve decreases the difference in luminance between two pixels, that curve can be said to have decreased the contrast between the pixels. The factor that determines whether a remapping curve will increase or decrease the contrast between two pixels of close initial luminance values is the average slope of the tonal response curve between the input points. If the curve at that luminance value has an average slope greater than one, then the contrast is increased. If the curve has an average slope less than one then the contrast is decreased. If the curve has an average slope equal to one, then the contrast is unchanged. The curve 1510 has a variable slope. Therefore, pixels with different luminance levels in the input image have different contrast adjustments when being remapped to the output image.

In FIG. 15, the black point 1512 and white point 1514 are closer to each other along the x-axis than along the y-axis, so if the curve 1510 were a straight line between the two end points, then the slope would be constant and greater than one, increasing the contrast between any two pixels with luminances between the black point 1512 and the white point 1514. This hypothetical line can be called a baseline (e.g., baseline 1515).

The median point 1519 is aligned with the end points. That is, the median point 1519 lies on the baseline 1515 connecting the black point 1512 and white point 1514. The lower mid-tone contrast point 1516 lies above the baseline 1515. The lower mid-tone contrast point 1516 changes the shape of the curve between the black point 1512 and the median point 1519 by pulling up the curve. This increases the slope of the curve (and thus increases the contrast enhancement) between the black point 1512 and the lower mid-tone contrast point 1516. Pulling up the curve also decreases the slope of the curve (and thus decreases the contrast enhancement) between the lower mid-tone contrast point 1516 and the median point 1519. If the slope drops below one, then the contrast will be decreased between a pair of pixels with luminance values on that part of the curve 1510 rather than increased.

The upper mid-tone contrast point 1518 also lies above the baseline 1515. The upper mid-tone contrast point 1518 changes the shape of the curve between the median point 1519 and the white point 1514 by pulling up the curve. This increases the slope of the curve (and thus increases the contrast enhancement) between the median point 1519 and the upper mid-tone contrast point 1518. Pulling up the curve also decreases the slope of the curve (and thus decreases the contrast enhancement) between the upper mid-tone contrast point 1518 and the white point 1514. If the slope drops below one, then the contrast will be decreased between a pair of pixels with luminance values on that part of the curve 1510 rather than increased.

The upper portion of the curve 1520 is the same as the upper portion of the curve 1510. However, for the lower portion, the lower mid-tone contrast point 1526 lies on the baseline 1515. This results in a straight line between the black point 1512 and the median point 1519 of curve 1520. The straight line has a constant slope greater than one so it increases the contrast of all pixels with luminance between the black point 1512 and the median point 1519.

Having a straight line between the black point and the median point can be preferable to having the lower half of the curve pulled up because images generally look better with higher contrast enhancement between the mid-tone contrast points and the median point and lower (or the same) contrast enhancement between the mid-tone points and their closest end points. Making the lower portion of the line straight instead of pulled up increases (compared to the pulled up curve) the contrast enhancement between the lower mid-tone contrast point and the median point. Making the lower portion of the line straight instead of pulled up also decreases the contrast enhancement between the black point and the lower mid-tone contrast point.

FIG. 16 illustrates an adjustment of an upper mid-tone contrast point of a tonal response curve of some embodiments. The figure shows the tonal response curve at an intermediate stage of setting the upper mid-tone contrast point and at a later stage of setting the upper mid-tone contrast point. FIG. 16 includes tonal response curve 1610 (the intermediate stage) and tonal response curve 1620 (the later stage). Tonal response curve 1610 includes black point 1612, white point 1614, lower mid-tone contrast point 1616, upper mid-tone contrast point 1618, and median point 1619. Tonal response curve 1620 includes black point 1612, white point 1614, lower mid-tone contrast point 1616, upper mid-tone contrast point 1628, and median point 1619. Baselines 1615 are overlain on the curves 1610 and 1620, as described for the baselines 1515 of FIG. 15, the baselines 1615 clarify when a mid-tone contrast point is aligned with the black point 1612 and the white point 1614. In the illustrated embodiment, the black point 1612, white point 1614, lower mid-tone contrast point 1616, and the median point 1619 are the same in both tonal response curves 1610 and 1620.

Tonal response curve 1610 and tonal response curve 1620 are visual representations of mathematical functions used to remap luminance values of pixels of an input image into luminance values of an output image. Black point 1612 defines, for curve 1610, the maximum luminance level a pixel in the input image can have in order to be remapped to a zero luminance value (e.g., darkest possible black) in the output image. White point 1614 defines, for curve 1610, the minimum luminance level a pixel in the input image can have in order to be remapped to a one luminance value (e.g., brightest possible white) in the output image. Lower mid-tone contrast point 1616 defines the shape of the curve 1610 between the black point 1612 and the median point 1619. Upper mid-tone contrast point 1618 defines the shape of the curve 1610 between the median point 1619, and the white point 1614.

For curve 1620, black point 1612 defines the maximum luminance level a pixel in the input image can have in order to be remapped to a zero luminance value (e.g., darkest possible black) in the output image. White point 1614 defines the minimum luminance level a pixel in the input image can have in order to be remapped to a one luminance value (e.g., brightest possible white) in the output image. Lower mid-tone contrast point 1616 defines the shape of the curve 1620 between the black point 1612 and the median point 1619. Upper mid-tone contrast point 1628 defines the shape of the curve 1620 between the median point 1619, and the white point 1614. The shape of the curves 1610 and 1620 between the black points 1612 and the median points 1619 are identical.

The shape of the tonal response curve 1610 affects the luminance of pixels in an output image that is remapped from pixels in an input image according to the curve. Because the curve 1610 has a variable slope, pixels with different luminance levels in the input image have different contrast adjustments when being remapped to the output image.

The black point 1612 and white point 1614 are closer to each other along the x-axis than along the y-axis, so if the curve 1610 were a straight line between the two end points, then the slope would be constant and greater than one, increasing the contrast between any two pixels with luminances between the black point 1612 and the white point 1614. The black point 1612 and the white point 1614 are connected in the figure by the straight line baseline 1615, which represents the hypothetical shape of a curve comprising a straight line from black point 1612 to white point 1614.

The median point 1619 is aligned with the end points. That is, the median point 1619 lies on the baseline connecting the black point 1612 and white point 1614. The lower mid-tone contrast point 1616 lies below the baseline. The lower mid-tone contrast point 1616 changes the shape of the curve between the black point 1612 and the median point 1619 by pulling down the curve. This decreases the slope of the curve (and thus decreases the contrast enhancement) between the black point 1612 and the lower mid-tone contrast point 1616. If the slope drops below one, then the contrast between two pixels with luminance values near that part of the curve 1610 will be reduced rather than increased. Pulling down the curve also increases the slope of the curve (and thus increases the contrast enhancement) between the lower mid-tone contrast point 1616 and the median point 1619.

The upper mid-tone contrast point 1618 also lies below the baseline. The upper mid-tone contrast point 1618 changes the shape of the curve between the median point 1619 and the white point 1614 by pulling down the curve. This decreases the slope of the curve (and thus decreases the contrast enhancement) between the median point 1619 and the upper mid-tone contrast point 1618. If the slope drops below one, then the contrast between two pixels with luminance around that part of the curve 1610 will be reduced rather than enhanced. Pulling down the curve also increases the slope of the curve (and thus increases the contrast enhancement) between the upper mid-tone contrast point 1618 and the white point 1614.

The lower portion of the curve 1620 is the same as the lower portion of the curve 1610. However, for the upper portion, the upper mid-tone contrast point 1628 lies on the baseline. This results in a straight line between the median point 1619 and the white point 1614 of curve 1620. The straight line has a constant slope greater than one so it increases the contrast of all pixels with luminance between the median point 1619 and the white point 1614.

Having a straight line between the median point and the white point can be preferable to having the upper half of the curve pulled down because images generally look better with higher contrast increases between the mid-tone contrast points and the median point and lower contrast increases between the mid-tone points and their closest end points. Making the upper portion of the line straight instead of pulled down increases the contrast enhancement between the median point and the upper mid-tone contrast point compared to what it would be if it were pulled down. Making the upper portion of the line straight instead of pulled down also decreases the contrast enhancement between the upper mid-tone contrast point and the white point compared to what it would be if it were pulled down.

As mentioned above, the value along the y-axis of the black point is automatically set to zero and the value along the y-axis of the white point is automatically set to one. The process 1400 in FIG. 14 sets the values along the y-axis of the other three points that define the tonal response curve (e.g., lower mid-tone contrast point 1526, upper mid-tone contrast point 1518, and median point 1519 of FIG. 15) in some embodiments.

Process 1400 begins by setting (at 1405) the value of the median point to lie on the baseline connecting the black point and white point of the curve. As shown in FIG. 15, it aligns the median point 1519 with the baseline 1515. In some embodiments, this is done using equations (11A) and (11B).

$$\text{slope}=1/(\text{black\_point}-\text{white\_point}) \tag{11A}$$

$$\text{median\_value}=\text{slope}*(\text{median\_location}-\text{black\_point}) \tag{11B}$$

In equations (11A) and (11B), for curve 1510 the "slope" is the slope of the baseline 1515, "median_location" is the location along the x-axis of the median point 1519 (e.g., the 50 percentile point on the histogram of the input image), "black_point" is the location along the x-axis of the black point 1512, "white_point" is the location along the x-axis of the white point 1514.

After setting the value of the median point location, the process 1400 then determines (at 1410) a value for the lower mid-tone contrast point. In some embodiments, the determined value is the average of the value of the median point 1519 and the black point 1512 (which as mentioned above, is automatically set to zero). In some embodiments equation (12) is used to calculate the value of the lower mid-tone contrast point 1516.

$$\text{LMCV}=0.5*(\text{black\_value}+\text{median\_value}) \tag{12}$$

In equation (12) "black_value" is the value of the black point (e.g., zero), "median_value" is the median_value as calculated above, "LMCV" is the lower mid-tone contrast point value. The calculated LMCV value is halfway between the values of the black point and the median point. The previously set location of the lower mid-tone contrast point, combined with the newly set value places the point either to the left of (above) the baseline or to the right of (below) the baseline.

In the case of curve 1510, illustrated in FIG. 15, the location and value of the lower mid-tone contrast point 1516 place it above the baseline 1515. As mentioned above, pulling the curve up at the lower mid-tone contrast point 1516 reduces the contrast enhancement of the curve between the lower mid-tone contrast point 1516 and the median point 1519. Some embodiments prevent such reductions in mid-tone contrast enhancement. That is, the image editing applications of some embodiments prevent the reduction of contrast enhancement between the lower mid-tone contrast point and the median point. Therefore, the process 1400 of some embodiments determines (at 1415) whether the value of the lower mid-tone contrast point (e.g., lower mid-tone contrast point 1516) places it above the baseline (e.g., baseline 1515). If the process 1400 determines (at 1415) that the value of the lower mid-tone contrast point places it above the baseline then the process 1400 adjusts (at 1420) the value to put the lower mid-tone contrast point on the baseline. This is illustrated in FIG. 15 by the adjustment of lower mid-tone contrast point 1516 in curve 1510 to a lower position as lower mid-tone contrast point 1526, on the baseline 1515 in curve 1520.

If the process 1400 determines (at 1415) that the lower mid-tone contrast point is below the baseline, then it does not move the lower mid-tone contrast point to the baseline. This is demonstrated in FIG. 16, in which the lower mid-tone contrast point 1616 of curve 1610 remains in place as lower mid-tone contrast point 1616 of curve 1620 rather than moving up to baseline 1615. However, FIGS. 15 and 16 do not illustrate the entire adjustment process 1400 of some embodiments. In some embodiments, the process 1400 adjusts (at 1425) a lower mid-tone contrast point with a value that places it below the baseline, closer to the baseline. This will be illustrated with respect to FIG. 17, described below. The process 1400 of some embodiments takes a weighted average of the value of the lower mid-tone contrast point and the value of the baseline at the location along the x-axis of the lower mid-tone contrast point. Some embodiments perform this weighted average using equations (13A)-(13B).

$$LC=\min(1,\text{histogram\_black}+(1-\text{histo\_white})) \quad (13A)$$

$$w=CP*\max(0,1-2*LC) \quad (13B)$$

$$ALMCV=w*LMCV+(1-w)*\text{slope}*(LMCP-\text{black\_point}) \quad (13C)$$

In equations (13A)-(13C) "histo_white" is the originally calculated location of the white point from the histogram of the input image (e.g., the position along the x-axis of white point 1314 from curve 1310 in FIG. 13). "histogram_black" is the originally calculated location of the black point from the histogram of the input image (e.g., the position along the x-axis of black point 1312 from curve 1310 in FIG. 13). "LC" is a placeholder variable related to the distance (along the x-axis) between histogram_black and histo_white. "CP" is a curve percentage that in some embodiments is set by the makers of the image editing and organizing application. "LMCV" is the previously calculated lower mid-tone contrast point value (along the y-axis). "ALMCV" is the adjusted lower mid-tone contrast point value (along the y-axis). "Slope" is the slope of the baseline as calculated in equation (11A). "LMCP" is the location of the lower mid-tone contrast point (along the x-axis). "Black_point" is the location of the black point (along the x-axis). "w" is the weighting factor for the weighted average of the lower mid-tone contrast point and the value of the baseline at the location of the lower mid-tone contrast point. The "slope*(LMCP−black_point)" term represents value along the y-axis of the baseline at the location (along the x-axis) of the lower mid-tone contrast point. In some embodiments, the curve percentage (CP) is between 0.5 and 0.7. In some embodiments, the CP is 0.6.

As mentioned above, in some embodiments, the process 1400 adjusts (at 1425) a lower mid-tone contrast point with a value that places it below the baseline, closer to the baseline. In some embodiments, a similar operation (at 1445, described below) is performed on an upper mid-tone contrast point that is above the baseline, to bring it closer to the baseline, as described below, FIG. 17 illustrates both such operations.

FIG. 17 illustrates an adjustment of mid-tone contrast points closer to a baseline. The figure includes tonal response curves 1710 and 1720, and baselines 1715. Curve 1710 includes lower mid-tone contrast point 1716, and upper mid-tone contrast point 1718. Curve 1720 includes lower mid-tone contrast point 1726, and upper mid-tone contrast point 1728. Curve 1710 is a tonal response curve calculated with lower mid-tone contrast point 1716 value as determined by equation (12), above and upper mid-tone contrast point 1718 value as determined by equation (14), below. Curve 1720 is a tonal response curve recalculated with lower mid-tone contrast point 1726 value as adjusted by equation (13C), above and upper mid-tone contrast point 1728 as adjusted by equation (15), below. In the illustrated embodiment, a curve percentage factor (CP) of 0.6 was used. Once the weighted average of the calculated lower mid-tone contrast point 1716 is taken, the lower mid-tone contrast point 1726 moves up, closer to the baseline 1715. Similarly, once the weighted average of the calculated upper mid-tone contrast point 1718 is taken, the upper mid-tone contrast point 1728 moves down, closer to the baseline 1715.

After adjusting (at 1425) the value of the lower mid-tone contrast point closer to the baseline, the process 1400 then determines (at 1430) an initial value for the upper mid-tone contrast point. In some embodiments, the determined value is the average of the value of the median point 1619 and the white point 1614 (which was automatically set to one, as mentioned above). In some embodiments equation (14) is used to calculate the value of the upper mid-tone contrast point 1618.

$$UMCV=0.5*(\text{white\_value}+\text{median\_value}) \quad (14)$$

In equation (14) "white_value" is the value of the white point (e.g., one), "median_value" is the median value as calculated above, "UMCV" is the upper mid-tone contrast point value. The calculated UMCV value is halfway between the values of the median point and the white point. The previously set location (along the x-axis) of the upper mid-tone contrast point, combined with the newly set value (along the y-axis) places the point either to the left of (above) the baseline or to the right of (below) the baseline.

In the case of curve 1610, illustrated in FIG. 16, the location and value of the upper mid-tone contrast point 1618 place it below the baseline 1615. As mentioned above, pulling the curve down at the upper mid-tone contrast point 1618 reduces the contrast enhancement of the curve between the median point 1619 and the upper mid-tone contrast point 1618. Some embodiments prevent such reductions in contrast enhancement. That is, the image editing applications of some embodiments prevent the reduction of contrast enhancement between the median point and the upper mid-tone contrast point. Therefore, the process 1400 of some embodiments determines (at 1435) whether the value of the upper mid-tone contrast point (e.g., upper mid-tone contrast point 1618) places it below the baseline (e.g., baseline 1615). If the process 1400 determines (at 1435) that the value of the upper mid-tone contrast point places it below the baseline then the process 1400 adjusts (at 1440) the value to put the upper mid-tone contrast point on the baseline. This is illustrated in FIG. 16 by the adjustment of upper mid-tone contrast point 1618 in curve 1610 to a higher position as upper mid-tone contrast point 1628, on the baseline 1615 in curve 1620.

If the process 1400 determines (at 1435) that the upper mid-tone contrast point is above the baseline, then it does not move the upper mid-tone contrast point to the baseline. This is demonstrated in FIG. 15, in which the upper mid-tone contrast point 1518 of curve 1510 remains in place as upper mid-tone contrast point 1518 of curve 1520 rather than moving down to baseline 1515. However, as shown in FIG. 17, the process 1400 does adjust (at 1445) an upper mid-tone contrast point with a value that places it above the baseline, closer to the baseline. The process 1400 of some embodiments takes a weighted average of the value of the upper mid-tone contrast point and the value of the baseline at the location (along the x-axis) of the upper mid-tone contrast point. Some embodiments perform this weighted average using equations (13A)-(13B) and (15).

$$LC = \min(1, \text{histogram\_black} + (1 - \text{histo\_white})) \quad (13A)$$

$$w = CP * \max(0, 1 - 2*LC) \quad (13B)$$

$$AUMCV = w*UMCV + (1-w)*\text{slope}*(UMCP - \text{black\_point}) \quad (15)$$

Equations (13A) and (13B) are the same equations previously described in relation to the lower mid-tone contrast value, they are repeated here for convenience. In equations (13A)-(13B) and (15) "histo_white" is the originally calculated location of the white point from the histogram of the input image (e.g., the position along the x-axis of white point 1314 from curve 1310). "histogram_black" is the originally calculated location of the black point from the histogram of the input image (e.g., the position along the x-axis of black point 1312 from curve 1310). "LC" is a placeholder variable related to the distance (along the x-axis) between histogram_black and histo_white. "CP" is a curve percentage that in some embodiments is set by the makers of the image editing and organizing application. "UMCV" is the previously calculated upper mid-tone contrast point value (along the y-axis). "AUMCV" is the adjusted upper mid-tone contrast point value (along the y-axis). "Slope" is the slope of the baseline as calculated in equation (11A). "UMCP" is the location of the upper mid-tone contrast point (along the x-axis). "Black_point" is the location of the black point (along the x-axis). "w" is the weighting factor for the weighted average of the upper mid-tone contrast point and the value of the baseline at the location of the upper mid-tone contrast point. In some embodiments, the curve percentage (CP) is between 0.5 and 0.7. In some embodiments, the CP is 0.6.

As described above, this operation 1445 is illustrated in FIG. 17. In FIG. 17 two initially calculated mid-tone contrast points are moved closer to the baseline. For example, in FIG. 17 initially calculated upper mid-tone contrast point 1718 is a considerable distance above the baseline 1715. As a result of operation 1445, the upper mid-tone contrast point 1718 moves closer to the baseline 1715 to become upper mid-tone contrast point 1728.

While some embodiments described herein use a luminance scale from 0 to 1, one of ordinary skill in the art will understand that other luminance scales are used in other embodiments. For example, some embodiments use a luminance scale from 0 to 255. Similarly, though the above described tonal response curves operate on luminance values of input images (e.g., in a luminance and two chrominance color space such as YIQ), some embodiments either in addition to or instead of operating on images in a YIQ space operate on images in a red, green, blue (RGB) space or other color spaces. Similarly, some embodiments have been described herein as being applied in an RGB color space. However, other embodiments perform these or similar operations in other color spaces. In some such embodiments, the curve will be applied separately to each color.

III. Saturation/Vibrancy Enhancement

Some embodiments adjust the vibrancy of an image. That is, the embodiments make the colors present in the image more vivid. In determining an automatically calculated value for adjusting the vibrancy of an image, some embodiments use a histogram of the input image to determine the vibrancy adjustment level. That is, the embodiments calculate a histogram of an input image, then use statistics from the histogram to determine a vibrancy setting. In some embodiments, the histogram represents the existing saturation levels of pixels in the image. In some embodiments, the saturation of each of the pixels in the image is determined by the difference between the highest and lowest color component values of the pixel.

In order to preserve the saturation levels of images with lots of foliage or sky (e.g., images with lots of blue or green pixels), some embodiments use a lower saturation adjustment value when the image has a large number of blue or green pixels. The application of some embodiments uses a modified histogram that counts blue and green pixels as being more colorful (i.e., having higher saturation) than they actually are in order to determine a lower automatic vibrancy setting.

Figure 18:
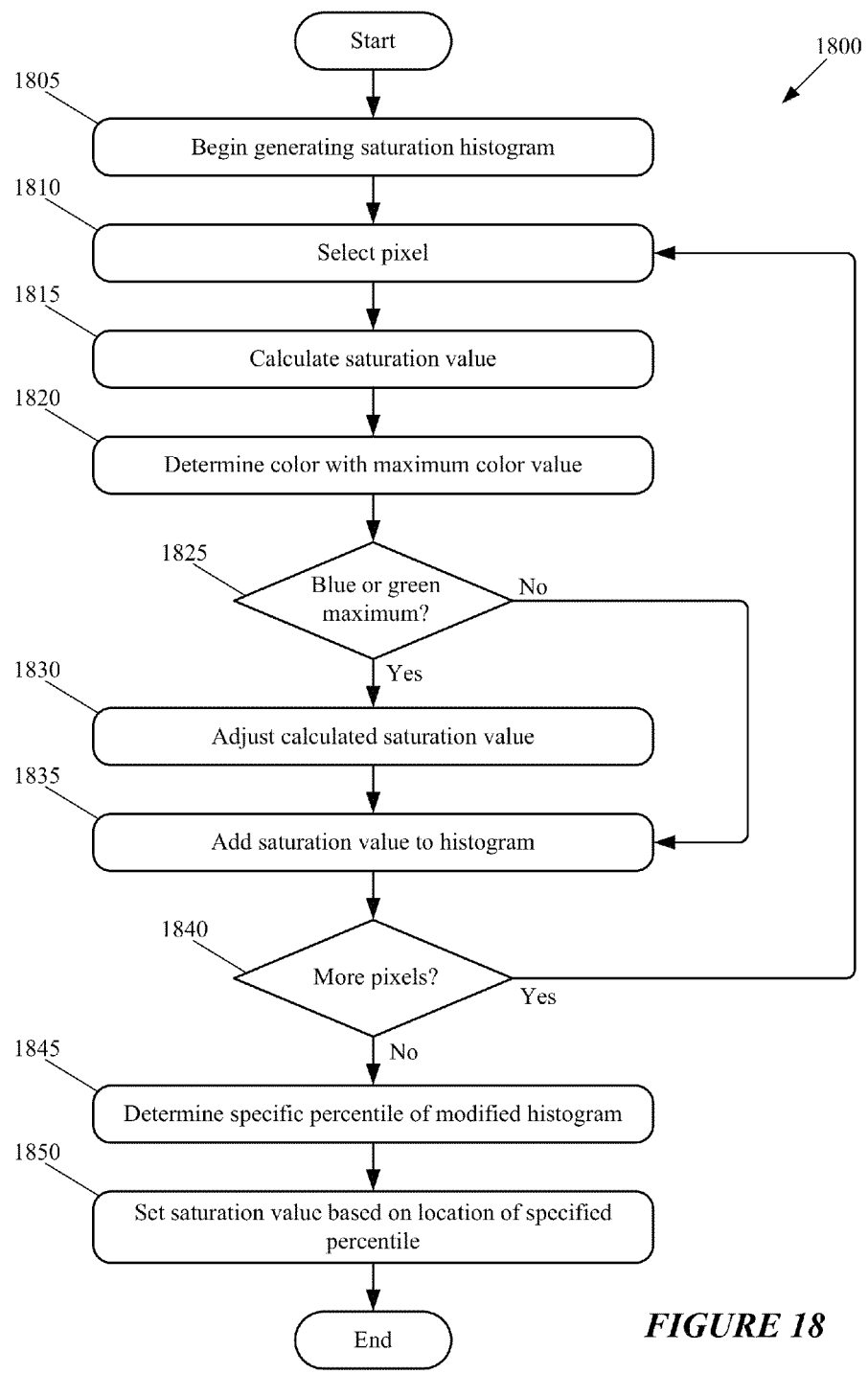
FIG. 18 conceptually illustrates a process of some embodiments for automatically adjusting a vibrancy value.

FIG. 18 conceptually illustrates a process 1800 of some embodiments for automatically adjusting a vibrancy value. Adjusting the vibrancy value affects the colors of the image (e.g., increasing vibrancy increases the saturation of the images). In some embodiments, the vibrancy adjustment of each pixel is done according to the pseudocode in Table 1.

TABLE 1

| Vibrancy pseudocode |
|---|
| generate skin mask to protect skin tone pixels from adjustment<br>for non-skin tone pixels:<br>    gray = (r + g + b) * 0.33333<br>    r = max((min(r + (r − gray) * boost), 1),0) //boost is a<br>    function of vibrance<br>    g = max((min(g + (g − gray) * boost), 1),0)<br>    b = max((min(b + (b − gray) * boost), 1),0)<br>end |

All of the values in the pseudocode of Table 1 are derivable from the value of the input pixel except the saturation boosting value "boost". "boost" is a function of the vibrancy value "vibrance". In some embodiments, the vibrancy value can be set by a user. In process 1800, the vibrancy adjustment value, "vibrance" is set automatically. The process 1800 begins (at 1805) by generating a histogram of the image. The application of some embodiments sets up the bins of the histogram at this point. The bins encompass the potential saturation values of the pixels of the image. In some embodiments, the pixels are defined by color components with values between 0 and 1. In such embodiments, the potential saturation values (the possible differences between the highest and lowest component values of a given pixel) range from 0 to 1.

The process 1800 then selects (at 1810) a pixel from the image. The pixel can be any pixel in the image. Then the process 1800 calculates (at 1815) a saturation value for the selected pixel. The calculation of the saturation value of the pixel is shown in equation (16)

$$\text{saturation} = \max(r, g, b) - \min(r, g, b) \quad (16)$$

In equation (16), "r", "g", and "b" are the red, green, and blue component values of the pixel, respectively, and "saturation" is the saturation value of the pixel. The process 1800, then determines (at 1820) the color with the maximum value. If the color with the maximum value is determined (at 1825) to be red (i.e., not blue or green) then the process 1800 simply adds (at 1835) the value to the histogram (i.e., adds one count to the bin with that saturation value). However, if the color is determined (at 1825) to be blue or green, then the calculated saturation value is adjusted before it is added to the histogram. The application of some embodiments doubles the saturation value for pixels in which the maximum color component value is either blue or green. The calculated saturation for such pixels is doubled before the value is added to the histogram. One of ordinary skill in the art will understand that the actual color component values will not be adjusted at this point and therefore the actual saturation value of the pixel will not change. Only the value of the bin in the histogram to which a count is added will change as a result of the doubling of the calculated saturation value.

Figure 19:
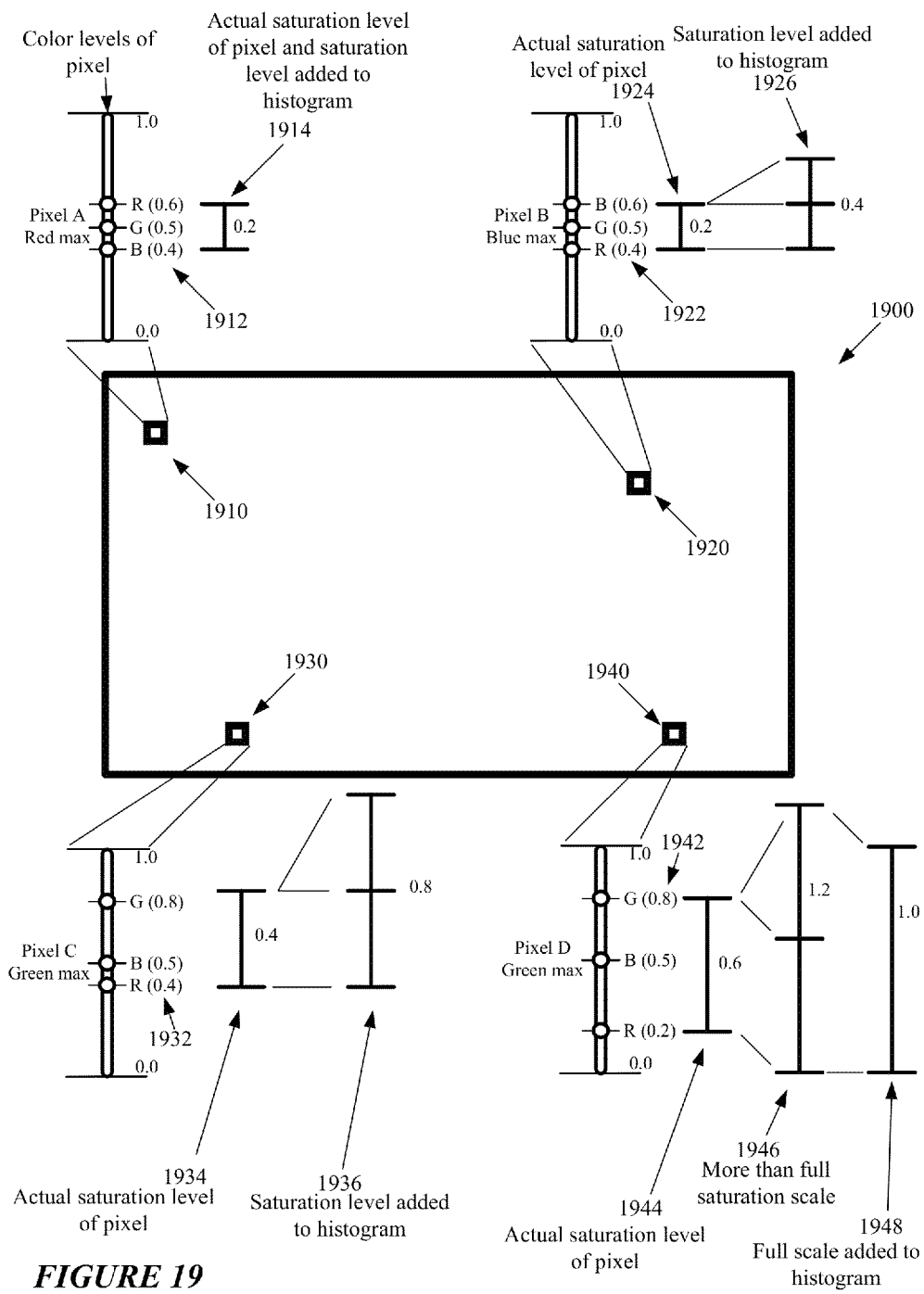
FIG. 19 illustrates the selection of multiple pixels and how each is added to a histogram.

FIG. 19 illustrates the selection of multiple pixels and how each is added to a histogram. The figure conceptually shows the effect of operations 1815-1830. The figure includes input image 1900, pixels 1910, 1920, 1930, and 1940, color values 1912, 1922, 1932, and 1942, saturation/histogram value 1914, saturation values 1924, 1934, and 1944, histogram values 1926, 1936, and 1948, and doubled saturation value 1946. Input image 1900 conceptually illustrates an image being put through the automatic vibrancy enhancement process. Pixels 1910, 1920, 1930, and 1940 conceptually represent pixels in an input image 1900. Color values 1912, 1922, 1932, and 1942 represent the individual color component values of pixels 1910, 1920, 1930, and 1940, respectively. Saturation values 1924, 1934, 1944, and saturation/histogram value 1914 show the saturation level of each pixel 1920, 1930, 1940, and 1910, respectively. Histogram values 1926, 1936, 1948, and saturation/histogram value 1914 show the values for saturation added to the histogram in relation to pixels 1920, 1930, 1940, and 1910, respectively, by a histogram generation process (e.g., as described in relation to FIG. 18). Doubled saturation value 1946, shows a value that is twice the size of the saturation 1944 of its pixel 1940, and is rejected for inclusion in the histogram as it is over the maximum value of the histogram (i.e., 1).

The first example of pixel 1910 in the input image 1900 has color component values 1912. The red component is the highest with a value of 0.6. The blue component is the lowest with a value of 0.4. Therefore the saturation level 1914 of pixel 1910 is 0.2. Since the maximum color component of the pixel is red, the saturation level 1914 of 0.2 is added to the histogram. That is, one count is added to the 0.2 saturation bin of the histogram. The second example of a pixel 1920 also has a saturation level 1924 of 0.2. However, this pixel has blue as the highest value of its color component values 1922. Accordingly, the process 1800 doubles the saturation value to calculate a histogram value 1926 of 0.4. That is, a count is added to the 0.4 bin of the histogram. Pixel 1930 has green as the highest component value so the saturation level 1934 of the pixel, which is 0.4 is doubled resulting in a histogram value 1936 of 0.8. In some embodiments, the application caps the saturation values in the histogram at 1. This is shown with respect to pixel 1940, which has a saturation value 1944 of 0.6. The highest color component value of pixel 1940 is green. Therefore, pixel 1940 yields a double saturation value 1946 of 1.2. The double saturation value 1946 is then clamped to a value of 1 to calculate histogram value 1948 of 1.

Figure 20:
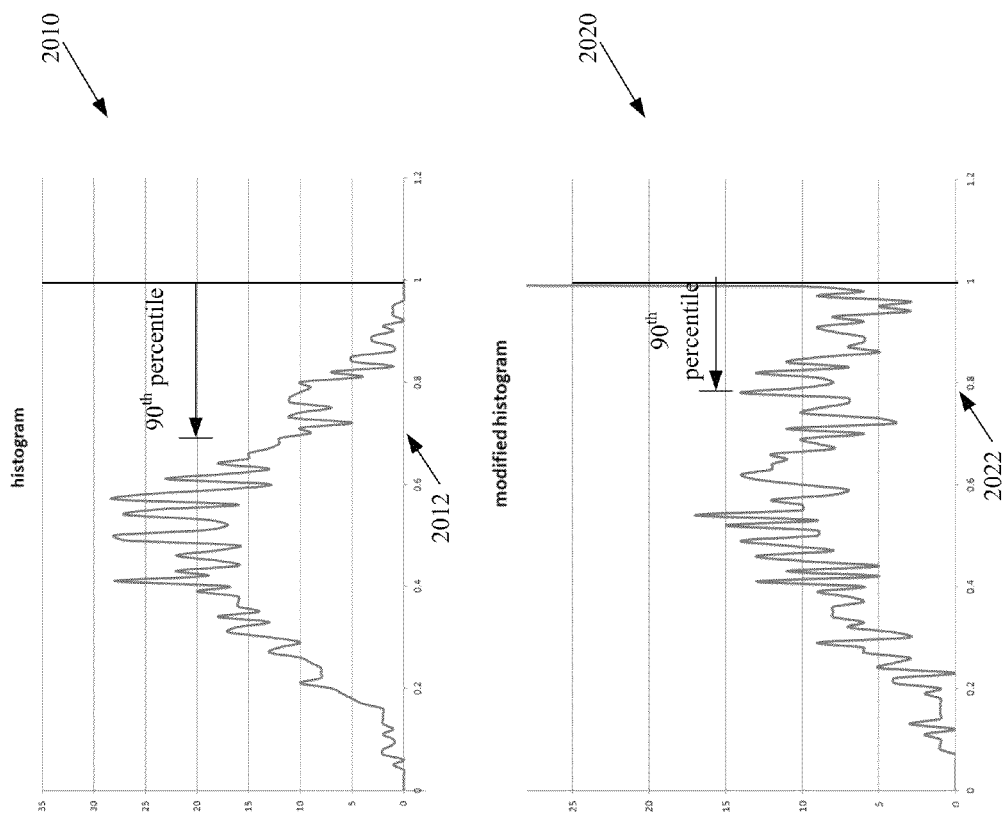
FIG. 20 illustrates a modified histogram used for calculating a percentile of luminance values on the histogram.

Returning to process 1800 (of FIG. 18), the process 1800 then determines (at 1840) whether there are more pixels that haven't been added to the histogram. If there are more pixels, then the process 1800 returns to operation 1810. When all the pixels have been accounted for, the process 1800 identifies (at 1845) the location on the modified histogram of a specific percentile (e.g., the $90^{th}$ percentile). FIG. 20 illustrates a modified histogram used for calculating a percentile of luminance values on the histogram. The figure has two histograms made from the same data with the exception that one of them accounts for the green and blue pixels in the manner described above (i.e., doubling their saturation levels and capping the doubled levels at 1). The figure includes histograms 2010 and 2020. Histogram 2010 has $90^{th}$ percentile point 2012 and histogram 2020 has $90^{th}$ percentile point 2022. Histogram 2010 is an unmodified histogram of the saturation values of an image. Histogram 2020 is a histogram of the saturation values with the saturation values of the blue and green dominated pixels doubled before being added to the histogram. The $90^{th}$ percentile point 2012 is the point at which 90% of the histogram's 2010 count lays. The $90^{th}$ percentile point 2022 is the point at which 90% of the histogram's 2020 count lays.

The unmodified histogram 2010 trails off down to zero near the full scale point and near the zero point. Not all images will generate histograms that trail to zero at the ends of the scales, but the image used to generate this histogram happens to have no fully saturated pixels and no pixels with zero saturation (completely gray, white, or black). The modified histogram 2020 has lower saturation level pixels (blue and green ones) counted near the full scale point, so it doesn't trail off to zero near the full scale point. Any blue or green pixels with a saturation level at or above 0.5 are added to the histogram as though they had saturation levels of 1, therefore there is a spike at the top of the scale (i.e., 1 in this example) in the modified histogram 2020. The additional counts near the top end of the scale move the $90^{th}$ percentile point 2022 to a higher value (along the x-axis) than the $90^{th}$ percentile point 2012. For some images, the additional counts move the $90^{th}$ percentile point all the way to the top of the scale (e.g., if more than 10% of the pixels have blue or green maximum component values and saturation values at or above 0.5). However for the image used to generate histograms 2010 and 2020, the additional counts on the high end move the $90^{th}$ percentile point from about 0.7 (point 2012) to about 0.8 (point 2022).

Once the $90^{th}$ percentile point is calculated, the process 1800 sets (at 1850) a mathematical formula shown as equation (17) to determine a setting for vibrancy.

$$\text{vibrance} = 8 * 0.4 * ((1 - \text{percentile\_location})^3) * (\text{percentile\_location}^{1.6}) \quad (17)$$

Figure 21:
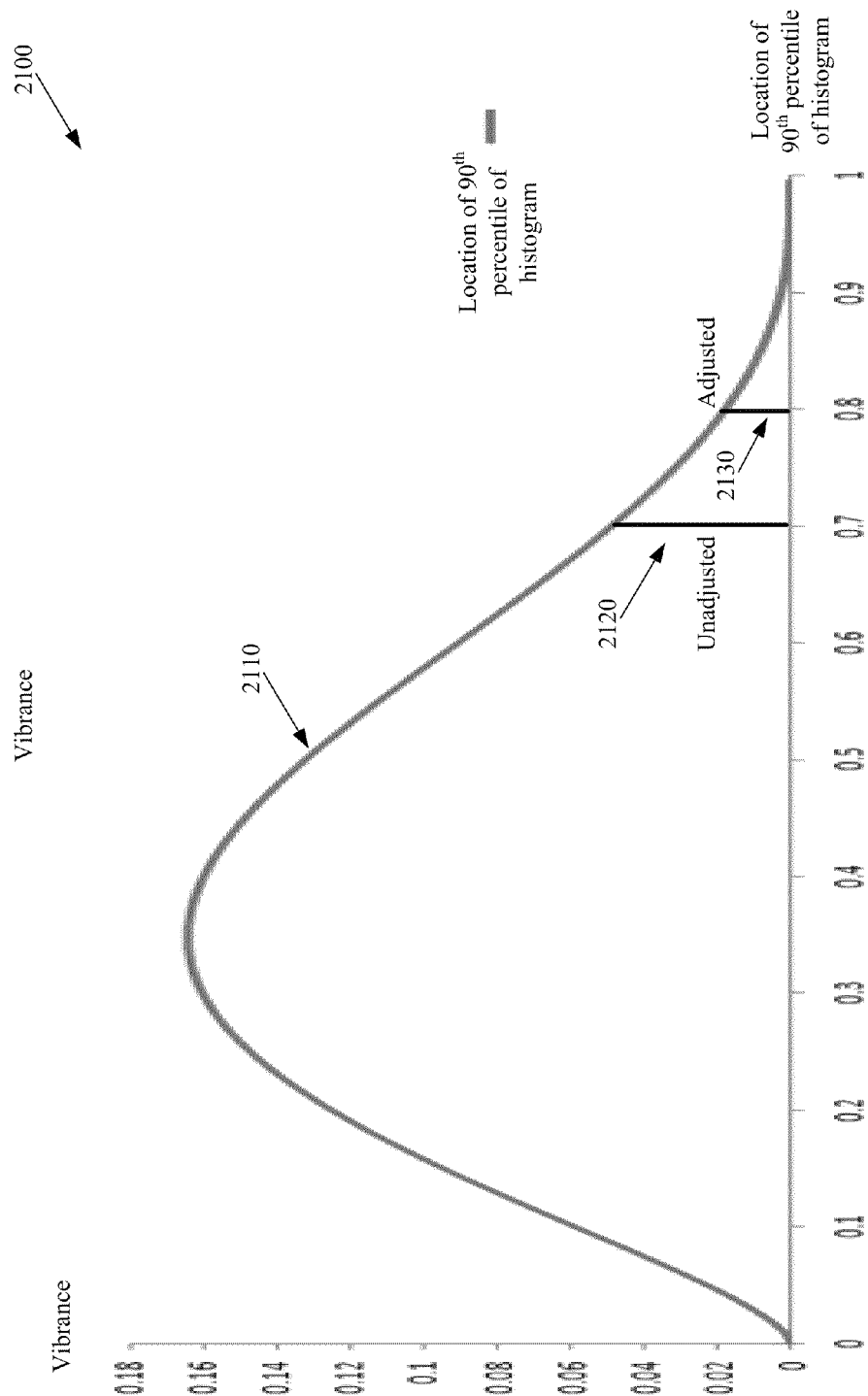
FIG. 21 illustrates a graph of percentile location versus automatic vibrancy settings.

In equation (17), "vibrance" is the automatically determined vibrancy setting. "percentile_location" is the location of the specified percentile (e.g., $90^{th}$ percentile). FIG. 21 illustrates a graph of percentile location versus automatic vibrancy settings. The graph includes an illustration of the effects of using an adjusted histogram (i.e., histogram 2020 in FIG. 20) versus using an unadjusted histogram (i.e., histogram 2010 in FIG. 20). The figure includes graph 2100, vibrancy setting curve 2110, unadjusted mark 2120, and adjusted mark 2130. The graph 2100 has an x-axis with the locations on it matching the locations of bins of the histogram and a y-axis with vibrancy setting values on it. The vibrancy setting curve 2110 correlates values on the x-axis with values on the y-axis. The unadjusted mark represents the location of the $90^{th}$ percentile on unadjusted histogram 2010 in FIG. 20. The adjusted mark 2130 represents the location of the $90^{th}$ percentile on adjusted histogram 2020 in FIG. 20.

In the graph 2100, the x-axis represents a specified percentile of the histogram (here, the $90^{th}$ percentile). The y-axis represents vibrancy settings to be correlated with calculated $90^{th}$ percentile points on the x-axis. As shown on the graph 2100, the adjusted mark 2130 correlates with a smaller automatically set vibrancy value than the unadjusted mark 2120. Accordingly, the modification of the histogram has produced a lower vibrancy setting than would be the case for an unmodified histogram.

Some embodiments use the following sets of equations (18A)-(21C) to convert the automatically derived "vibrance" setting into new color component values for a given pixel. The individual sets of equations will be explained between listings.

$$r_1 = \max(\min(R_1, 30.9999), 0.0001) \tag{18A}$$

$$g_1 = \max(\min(G_1, 0.9999), 0.0001) \tag{18B}$$

$$b_1 = \max(\min(B_1, 0.9999), 0.0001) \tag{18C}$$

$$r\text{delta} = R_1 - r_1 \tag{18D}$$

$$g\text{delta} = G_1 - g_1 \tag{18E}$$

$$b\text{delta} = B_1 - b_1 \tag{18F}$$

Equations (18A)-(18F) remove high dynamic range data (e.g., color component data above 0.9999, or below 0.0001) from the red ($R_1$), green ($G_1$) and blue ($B_1$) components of the pixel to calculate temporary red ($r_1$), green ($g_1$) and blue ($b_1$) components and store the overage as delta values (rdelta, gdelta, and bdelta respectively). The delta values will be added back to the pixel after the boost phase. For example, if a pixel has a red ($R_1$) value of 1.5, the rdelta of 0.5001 will be stored and the pixel value will be represented in the vibrancy boost by a red ($r_1$) value of 0.9999, after the boost phase, the rdelta 0.5001 will be added back into the red value.

$$\text{gray} = (r_1 + g_1 + b_1) * 0.33333 \tag{19A}$$

$$gi = 1.0/\text{gray} \tag{19B}$$

$$gii = 1.0/(1.0 - \text{gray}) \tag{19C}$$

$$r\text{sat} = \min(\max((r_1 - \text{gray})*gii, (\text{gray} - r_1)*gi), 0.99999) \tag{19D}$$

$$g\text{sat} = \min(\max((g_1 - \text{gray})*gii, (\text{gray} - g_1)*gi), 0.99999) \tag{19E}$$

$$b\text{sat} = \min(\max((b_1 - \text{gray})*gii, (\text{gray} - b_1)*gi), 0.99999) \tag{19F}$$

$$\text{sat} = \max(r\text{sat}, g\text{sat}, b\text{sat}) \tag{19G}$$

$$\text{skin} = (\min(\max(0, \min(r_1 - g_1, g_1 * 2 - b_1)) * 4 * (1 - r\text{sat}) * gi, 1)) * 0.7 + 0.15 \tag{19H}$$

$$t\text{sat} = 1 - (1 - \text{sat})^{\wedge}(1 + 3 * \text{vibrance}) \tag{19I}$$

$$\text{boost} = (1 - \text{skin}) * (t\text{sat}/\text{sat} - 1) \tag{19J}$$

Equations (19A)-(19J) are used to compute saturation adjustment value "boost" for the pixel. "Gray" represents an average of the color components and is used to compute saturation adjustments ("rsat", "gsat", "bsat") for each color component. The largest of these saturation adjustments is then used as an overall saturation adjustment variable "sat". Equation (19H) is used to create a term to protect the skin tone pixels from being boosted. In some embodiments, the skin colors were previously adjusted by the white balance operation and changing them further by too large an amount is not desirable. The "vibrance" term previously calculated in equation (17) is used in equation (19I) to affect the "tsat" value, which is used for calculating the saturation boost ("boost") value in equation (19J). As equation (19J) shows, the "boost" value is tempered by the "skin" value. When the "skin" value is relatively large, indicating skin tone, the boost value is reduced to a fraction of what it would be for a non skin tone pixel. In some embodiments, the equations are adjusted so that the "Boost" value is zero for skin tone pixels. In some embodiments the code is adjusted so that the "Boost" value is otherwise not applied to skin tone pixels.

$$r_2 = \max((\min(r_1 + (r_1 - \text{gray})*\text{boost}), 1), 0) \tag{20A}$$

$$g_2 = \max((\min(g_1 + (g_1 - \text{gray})*\text{boost}), 1), 0) \tag{20B}$$

$$b_2 = \max((\min(b_1 + (b_1 - \text{gray})*\text{boost}), 1), 0) \tag{20C}$$

Equations (20A)-(20C) calculate the adjustment to the individual color components from the saturation boost term "boost". The equations generate pixel component values $r_2$, $g_2$, and $b_2$ by subtracting the average pixel value from the component value ($r_2$, $g_2$, and $b_2$, respectively), boosting the remaining portion of the component value by a factor of "boost" and then adding the component value to the boosted value. For example, for pixel 1920 (in FIG. 19) with its r (0.4), g (0.5), and b (0.6) values, the average value (i.e. the "gray" number) would be 0.5. Assuming a boost value of 2 (this is not the calculated value, it is used here for clarity), the blue value (0.1 above the "gray" level) would increase by 0.2 (from 0.6 to 0.8). The green value (at the "gray" level) would be unchanged. The red value (0.1 below the "gray" level) would drop by 0.2 (from 0.4 to 0.2).

For component values that were originally between 0 and 1 (or in some embodiments, between 0.0001 and 0.9999, inclusive), the adjustment stops here. However, for pixels with high dynamic range values, previously stored as deltas by equations (18D)-(18F), the deltas are added back by equations (21A)-(21C).

$$R_2 = r_2 + r\text{delta} \tag{21A}$$

$$G_2 = g_2 + g\text{delta} \tag{21B}$$

$$B_2 = b_2 + b\text{delta} \tag{21C}$$

After adjusting (at 1850 of FIG. 18) the vibrancy of the image, the process of automatically setting the vibrancy ends and in some embodiments, the process of setting up a tonal response curve starts.

IV. Shadow Lift Enhancement

After performing the saturation/vibrancy enhancement described above, the image editing applications of some embodiments perform a shadow lift operation. A shadow lift operation increases the contrast of the dark areas of the image. Some embodiments use a variable gamma adjustment to perform the shadow lift operation. A description of the shadow lift operation of some embodiments can be found in U.S. patent application Ser. No. 13/152,811 "Color-Space Selective Darkness And Lightness Adjustment", which is incorporated herein by reference. Proper shadow lifting improves the appearance of a digital image by allowing items in the shadows to be seen more clearly. However, lifting the shadow image too much can make the image look worse. Therefore, the automatic enhancement system of some embodiments generates a structure histogram of the image and uses it to determine what level of shadow lift to apply to the image.

A. Structure Histograms

A traditional histogram of an image (e.g., a luminance histogram) determines statistics about the individual pixels of image. In the case of a luminance histogram, the luminance values of the image are grouped into bins for the histogram, with each bin containing a range of luminance values. The established range for a bin in the histogram could be simply one increment of luminance (i.e., the smallest possible difference in luminance available on the applicable scale), meaning that each bin contains pixels with identical luminance values. Once the bins are established, the histogram is generated by placing one count in a bin for each pixel with a value in the established range for the bin. To visually display the histogram, a graph can be generated with, for example, the bin values on the x-axis and the number of pixels in each bin on the y-axis. One limitation of such a traditional histogram is that it does not contain any information about the structure of the image, only about the individual pixels. Therefore, two images with completely different scenes can result in identical histograms. A structure histogram, on the other hand, does contain information about the structure of the image.

Figure 22:
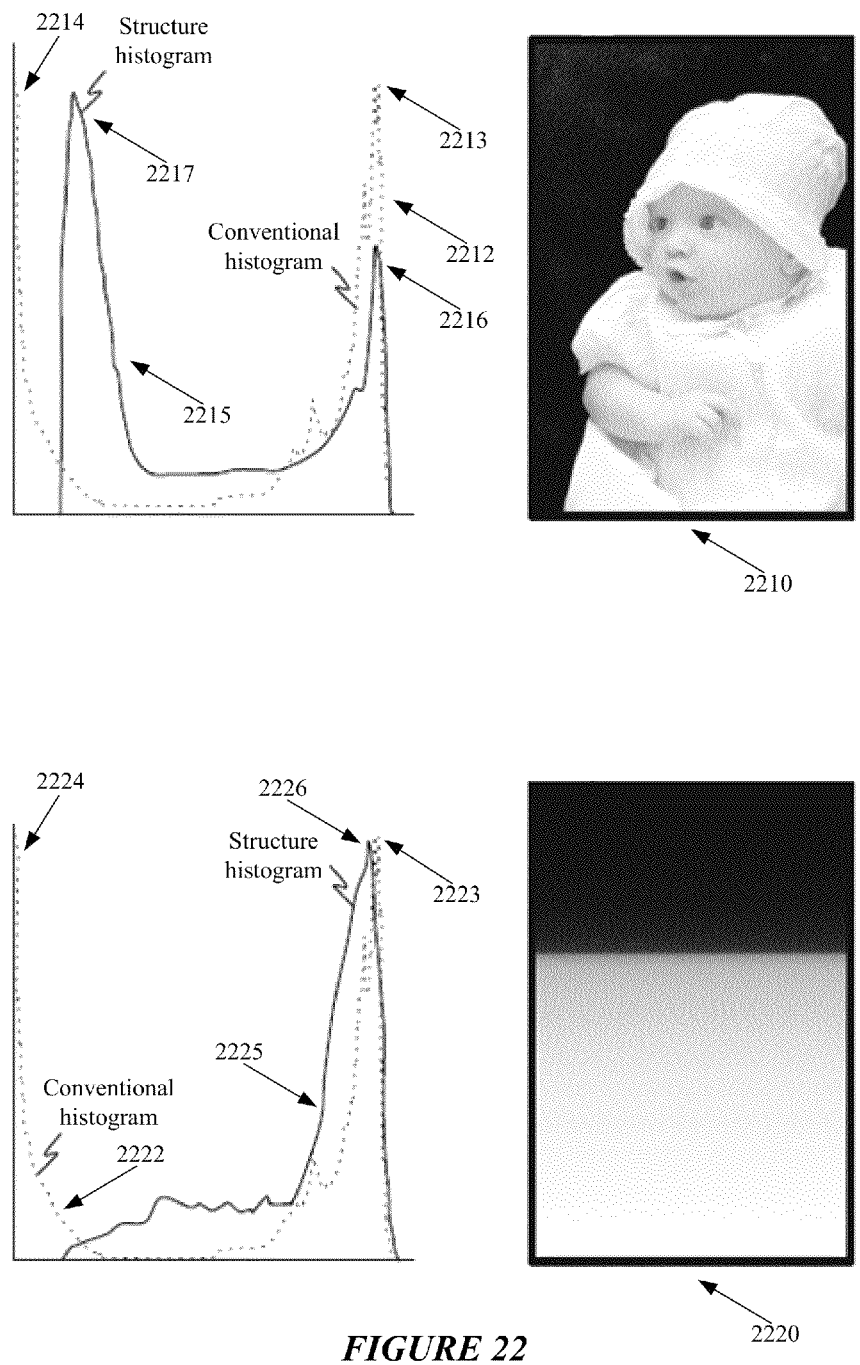
FIG. 22 illustrates the differences between structure histograms of some embodiments and traditional histograms for two different images.

FIG. 22 illustrates the differences between structure histograms of some embodiments and traditional histograms for two different images. The figure includes image 2210, conventional histogram 2212, with peaks 2213 and 2214, structure histogram 2215, with peaks 2216 and 2217, image 2220, conventional histogram 2222, with peaks 2223 and 2224, and structure histogram 2225, with peak 2226.

Image 2210 is the image of a baby with a bonnet. Conventional histogram 2212 is a conventional histogram of the image 2210 of the baby. The histogram has peaks 2213 and 2214. The peaks 2213 and 2214 are measures of large counts in the conventional histogram. Structure histogram 2215 is a structure histogram of the image 2210 of the baby. The structure histogram 2215 has peaks 2216 and 2217. The peaks 2216 and 2217 are measures of large counts of pixels with neighbors in that range in the structure histogram. Image 2220 is an image generated from the image 2210 of a baby with a bonnet. In the image 2220, the pixels of the image of the baby have been rearranged in order of luminance. The brightest pixels from the baby picture are on the bottom of image 2220 and the darkest pixels are on the top of the image. Conventional histogram 2222 is a conventional histogram of the image 2220 of the ordered pixels. The histogram has peaks 2223 and 2224. The peaks 2223 and 2224 are measures of large counts in the conventional histogram. Structure histogram 2225 is a structure histogram of the image 2220 of the ordered pixels. The structure histogram 2225 has a peak 2226. The peak 2226 is a measure of a large count in the structure histogram. Pseudocode for generating the conventional histograms 2212 and 2222 is found in Table 2.

TABLE 2

Conventional Histogram Pseudocode int histogram[256] = 0 // define a histogram having 256 elements or bins
int count = 0 // count is a measure of the number of pixels in the image
for p in image // for each pixel in an image do ...
histogram[luminance(p)] = histogram[luminance(p)] +1
count = count +1
end "p" (pixel) loop
plot histogram/count In Table 2. "luminance(p)" is a function that returns the luminance of the pixel (p) (e.g., an integer between 0 and 255).

The pseudocode of Table 2 generates a histogram whose values are based only on the luminance values of the individual pixels in the image. When the pseudocode in table 2 is applied to the baby image 2210, it produces conventional histogram 2212. When the pseudocode in Table 2 is applied to the image 2220 of ordered pixels, it produces conventional histogram 2222. Because the individual pixels in image 2210 have the same values as the individual pixels in image 2220, the conventional histograms 2212 and 2222 generated from the respective images are identical. The peaks 2213 and 2223 indicate that there are a large number of very bright pixels in each image (e.g., the baby's clothes in image 2210 and the pixels near the bottom of image 2220). The peaks 2214 and 2224 indicate that there are a large number of very dark pixels in each image (e.g., the background of the baby in image 2210 and the pixels near the top in image 2220).

Even though the images 2210 and 2220 are very different from each other, there is no difference in the conventional histograms 2212 and 2222. However, a shadow lift setting that would be a good setting for image 2210, would not necessarily be a good setting for shadow lifting another image with the same pixels in a different order, such as image 2220. Therefore the conventional histograms are not a useful tool for being the sole determining factor of what is a good shadow lift setting for each of the two images. The structure histograms 2215 and 2225 are different for the two different images 2210 and 2220. Pseudocode for generating the structure histograms is found in Table 3.

TABLE 3

Illustrative structure histogram pseudocode int histogram[256] = 0 // define a histogram having 256 elements or bins
int count = 0 // count is a measure of the complexity of the image
int i = 0
for p in image // for each pixel in an image do ...
for n of p // for each neighbor pixel do ...
// increment the value of each histogram element
// between p and its neighbor pixel n
for i = { min( lum(p), lum(n) ) + 1} to { max(lum(p), lum(n)) − 1 }
histogram [i ] = histogram [i ] + 1
count = count + 1
end "i" loop // bins between p and n pixels
end "n" (neighbor) loop
end "p" (pixel) loop
plot histogram/count In Table 3, lum(p) is a function that returns the luminance of pixel (p) (e.g., an integer between 0 and 255). The pseudocode for the structure histogram is a bit more complicated than the pseudocode for the conventional histogram. Like the conventional histogram pseudocode, the structure histogram pseudocode checks each pixel in the image. However, where the conventional histogram values are determined by the luminance values of the individual pixels alone, the structure histogram values are determined by the relationship between each pixel and its neighboring pixels. For example, if a pixel has a luminance of 200, and each of its eight neighbors has a value of 205, then the histogram will add one to each of the bins between the pixel (200) and its neighbors (205). That is, one count will be added to each bin 201, 202, 203, and 204 for each of the neighbors. This will add a total of 32 to the variable "count" which is used to normalize the histogram once it is complete. In some embodiments, neighboring pixels with the same value and/or pixels differing from each other by one value are not counted in the structure histogram.

A bin in a structure histogram generated by the pseudocode of Table 3 only gets a count if there are neighboring pixels with differing values. In image 2210, there is a great deal of fine structure (texture) in the dark background of the image. Accordingly, the pseudocode for the structure histogram includes a peak 2217 at a fairly low bin level. In contrast, the ordered pixels in image 2220 have very little structure, the black rectangle at the top includes many rows of pixels with the same value (e.g., zero), then a one row transition to pixels of another value. If the pixels in the next row are only one value away from the previous row (e.g., the upper row is zero and the next row is one) some embodiments will not add anything to any bin as a consequence. Even in embodiments which count pixels that differ by one value, there are relatively few neighboring dark pixels with differing values in image 2220. Therefore, there is no peak in structure histogram 2225 analogous to peak 2217 in structure histogram 2215.

In image 2210, there is large amount of detail and texture among the bright pixels, therefore there is another peak 2216 near the high end of the histogram scale. In image 2220, the amount of detail overall is severely reduced compared to the amount of detail in image 2210. This results in a lower value for the "count" variable used to normalize structure histogram 2225 than the "count" value used to normalize structure histogram 2215. Because the normalizing factors are different, the sizes of the peaks cannot be directly compared from one structure histogram 2215 or 2225 to the other. Accordingly, the large peak 2226 of structure histogram 2225 may represent less actual detail than the smaller peak 2216 of structure histogram 2215. However, the peak 2226 does signify that what little structural detail is left in image 2220 can be found among the brightest pixels.

Structural histograms, such as described above can be used by an image editing application of some embodiments to determine a desirable setting for an automatic shadow lift operation. Other types of structural histograms can also be used in some embodiments. For example, a structural histogram could be generated by a down sampled image. Or use a sample of pixels in an image to calculate a histogram rather than all the pixels in an image. In some embodiments, fewer neighboring pixels could be used. For example, for natural images, using a single neighbor (e.g., the lower right neighbor) for each pixel yields satisfactory results. Further details on structure histograms can be found in U.S. patent application Ser. No. 13/412,368, filed Mar. 5, 2012, which is incorporated herein by reference.

B. Automatic Setting for Shadow Lifting

Figure 23:
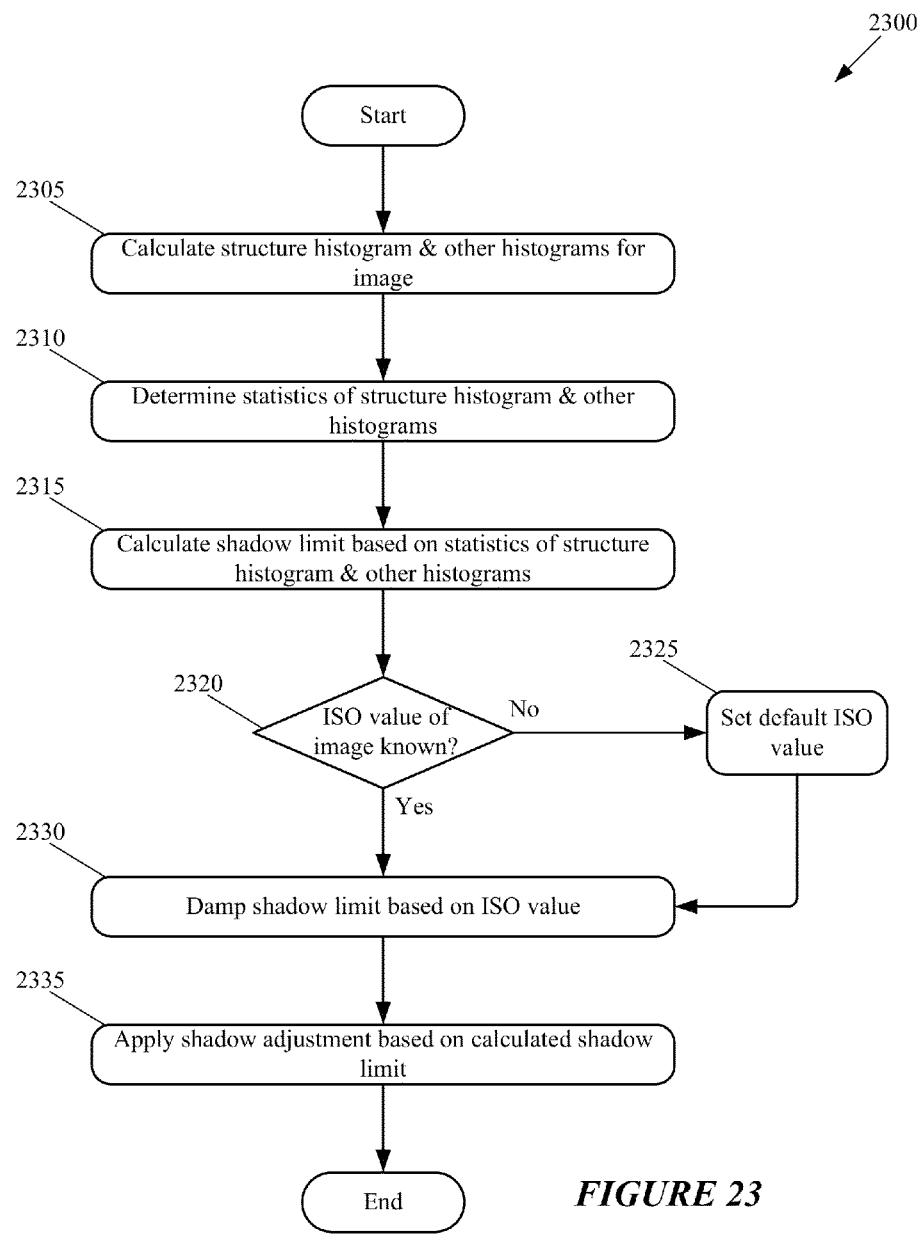
FIG. 23 conceptually illustrates a process of some embodiments for automatically generating a shadow lift enhancement input value.

FIG. 23 conceptually illustrates a process 2300 of some embodiments for automatically generating a shadow lift enhancement input value. The process 2300 begins by calculating (at 2305) a structure histogram and other histograms for the image. The structure histogram calculated for the image in some embodiments can be any of the structural histograms described in the Ser. No. 13/412,368 application or any other structural histogram that distinguishes between images with identical pixel values that are arranged in different arrangements.

Once a structure histogram and other histograms are calculated, the process 2300 determines (at 2310) various statistics of the histograms. For example, the process 2300 can determine the location of peaks in the histograms, the location of various percentiles of the histograms (e.g., the bins with the $5^{th}$ percentile, the $10^{th}$ percentile, the $90^{th}$ percentile, etc.). The process of some embodiments also calculates the widths of the peaks, the overall complexity of the image (e.g., by examining the "count" variable). After determining the various relevant statistics from the histograms, the process 2300 calculates (at 2315) a shadow lift setting based on the statistics.

Figure 24A:
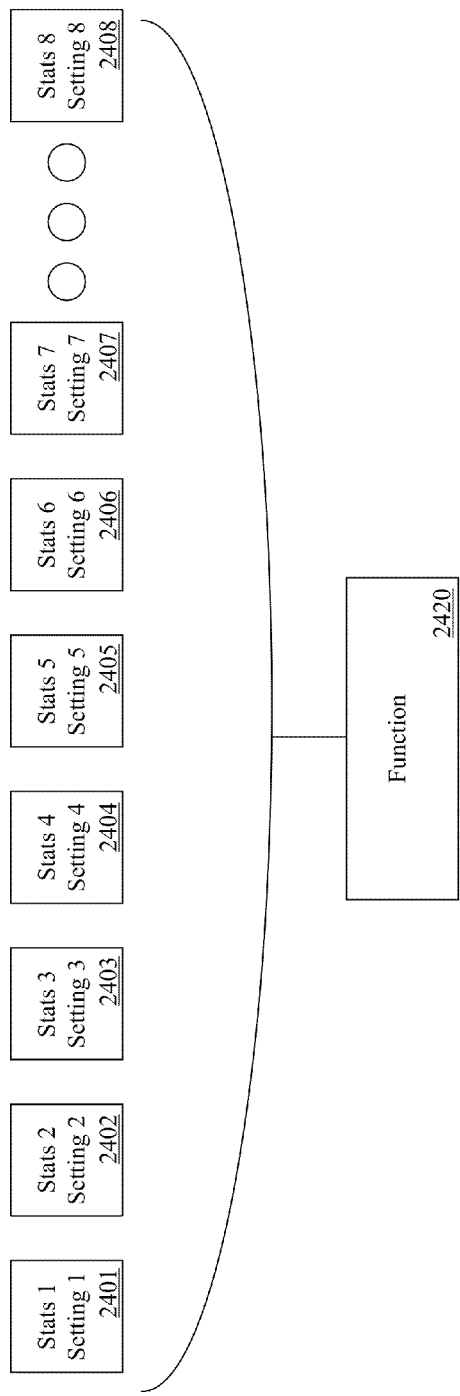
FIG. 24A conceptually illustrates the derivation of an equation for automatically determining a setting for shadow lifting.

The image editing application of some embodiments uses an empirically derived formula for determining a setting for the shadow lift enhancement. The generation of such a formula will be described in relation to FIGS. 24A, 24B, and 25, before returning to the discussion of FIG. 23. FIG. 24A conceptually illustrates the derivation of an equation for automatically determining a setting for shadow lifting. The figure includes image data items 2401-2408 and function box 2420. The image data items 2401-2408 each represents a set of statistics for a separate image, coupled with a maximum setting. The function box 2420 represents a best fit function derived from the statistics and settings of image data items 2401-2408.

For each of the image data items 2401-2408, the statistics are structure histogram statistics of the image represented by that data item. In some embodiments, the structure histogram algorithms and other histogram algorithms used to generate the statistics of image data items 2401-2408 are the same structural histogram algorithms and other histogram algorithms that the application uses in operation 2305. The settings in each of the data items 2401-8 are determined by a person who selected the highest setting (from multiple possible shadow lift settings) that produced good results for that image. That is, someone looked at an image at multiple shadow lift levels and decided what the highest shadow lift level could be before the image started looking worse with increased shadow lift settings. The function in function box 2420 is derived from the multiple data items 2401-2408. The actual number of images used to generate the function can be greater than 8, equal to 8, or less than 8 in some embodiments. For example, in some embodiments, the number of analyzed images is in the hundreds.

As mentioned above, in some embodiments, the process 2300 (of FIG. 23) calculates multiple histograms. The application of some embodiments calculates a conventional luminance histogram, a cumulative luminance histogram that reports the percentile of any value in the luminance histogram, and a structure histogram. The application of some embodiments extracts multiple data points from the histograms. In some embodiments, these data points include some or all of (1) maximums of any or all histograms, (2) values of each histogram at the location of the structure histogram peak, (3) values of each histogram at half the height of the structural peak to the right of the structural peak, (4) values of each histogram at half the height of the structural peak to the left of the structural peak, (5) the sum of the histograms within each of the following percentile bands of the structure histogram: 0-5% 5-30% 30-60% 60-100%, (6) the values at 25% and 50%, (7) the sums at 25% and 50%. In some embodiments, whenever the luminance histogram value (along the y-axis) is recorded as an input, the luminance location (along the x-axis) is also recorded as an input. In addition, the application of some embodiments includes some or all possible differences and products of pairs of those numbers in the input data as well. A function in some embodiments is generated by a mathematical regression using the multiple images and the types of terms described above to generate weighting values for each of a large number of terms. In some embodiments, the regression generates a function with values for hundreds of terms and combinations of terms. For some embodiments described in this paragraph, and for some embodiments elsewhere in this application "values" can include both y-axis values and x-axis locations.

Figure 24B:
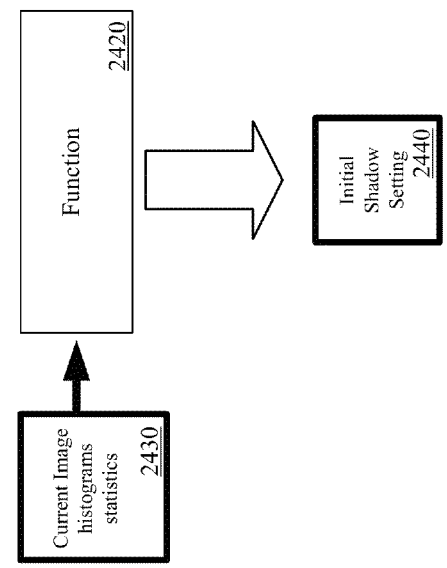
FIG. 24B conceptually illustrates the use of the derived function with the statistics of a current structure histogram.

FIG. 24B conceptually illustrates the use of the derived function with the statistics of a current structure histogram and other histograms. The figure includes function box 2420 and current image structure histogram statistics and other histogram statistics 2430. The statistics 2430 of the current image are fed into the previously derived formula 2420 and the formula generates an initial shadow lift setting 2440.

The initial shadow lift setting 2440 determines an amount to enhance detail in the darker areas (shadows) of an image. However, not all details in shadows are real. Images can have digital artifacts. A digital artifact is a visible object on the image that does not represent anything physically present in the scene from which the image was captured. Artifacts can mimic texture in an image taken of a smooth background. Any image has an associated International Organization for Standardization (ISO) value. The ISO value is a measure of the sensitivity of the camera during the capture of a particular image. The more sensitive the camera, the larger the ISO value is. The ISO value is known in the art and is based in part on the exposure time and the brightness of a scene as well as the aperture f-number of the camera. In general, the larger the ISO number, the more digital artifacts will be found in the dark areas of the image. A high amount of shadow lifting of an image with a high ISO number can enhance the artifacts and make them highly visible (which is undesirable). Accordingly, some embodiments reduce the calculated shadow lift setting of the artifacts by applying a function of the ISO number.

Figure 25:
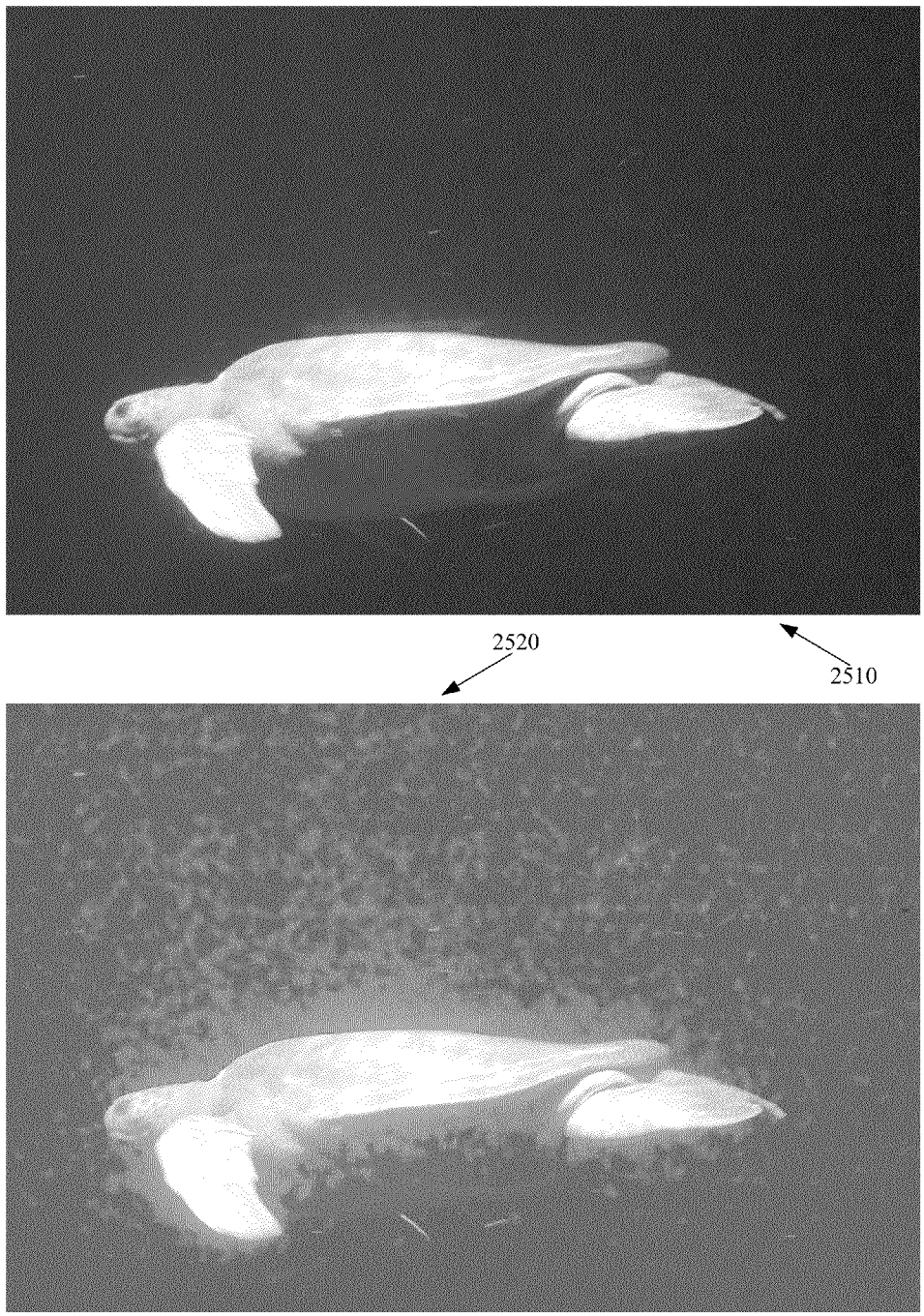
FIG. 25 illustrates the effects of too high a shadow lift setting on an image with a high ISO.

FIG. 25 illustrates the effects of too high a shadow lift setting on an image with a high ISO. The images in the figure are both adjusted images of an input image with a high ISO value, one is adjusted with a low shadow lift setting, the other is adjusted with a high shadow lift setting. FIG. 25 includes shadow lifted images 2510 and 2520. Image 2510 has been adjusted with a shadow lift operation with a low setting, to account for the high ISO value of the input image. Image 2520 has been adjusted with a high shadow lift operation. The dark water in the background of image 2520 includes speckles that are artifacts caused by the high ISO value rather than being an accurate depiction of the scene from which the input image was captured. Thus the image 2520 demonstrates the advantages of keeping the shadow lift setting low for images with a high ISO value.

Returning to FIG. 23, once the initial setting is calculated (at 2315), the process determines (at 2320) whether the ISO value of the image is known. That is, the process determines whether the ISO value for that particular image is stored as metadata of the image. If the ISO value is not stored as metadata of the image, then the process sets (at 2325) a default value for the ISO. In the applications of some embodiments, the default ISO number is 100. Once the ISO value is either identified from the metadata, set by default (or in some embodiments identified by the user), the process 2300 limits (at 2330) the initially determined shadow lift setting by using equation (22)

$$\text{Shad\_}f=\max(0.25, 0.6\text{-}ISO/16000)*\tan h(\min(1,\max(0,\text{Shadow\_initial}))) \quad (22)$$

In equation (22), "Shadow_initial" is the initial shadow value determined in operation 2315 from the empirically derived formula for the shadow lift calculation. "ISO" is the ISO value used for the image, either the actual ISO taken from the metadata of the image or the default ISO of 100 from operation 2320. "Shad_f" is the final automatically calculated shadow lift setting. By application of equation (22), the initial shadow level will go to a number between 0 and about 0.457. One of ordinary skill in the art will understand that other functions of the ISO value can be used in some embodiments to temper the shadow lift setting. The final shadow lift setting will then be applied on a pixel by pixel and color by color basis to the shadow adjustment equations (23A)-(23C).

$$r_{adjusted} = r_{input}\hat{\,}(2\hat{\,}((\text{Shad\_}f\text{-}(\text{blur}/\text{colorscale}))*2)) \quad (23A)$$

$$g_{adjusted} = g_{input}\hat{\,}(2\hat{\,}((\text{Shad\_}f\text{-}(\text{blur}/\text{colorscale}))*2)) \quad (23B)$$

$$b_{adjusted} = b_{input}\hat{\,}(2\hat{\,}((\text{Shad\_}f\text{-}(\text{blur}/\text{colorscale}))*2)) \quad (23C)$$

In equations (23A)-(23C) "$r_{adjusted}$" is the red value of the pixel after adjustment, "$r_{input}$" is the red value of the pixel in the input image, "$g_{adjusted}$" is the green value of the pixel after adjustment, "$g_{input}$" is the green value of the pixel in the input image, "$b_{adjusted}$" is the blue value of the pixel after adjustment, "$b_{input}$" is the blue value of the pixel in the input image. "Shad_f", as in the previous equation, is the final automatically calculated shadow value. "blur" is the value of a corresponding pixel in a Gaussian blur of the input image (the Gaussian blurred image is described further in subsection C, below). "Colorscale" is a scaling variable that serves to increase the colorfulness of the image and is set to various values in the application of various embodiments. In some embodiments it is set to 0.5. In some embodiments, "colorscale" has different values for one or more of the color components. U.S. patent application Ser. No. 13/152,811 has more detail on the shadow lifting of input images. Once the shadow lift setting has been calculated, the process 2300 applies (at 2335) the shadow lift to the image.

C. Skin Protection in Shadow Lifting

Figure 26:
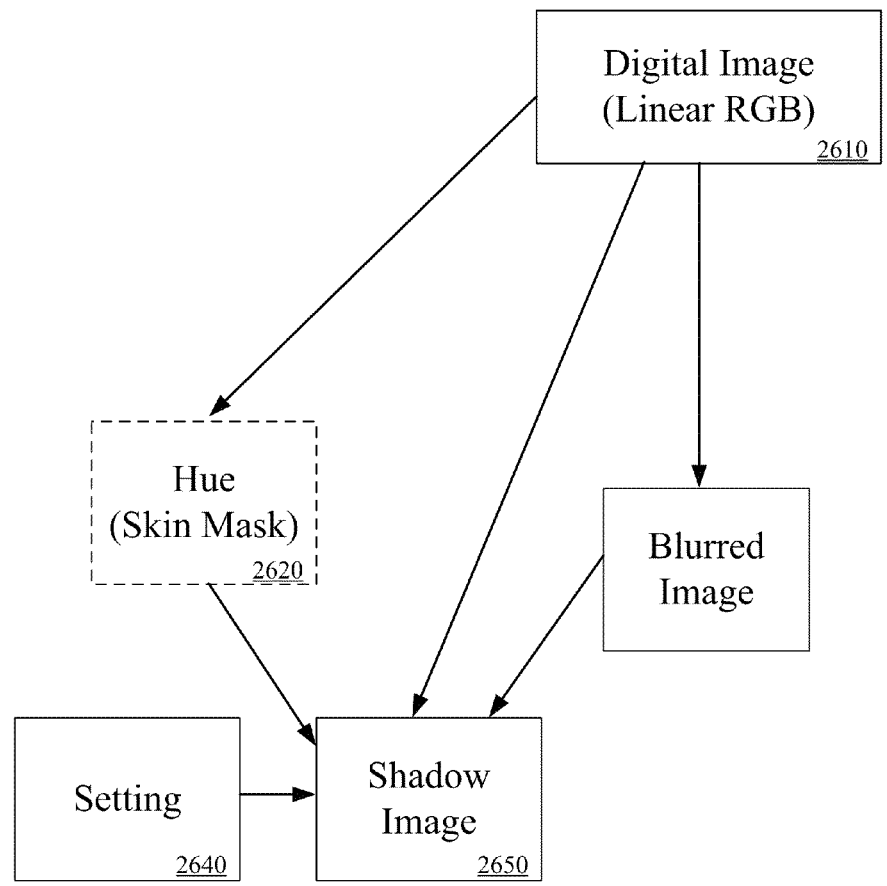
FIG. 26 conceptually illustrates the inputs that go into generating a shadow image.

U.S. patent application Ser. No. 13/152,811 describes the manual adjustment of shadow images using a user input. The Patent Application describes masking of skin areas from the shadow lifting process in order to avoid desaturation of the skin colors. However, in some embodiments described herein, the protection of skin from shadow lifting values is shut off for large values of shadow lifting, or when no faces are found in the image. FIG. 26 conceptually illustrates the inputs that go into generating a shadow image. The figure includes inputs that are always used and an input that is selectively used. The figure includes input digital image 2610 (in a linear RGB color space), a skin mask 2620, a blurred image 2630, a setting 2640, and a shadow adjusted image 2650. The input digital image in some embodiments is the output image from the vibrancy adjustment. In some cases the input image is any digital image to be adjusted, whether it had been previously adjusted or not. The skin mask 2620 is a mask of the image that distinguishes those areas of the image with skin from those areas that are not skin. The blurred image 2630 is a Gaussian blurred version of the input image used to temper the gamma adjustment of the image. The setting 2640 is either the user setting or the automatic setting. The shadow image 2650 is the shadow lifted adjusted image.

From an input digital image 2610, the applications of some embodiments generate a skin mask 2620 that identifies regions of the image containing skin. In some embodiments, the skin regions are identified by color. In some embodiments, the skin mask is used to designate areas that will not have the shadow lifting operation performed on them. The skin mask in some embodiments designates areas that will have a reduced shadow lift operation performed on them (or no shadow lift operation at all in some embodiments). For example, some embodiments generate a single gamma function for the skin areas and a variable gamma function for the non-skin areas. Some such embodiments then use the skin mask to modulate between these gamma values on a per-pixel basis. More on skin masking can be found in U.S. patent application Ser. No. 13/152,811. Some embodiments turn off skin protection under some circumstances, which will be described below with respect to FIGS. 27-29.

In order to perform the shadow lift operation, some embodiments of the application generate a Gaussian blurred image 2630 to use with equations (23A)-(23C), above. The Gaussian blurred image allows local gamma adjustment with the darker areas receiving more extreme adjustments and the lighter areas receiving less extreme adjustments. In that way, the shadows get lifted but the bright areas are only changed slightly. The Gaussian image (the "blur" term in the equations) is applied in the equations (23A)-(23C) on a pixel by pixel basis, so each pixel in the image (other than skin masked areas in some embodiments) gets its own gamma adjustment. The setting 2640 can be any setting the user chooses, or can be the automatically determined setting described in subsection B, above. Together, the setting 2640, the digital image 2610, the Gaussian blurred image 2630, and the skin mask 2620 (when applied) will determine a value for each pixel in the adjusted shadow image 2650.

Figure 27:
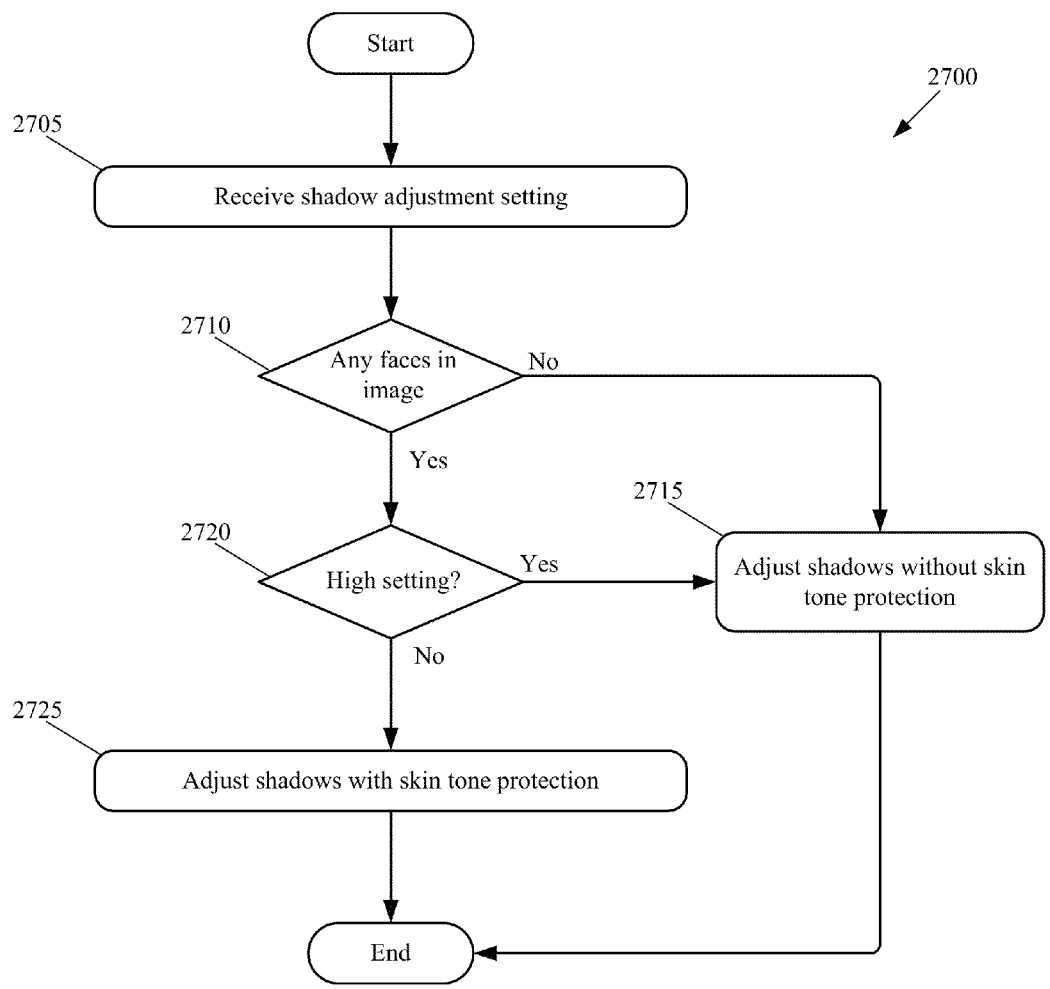
FIG. 27 conceptually illustrates a process of some embodiments for applying or not applying skin tone protection in a shadow lifting operation.
Figure 28:
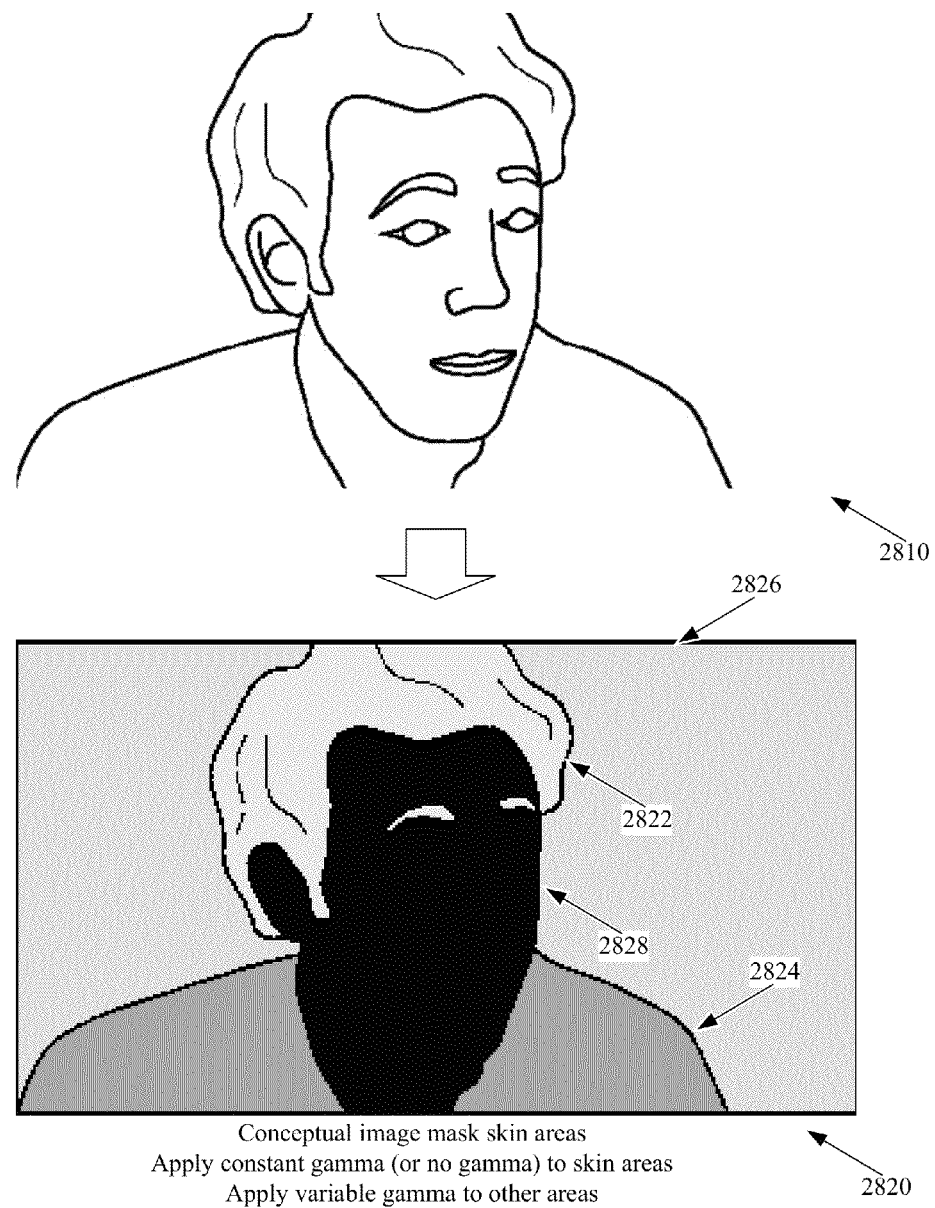
FIG. 28 illustrates an image to be adjusted with a low shadow lift setting.

FIG. 27 conceptually illustrates a process 2700 of some embodiments for applying or not applying skin tone protection in a shadow lifting operation. The process will be described in relation to FIGS. 28 and 29, which will be briefly described first. FIG. 28 illustrates an image to be adjusted with a low shadow lift setting. The figure includes the original image and a conceptual version of a shadow lifting mask. The figure includes input image 2810 and shadow lifting mask 2820. The shadow lifting mask 2820 includes Gaussian blurred areas 2822, 2824, and 2826, and skin tone mask area 2828. The input image 2810 is an image of a person, and thus includes the face of the person. The shadow lifting mask 2820 is a conceptual combination of the Gaussian blurred image with the skin tone mask. In the areas 2822-2826, there is no skin, therefore the Gaussian blurred image is used to determine the shadow lift adjustment of the areas 2822-2826.

The Gaussian blurred areas each provide their own level of gamma correction, which is why each of the areas (hair, shirt, and sky) is shown in the figure in a different shade of gray. One of ordinary skill in the art will understand that although the different brightness levels of each area are shown as uniform within a large area, in a real image, the Gaussian blur creates a set of different gamma adjustments that are different on a much smaller scale than a whole shirt or a whole head of hair. One of ordinary skill in the art will understand that although the skin protection mask in some embodiments is a separate mask from the Gaussian blurred image, in other embodiments, the skin protection mask and Gaussian blurred image are provided as a combined mask that both protects the skin tones and lifts the shadows. Similarly one of ordinary skill in the art will understand that in some embodiments, some or all of the masks are conceptual masks and only individual pixels of the masks are calculated at any one time. However, in other embodiments some or all of the masks are calculated independently and then the calculated mask is applied (e.g., on a pixel by pixel basis). Furthermore, in some embodiments, the skin mask for the shadows is calculated in the same way as, or in a similar way to, the skin mask described with respect to equation (19H).

Figure 29:
FIG. 29 illustrates an image to be adjusted with a high shadow lift setting.

FIG. 29 illustrates an image to be adjusted with a high shadow lift setting. The figure includes the original image and a conceptual version of a shadow lifting mask. The figure includes input image 2910 and shadow lifting mask 2920. The shadow lifting mask includes Gaussian blurred areas 2922, 2924, and 2926, and 2928. The input image 2910 is an image of a person, and thus includes the face of the person. The shadow lifting mask 2820 is a conceptual illustration of a Gaussian blurred image with no skin tone mask. In the areas 2922-2926, there is no skin, therefore the Gaussian blurred image is used to determine the shadow lift adjustment of the areas 2922-2926. In area 2928 there is skin, but in the illustrated embodiment, a high shadow lift setting eliminates the skin masking. The Gaussian blurred areas each provide their own level of gamma correction, which is why each of the areas (hair, shirt, face, and sky) is a different shade of gray.

Process 2700 in FIG. 27 begins by receiving (at 2705) a shadow adjustment setting. This setting can be received from the automatic shadow lift calculator (e.g., calculator 350) or from a user setting. The process then determines (at 2710) whether there are any faces in the image. If there are no faces, then the process adjusts (at 2715) the shadows without skin tone protection. If there are faces then the process 2700 determines (at 2720) whether the shadow adjustment setting is above a threshold setting. If the setting is below the threshold setting, then the process 2700 adjusts (at 2925) the shadows with skin tone protection. This is illustrated in FIG. 28 where shadow lifting mask 2820 includes skin tone protection area 2828. If the setting is determined (at 2720) to be above the threshold, then the skin tone protection is turned off as illustrated in FIG. 29 in which the shadow lifting mask 2920 does not include a skin tone protection area, but rather includes Gaussian blurred area 2928 over the face and neck of the person shown in the image 2910.

The above described embodiments of the shadow lift operation do not adjust the black point value of the previously described tonal response curve. However, the shadow lift operation may have effects on the image that include (but are not limited to) effects similar to moving the black point of the tonal response curve. For example, the shadow lift operation may cause some dark pixels to darken further or to become less dark.

While many of the figures above contain flowcharts that show a particular order of operations, one of ordinary skill in the art will understand that these operations may be performed in a different order in some embodiments. Furthermore, one of ordinary skill in the art will understand that the flowcharts are conceptual illustrations and that in some embodiments multiple operation may be performed in a single step. For example, in the tonal response curve flowchart of FIG. 14, in some embodiments a single mathematical equation determines both what is described as the initial upper mid-tone contrast value and adjusts the setting closer to the line. Similarly, in some embodiments a single combined equation determines whether to set the mid-tone point on the line and what value to give the mid-tone contrast point if it is not on the line.

In some of the descriptions of images described herein, some data calculations are shown as whole number (i.e., integer) calculations. Furthermore, some image formats described herein use integer values for the images (e.g., integers from 0 to 255). However, in some embodiments, some or all data calculations and computations are made with floating point values. In these cases, the image adjustments are based on floating point computations that are more precise (e.g., no round-off loss of data within a series of cumulative calculations) than computations based on integer values. Accordingly, in some embodiments, image detail is preserved by treating all values (i.e., integer and decimal values alike) as floating point values in order to perform any calculations or computations for making image adjustments. In some embodiments, the data is returned to integer form upon saving an image in an integer based format. Furthermore, in some embodiments the versions of the images displayed use the standard integer values for their color components, rounded from the floating point values stored for the various pixels in the image data of the image editing application.

Just as floating point data is used to preserve factional values, some embodiments use extended range data (e.g., data above or below the scale of the image storage format) in order to avoid losing detail that may later be returned to the normal scale range via some other operation of the image editing application. In some such embodiments, the visually presented version of the image presents the above range data as though it were at the top of the allowable scale, even though the actual data is allowed to have values exceeding the top of the normal scale.

While some embodiments described herein use a luminance scale from 0 to 1, one of ordinary skill in the art will understand that other luminance scales are used in other embodiments. For example, some embodiments use a luminance scale from 0 to 255. Similarly, though some of the above described enhancements were described as operating on luminance values of input images (e.g., in a luminance and two chrominance color space such as YIQ), some embodiments either in addition to or instead of operating on images in a YIQ space operate on images in a red, green, blue (RGB) space or other color spaces. Similarly, some embodiments have been described herein as being applied in an RGB color space. However, other embodiments perform these or similar operations in other color spaces.

V. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 30:
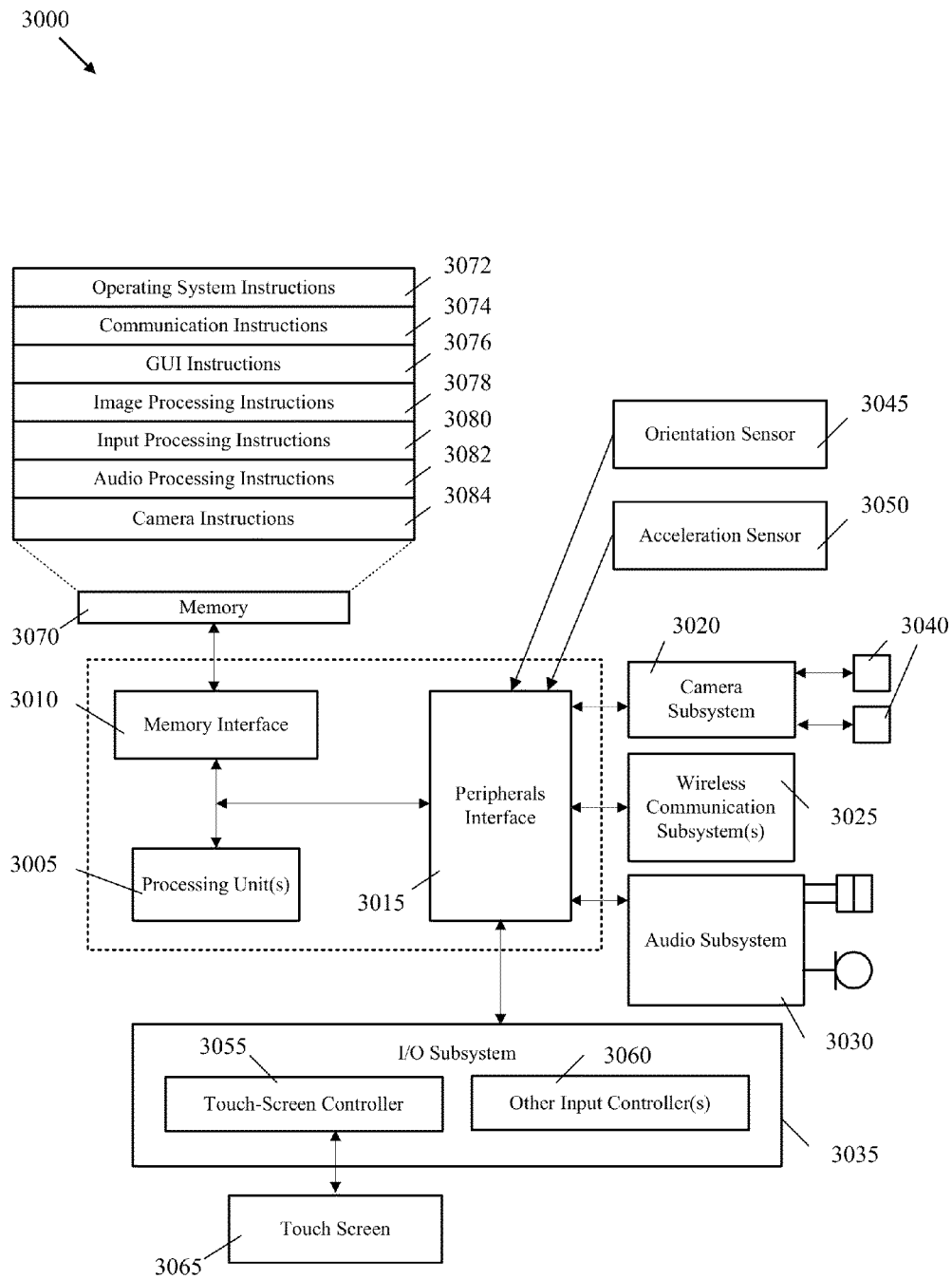
FIG. 30 is an example of an architecture of a mobile computing device.

The image editing and viewing applications of some embodiments operate on mobile devices. FIG. 30 is an example of an architecture 3000 of such a mobile computing device. Examples of mobile computing devices include smartphones, tablets, laptops, etc. As shown, the mobile computing device 3000 includes one or more processing units 3005, a memory interface 3010 and a peripherals interface 3015.

The peripherals interface 3015 is coupled to various sensors and subsystems, including a camera subsystem 3020, a wireless communication subsystem(s) 3025, an audio subsystem 3030, an I/O subsystem 3035, etc. The peripherals interface 3015 enables communication between the processing units 3005 and various peripherals. For example, an orientation sensor 3045 (e.g., a gyroscope) and an acceleration sensor 3050 (e.g., an accelerometer) is coupled to the peripherals interface 3015 to facilitate orientation and acceleration functions.

The camera subsystem 3020 is coupled to one or more optical sensors 3040 (e.g., a charged coupled device (CCD) optical sensor, a complementary metal-oxide-semiconductor (CMOS) optical sensor, etc.). The camera subsystem 3020 coupled with the optical sensors 3040 facilitates camera functions, such as image and/or video data capturing. The wireless communication subsystem 3025 serves to facilitate communication functions. In some embodiments, the wireless communication subsystem 3025 includes radio frequency receivers and transmitters, and optical receivers and transmitters (not shown in FIG. 30). These receivers and transmitters of some embodiments are implemented to operate over one or more communication networks such as a GSM network, a Wi-Fi network, a Bluetooth network, etc. The audio subsystem 3030 is coupled to a speaker to output audio (e.g., to output different sound effects associated with different image operations). Additionally, the audio subsystem 3030 is coupled to a microphone to facilitate voice-enabled functions, such as voice recognition, digital recording, etc.

The I/O subsystem 3035 involves the transfer between input/output peripheral devices, such as a display, a touch screen, etc., and the data bus of the processing units 3005 through the peripherals interface 3015. The I/O subsystem 3035 includes a touch-screen controller 3055 and other input controllers 3060 to facilitate the transfer between input/output peripheral devices and the data bus of the processing units 3005. As shown, the touch-screen controller 3055 is coupled to a touch screen 3065. The touch-screen controller 3055 detects contact and movement on the touch screen 3065 using any of multiple touch sensitivity technologies. The other input controllers 3060 are coupled to other input/control devices, such as one or more buttons. Some embodiments include a near-touch sensitive screen and a corresponding controller that can detect near-touch interactions instead of or in addition to touch interactions.

The memory interface 3010 is coupled to memory 3070. In some embodiments, the memory 3070 includes volatile memory (e.g., high-speed random access memory), non-volatile memory (e.g., flash memory), a combination of volatile and non-volatile memory, and/or any other type of memory. As illustrated in FIG. 30, the memory 3070 stores an operating system (OS) 3072. The OS 3072 includes instructions for handling basic system services and for performing hardware dependent tasks.

The memory 3070 also includes communication instructions 3074 to facilitate communicating with one or more additional devices; graphical user interface instructions 3076 to facilitate graphic user interface processing; image processing instructions 3078 to facilitate image-related processing and functions; input processing instructions 3080 to facilitate input-related (e.g., touch input) processes and functions; audio processing instructions 3082 to facilitate audio-related processes and functions; and camera instructions 3084 to facilitate camera-related processes and functions. The instructions described above are merely exemplary and the memory 3070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 30 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 30 may be split into two or more integrated circuits.

B. Computer System

Figure 31:
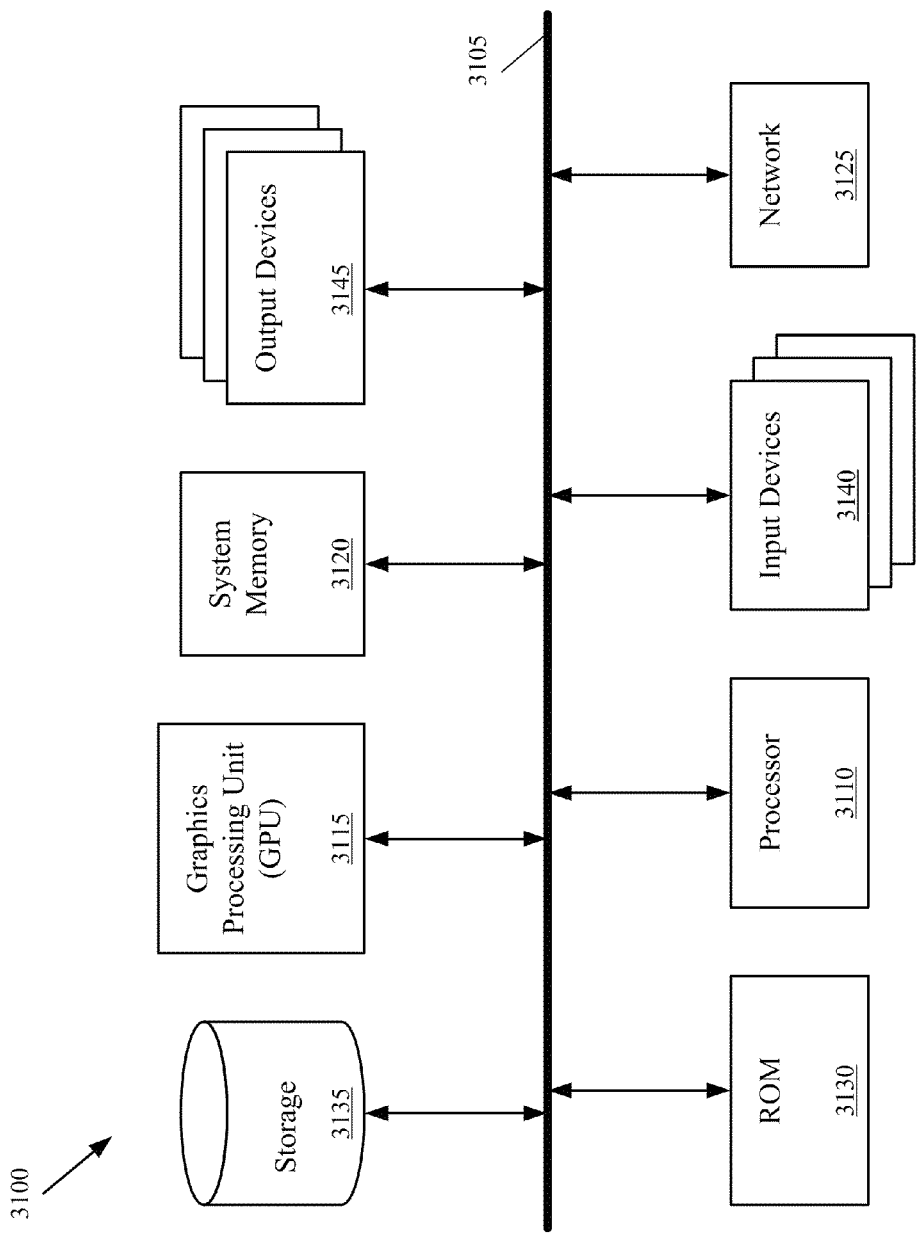
FIG. 31 conceptually illustrates another example of an electronic system with which some embodiments of the invention are implemented.

FIG. 31 conceptually illustrates another example of an electronic system 3100 with which some embodiments of the invention are implemented. The electronic system 3100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3100 includes a bus 3105, processing unit(s) 3110, a graphics processing unit (GPU) 3115, a system memory 3120, a network 3125, a read-only memory 3130, a permanent storage device 3135, input devices 3140, and output devices 3145.

The bus 3105 collectively represents all system, peripheral, and chipset buses that communicatively connect the numerous internal devices of the electronic system 3100. For instance, the bus 3105 communicatively connects the processing unit(s) 3110 with the read-only memory 3130, the GPU 3115, the system memory 3120, and the permanent storage device 3135.

From these various memory units, the processing unit(s) 3110 retrieves instructions to execute and data to process in order to execute the processes of the invention. The processing unit(s) may be a single processor or a multi-core processor in different embodiments. Some instructions are passed to and executed by the GPU 3115. The GPU 3115 can offload various computations or complement the image processing provided by the processing unit(s) 3110. In some embodiments, such functionality can be provided using CoreImage's kernel shading language.

The read-only-memory (ROM) 3130 stores static data and instructions that are needed by the processing unit(s) 3110 and other modules of the electronic system. The permanent storage device 3135, on the other hand, is a read-and-write memory device. This device is a non-volatile memory unit that stores instructions and data even when the electronic system 3100 is off. Some embodiments of the invention use a mass-storage device (such as a magnetic or optical disk and its corresponding disk drive) as the permanent storage device 3135.

Other embodiments use a removable storage device (such as a floppy disk, flash memory device, etc., and its corresponding drive) as the permanent storage device. Like the permanent storage device 3135, the system memory 3120 is a read-and-write memory device. However, unlike storage device 3135, the system memory 3120 is a volatile read-and-write memory, such a random access memory. The system memory 3120 stores some of the instructions and data that the processor needs at runtime. In some embodiments, the invention's processes are stored in the system memory 3120, the permanent storage device 3135, and/or the read-only memory 3130. For example, the various memory units include instructions for processing multimedia clips in accordance with some embodiments. From these various memory units, the processing unit(s) 3110 retrieves instructions to execute and data to process in order to execute the processes of some embodiments.

The bus 3105 also connects to the input and output devices 3140 and 3145. The input devices 3140 enable the user to communicate information and select commands to the electronic system. The input devices 3140 include alphanumeric keyboards and pointing devices (also called "cursor control devices"), cameras (e.g., webcams), microphones or similar devices for receiving voice commands, etc. The output devices 3145 display images generated by the electronic system or otherwise output data. The output devices 3145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 31, bus 3105 also couples electronic system 3100 to a network 3125 through a network adapter (not shown). In this manner, the computer can be a part of a network of computers (such as a local area network ("LAN"), a wide area network ("WAN"), or an Intranet, or a network of networks, such as the Internet. Any or all components of electronic system 3100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 2, 5, 6, 7, 10, 12, 14, 18, 23, and 27) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, controls for setting the various adjustment settings as slider and numerical controls in FIG. 11. The sliders of such embodiments provide a visual indication of a setting value as a knob is slid along the slider to set a value for the slider. However, in some embodiments, the slider controls shown in any of those figures could be replaced with any other control capable of receiving a value (e.g., a single value), such as a vertical slider control, a pull down menu, a value entry box, an incremental tool activated by keyboard keys, other range related UI controls (e.g., dials, buttons, number fields, and the like), etc. Similarly, the slider controls shown in the figures are either depicted as being set with a finger gesture (e.g., placing, pointing, tapping one or more fingers) on a touch sensitive screen or simply shown in a position without any indication of how they were moved into position. One of ordinary skill in the art will understand that the controls of FIG. 11 and the tonal curve points of FIG. 17 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A method of automatically enhancing an image on an electronic device, the method comprising:
   receiving a single input to perform an automatic enhancement operation on the image, wherein the automatic enhancement operation comprises a plurality of separate enhancement operations that modify different characteristics of the image; and
   in response to the single input, automatically applying each of the separate enhancement operations to the image in succession by, for each enhancement operation:
      calculating an enhancement setting for the enhancement operation based on the image as adjusted by any previously applied enhancement operations; and
      applying the automatic enhancement operation based on the calculated setting to the image as adjusted by any previously applied enhancement operations, wherein the receiving, calculating, and applying are performed by the electronic device.

2. The method of claim 1, wherein the single input comprises a user selection of a triggering control for activating the automatic enhancement of the image.

3. The method of claim 1, wherein an automatic exposure adjustment operation is performed first by the automatic enhancement operation.

4. The method of claim 3, wherein a white balancing operation is performed second by the automatic enhancement operation.

5. The method of claim 4, wherein a vibrancy adjustment operation is performed third by the automatic enhancement operation, a tonal response curve remapping operation is performed fourth by the automatic enhancement operation, and a shadow lift operation is performed fifth by the automatic enhancement operation.

6. The method of claim 1, wherein an automatic white balancing operation is performed first by the automatic enhancement operation, the method further comprising:
   determining whether the image has extended data range pixels;
   if the image has extended data range pixels, performing an automatic exposure adjustment operation; and
   if the image does not have extended data range pixels, skipping the automatic exposure adjustment operation.

7. The method of claim 1 further comprising:
   determining whether there are faces in the image;
   if there are faces in the image, performing an automatic white balancing operation as part of the automatic enhancement operation; and
   if there are no faces in the image not performing the automatic white balancing operation as part of the automatic enhancement operation.

8. The method of claim 1 further comprising:
   determining whether the image is in a RAW format;
   if the image is in a RAW format, performing an automatic exposure adjustment operation; and
   if the image is not in a RAW format, skipping the automatic exposure adjustment operation.

9. A non-transitory machine readable medium storing a program which when executed on at least one processing unit edits an image, the program comprising sets of instructions for:
   receiving a single input to perform an automatic enhancement operation on the image, wherein the automatic enhancement operation comprises a plurality of separate enhancement operations that modify different characteristics of the image; and
   in response to the single input, automatically applying each of the separate enhancement operations to the image in succession by, for each enhancement operation:
      calculating an enhancement setting for the enhancement operation based on the image as adjusted by any previously applied enhancement operations; and
      applying the automatic enhancement operation based on the calculated setting to the image as adjusted by any previously applied enhancement operations.

10. The non-transitory machine readable medium of claim 9, wherein the program further comprises a set of instructions for selectively not performing at least one enhancement adjustment based on a characteristic of the image.

11. The non-transitory machine readable medium of claim 10, wherein the characteristic comprises a lack of faces in the image.

12. The non-transitory machine readable medium of claim 10, wherein the characteristic comprises the image being underexposed.

13. The non-transitory machine readable medium of claim 9, wherein the plurality of separate enhancement operations comprises a tonal response curve adjustment and a shadow lift adjustment.

14. The non-transitory machine readable medium of claim 13, wherein the plurality of separate enhancement operations further comprises a white balance adjustment.

15. A non-transitory machine readable medium storing a program which when executed by at least one processing unit provides a graphical user interface (GUI) for an image-editing application, the GUI comprising:
 a plurality of sliders for adjusting values for a plurality of parameters that define the application of image enhancement operations to an image;
 an automatic image enhancement activation control for causing the image-editing application to automatically determine values for each of the plurality of parameters and set slider positions for the plurality of sliders that correspond to the plurality of values, wherein for a subset of the plurality of sliders the corresponding value is adjusted without a change in the position of the sliders.

16. The non-transitory machine readable medium of claim 15, wherein the plurality of sliders comprise an exposure slider, a white balance warmth slider, a vibrancy slider and a shadow lift slider.

17. The non-transitory machine readable medium of claim 16, wherein a white balance value is a value that is adjusted without adjusting a corresponding white balance slider.

18. An electronic device for automatically enhancing an image, the electronic device comprising:
 a set of processing units; and
 a non-transitory machine readable medium storing a program which when executed by at least one processing unit automatically enhanced the image, the program comprising sets of instructions for:
  in response to receiving a single input to automatically enhance the image;
  automatically adjusting an exposure level of the image to generate an exposure adjusted image;
  automatically adjusting a color balance of the exposure adjusted image to generate a color balanced image, wherein an automatically calculated setting for adjusting the color balance is based on an analysis of the exposure adjusted image;
  automatically adjusting a vibrancy of the color balanced image to generate a vibrancy adjusted image, wherein an automatically calculated setting for adjusting the vibrancy is based on an analysis of the color balanced image;
  automatically performing a luminance curve adjustment to the vibrancy adjusted image to generate a luminance curve adjusted image, wherein an automatically calculated setting for adjusting the luminance curve adjustment is based on an analysis of the vibrancy adjusted image; and
  automatically adjusting shadow levels of the luminance curve adjusted image to generate a shadow level adjusted image, wherein an automatically calculated setting for adjusting the shadow level is based on an analysis of the vibrancy adjusted image.

19. The electronic device of claim 18, wherein the set of instructions for automatically adjusting the color balance of the exposure adjusted image comprises sets of instructions for:
 translating the image into a wide gamut color format;
 identifying a face in the image;
 determining a color direction from a color of the identified face to a preset face color; and
 adjusting color values of each of a plurality of pixels in the image in the color direction from the color of the identified face to the preset face color.

20. The electronic device of claim 19, wherein the program further comprises a set of instructions for determining a color magnitude from the color of the identified face to the preset face color, wherein for each pixel, the adjusting of the color value is by a color amount determined by the color magnitude and a chroma level of the pixel.

21. The electronic device of claim 19, wherein the program further comprises a set of instructions for translating the image from the wide gamut color format into an opponent color format.

22. The electronic device of claim 21, wherein the opponent color format is a YIQ color format.

23. The electronic device of claim 22, wherein the program further comprises a set of instructions for, before translating the image from the wide color format into the opponent color format, applying a gamma adjustment to the image in the wide gamut color format.

24. The electronic device of claim 23, wherein the set of instructions for adjusting the color values comprises a set of instructions to perform the adjustment in the opponent color space, the program further comprising a set of instructions for, after the adjusting of the color values, translating the image back into a wide gamut color format.

25. The electronic device of claim 24, wherein the program further comprises a set of instructions for, after translating the image back into the wide gamut color space, performing an inverse gamma adjustment on the image and translating the image into a non-wide gamut color format.

\* \* \* \* \*